(12) United States Patent
Milliken et al.

(10) Patent No.: US 8,272,060 B2
(45) Date of Patent: *Sep. 18, 2012

(54) HASH-BASED SYSTEMS AND METHODS FOR DETECTING AND PREVENTING TRANSMISSION OF POLYMORPHIC NETWORK WORMS AND VIRUSES

(75) Inventors: Walter Clark Milliken, Dover, NH (US); William Timothy Strayer, West Newton, MA (US); Stephen Douglas Milligan, Stow, MA (US); Luis Sanchez, Mayaguez, PR (US); Craig Partridge, East Lansing, MI (US)

(73) Assignee: Stragent, LLC, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/762,367

(22) Filed: Apr. 18, 2010

(65) Prior Publication Data
US 2010/0205671 A1 Aug. 12, 2010

Related U.S. Application Data

(63) Continuation of application No. 12/249,823, filed on Oct. 10, 2008, now abandoned, which is a continuation of application No. 10/654,771, filed on Sep. 4, 2003, now abandoned, which is a continuation-in-part of application No. 10/251,403, filed on Sep. 20, 2002, now Pat. No. 7,328,349, and a continuation-in-part of application No. 09/881,074, filed on Jun. 14, 2001, now Pat. No. 6,981,158, which is a continuation-in-part of application No. 09/881,145, filed on Jun. 14, 2001, now abandoned.

(60) Provisional application No. 60/407,975, filed on Sep. 5, 2002, provisional application No. 60/341,462, filed on Dec. 14, 2001.

(51) Int. Cl.
*H04L 9/00* (2006.01)
*H04L 29/06* (2006.01)
(52) U.S. Cl. .............. 726/24; 726/22; 726/23; 726/25; 726/26; 713/178; 713/179; 713/180; 713/181
(58) Field of Classification Search .................. 726/24
See application file for complete search history.

(56) References Cited

U.S. PATENT DOCUMENTS
3,956,615 A  5/1976  Anderson et al. ............... 705/72
(Continued)

FOREIGN PATENT DOCUMENTS
WO  WO9605673  2/1996
(Continued)

OTHER PUBLICATIONS

Notice of Allowance from U.S. Appl. No. 12/248,790 which was mailed on Aug. 15, 2011.
(Continued)

*Primary Examiner* — Longbit Chai
(74) *Attorney, Agent, or Firm* — Patrick E. Caldwell, Esq.; The Caldwell Firm, LLC

(57) ABSTRACT

A system (200) detects transmission of potentially malicious packets. The system (200) receives, or otherwise observes, packets and generates hash values based on variable-sized blocks of the packets. The system (200) then compares the generated hash values to hash values associated with prior packets. The system (200) determines that one of the received packets is a potentially malicious packet when one or more of the generated hash values associated with the received packet match one or more of the hash values associated with the prior packets.

38 Claims, 27 Drawing Sheets

U.S. PATENT DOCUMENTS

| | | | |
|---|---|---|---|
| 4,104,721 A | 8/1978 | Markstein et al. | 364/200 |
| 4,177,510 A | 12/1979 | Appell et al. | 364/200 |
| 4,200,770 A | 4/1980 | Hellman et al. | 178/22 |
| 4,289,930 A | 9/1981 | Connolly et al. | 345/169 |
| 4,384,325 A | 5/1983 | Slechta, Jr. et al. | 364/200 |
| 4,386,233 A | 5/1983 | Smid et al. | 178/22.08 |
| 4,386,416 A | 5/1983 | Giltner et al. | 364/900 |
| 4,405,829 A | 9/1983 | Rivest et al. | 178/22.1 |
| 4,442,484 A | 4/1984 | Childs, Jr. et al. | 364/200 |
| 4,532,588 A | 7/1985 | Foster | 364/200 |
| 4,584,639 A | 4/1986 | Hardy | 364/200 |
| 4,590,470 A | 5/1986 | Koenig | 340/825.31 |
| 4,607,137 A | 8/1986 | Jansen et al. | 178/22.14 |
| 4,621,321 A | 11/1986 | Boebert et al. | 364/200 |
| 4,641,274 A | 2/1987 | Swank | 364/900 |
| 4,648,031 A | 3/1987 | Jenner | 364/200 |
| 4,701,840 A | 10/1987 | Boebert et al. | 364/200 |
| 4,710,763 A | 12/1987 | Franke et al. | 340/723 |
| 4,713,753 A | 12/1987 | Boebert et al. | 364/200 |
| 4,713,780 A | 12/1987 | Schultz et al. | 364/514 |
| 4,754,428 A | 6/1988 | Schultz et al. | 364/900 |
| 4,837,798 A | 6/1989 | Cohen et al. | 379/88 |
| 4,853,961 A | 8/1989 | Pastor | 380/21 |
| 4,864,573 A | 9/1989 | Horsten | 371/5.1 |
| 4,868,877 A | 9/1989 | Fischer | 380/25 |
| 4,870,571 A | 9/1989 | Frink | 364/200 |
| 4,885,789 A | 12/1989 | Burger et al. | 380/25 |
| 4,910,774 A | 3/1990 | Barakat | 380/23 |
| 4,914,568 A | 4/1990 | Kodosky et al. | 364/200 |
| 4,926,480 A | 5/1990 | Chaum | 380/23 |
| 4,947,430 A | 8/1990 | Chaum | 380/25 |
| 4,951,196 A | 8/1990 | Jackson | 364/401 |
| 4,975,950 A | 12/1990 | Lentz | 380/4 |
| 4,979,210 A | 12/1990 | Nagata et al. | 380/3 |
| 4,996,711 A | 2/1991 | Chaum | 380/30 |
| 5,005,200 A | 4/1991 | Fischer | 380/30 |
| 5,008,814 A | 4/1991 | Mathur | 364/200 |
| 5,020,059 A | 5/1991 | Gorin et al. | 371/11.3 |
| 5,051,886 A | 9/1991 | Kawaguchi et al. | 364/200 |
| 5,054,096 A | 10/1991 | Beizer | 382/41 |
| 5,070,528 A | 12/1991 | Hawe et al. | 380/48 |
| 5,093,914 A | 3/1992 | Coplien et al. | 395/700 |
| 5,105,184 A | 4/1992 | Pirani et al. | 340/721 |
| 5,119,465 A | 6/1992 | Jack et al. | 395/500 |
| 5,124,984 A | 6/1992 | Engel | 370/94.1 |
| 5,144,557 A | 9/1992 | Wang et al. | 364/419 |
| 5,144,659 A | 9/1992 | Jones | 380/4 |
| 5,144,660 A | 9/1992 | Rose | 380/4 |
| 5,144,665 A | 9/1992 | Takaragi et al. | 380/30 |
| 5,153,918 A | 10/1992 | Tuai | 380/25 |
| 5,164,988 A | 11/1992 | Matyas et al. | 380/25 |
| 5,167,011 A | 11/1992 | Priest | 395/54 |
| 5,191,611 A | 3/1993 | Lang | 380/25 |
| 5,200,999 A | 4/1993 | Matyas et al. | 380/25 |
| 5,204,961 A | 4/1993 | Barlow | 395/725 |
| 5,210,795 A | 5/1993 | Lipner et al. | 380/23 |
| 5,210,824 A | 5/1993 | Putz et al. | 395/145 |
| 5,210,825 A | 5/1993 | Kavaler | 395/147 |
| 5,214,702 A | 5/1993 | Fischer | 380/30 |
| 5,224,163 A | 6/1993 | Gasser et al. | 380/30 |
| 5,226,080 A | 7/1993 | Cole et al. | 380/25 |
| 5,228,083 A | 7/1993 | Lozowick et al. | 380/9 |
| 5,235,642 A | 8/1993 | Wobber et al. | 380/25 |
| 5,239,466 A | 8/1993 | Morgan et al. | 395/148 |
| 5,241,594 A | 8/1993 | Kung | 380/4 |
| 5,247,661 A | 9/1993 | Hager et al. | 395/600 |
| 5,263,147 A | 11/1993 | Francisco et al. | 395/425 |
| 5,263,157 A | 11/1993 | Janis | 395/600 |
| 5,265,163 A | 11/1993 | Golding et al. | 380/25 |
| 5,265,164 A | 11/1993 | Matyas et al. | 380/30 |
| 5,267,313 A | 11/1993 | Hirata | 380/21 |
| 5,272,754 A | 12/1993 | Boerbert | 380/25 |
| 5,276,735 A | 1/1994 | Boebert et al. | 380/21 |
| 5,276,736 A | 1/1994 | Chaum | 380/24 |
| 5,276,737 A | 1/1994 | Micali | 380/30 |
| 5,276,869 A | 1/1994 | Forrest et al. | 395/600 |
| 5,276,901 A | 1/1994 | Howell et al. | 395/800 |
| 5,278,901 A | 1/1994 | Shieh et al. | 380/4 |
| 5,280,527 A | 1/1994 | Gullman et al. | 380/23 |
| 5,283,887 A | 2/1994 | Zachery | 395/500 |
| 5,293,250 A | 3/1994 | Okumura et al. | 358/402 |
| 5,299,263 A | 3/1994 | Beller et al. | 380/30 |
| 5,303,303 A | 4/1994 | White | 380/49 |
| 5,305,385 A | 4/1994 | Schanning et al. | 380/49 |
| 5,311,591 A | 5/1994 | Fischer | 380/4 |
| 5,311,593 A | 5/1994 | Carmi | 380/23 |
| 5,313,521 A | 5/1994 | Torii et al. | 380/21 |
| 5,313,637 A | 5/1994 | Rose | 395/725 |
| 5,315,657 A | 5/1994 | Abadi et al. | 380/25 |
| 5,315,658 A | 5/1994 | Micali | 380/30 |
| 5,319,776 A | 6/1994 | Hile et al. | 395/575 |
| 5,325,370 A | 6/1994 | Cleveland et al. | 371/37.4 |
| 5,329,623 A | 7/1994 | Smith et al. | 395/275 |
| 5,333,266 A | 7/1994 | Boaz et al. | 395/200 |
| 5,341,426 A | 8/1994 | Barney et al. | 380/21 |
| 5,347,578 A | 9/1994 | Duxbury | 380/4 |
| 5,351,293 A | 9/1994 | Michener et al. | 380/21 |
| 5,355,472 A | 10/1994 | Lewis | 395/600 |
| 5,355,474 A | 10/1994 | Thuraisngham et al. | 395/600 |
| 5,359,659 A | 10/1994 | Rosenthal | 380/4 |
| 5,361,002 A | 11/1994 | Casper | 327/530 |
| 5,367,621 A | 11/1994 | Cohen et al. | 395/154 |
| 5,371,794 A | 12/1994 | Diffie et al. | 380/21 |
| 5,377,354 A | 12/1994 | Scannell et al. | 395/650 |
| 5,379,340 A | 1/1995 | Overend et al. | 379/93 |
| 5,379,374 A | 1/1995 | Ishizaki et al. | 395/155 |
| 5,386,470 A | 1/1995 | Carter et al. | 380/48 |
| 5,388,189 A | 2/1995 | Kung | 395/50 |
| 5,404,231 A | 4/1995 | Bloomfield | 358/400 |
| 5,406,557 A | 4/1995 | Baudoin | 370/61 |
| 5,406,628 A | 4/1995 | Beller et al. | 380/30 |
| 5,410,326 A | 4/1995 | Goldstein | 348/134 |
| 5,414,650 A | 5/1995 | Hekhuis | 364/715.02 |
| 5,414,833 A | 5/1995 | Hershey et al. | 395/575 |
| 5,416,842 A | 5/1995 | Aziz | 380/30 |
| 5,418,908 A | 5/1995 | Keller et al. | 395/200 |
| 5,424,724 A | 6/1995 | Williams et al. | 340/825.05 |
| 5,432,932 A | 7/1995 | Chen et al. | 395/650 |
| 5,436,972 A | 7/1995 | Fischer | 380/25 |
| 5,440,723 A | 8/1995 | Arnold et al. | 395/181 |
| 5,455,828 A | 10/1995 | Zisapel | 370/85.3 |
| 5,479,411 A | 12/1995 | Klein | 370/110.1 |
| 5,481,312 A | 1/1996 | Cash et al. | 348/466 |
| 5,481,613 A | 1/1996 | Ford et al. | 380/30 |
| 5,483,466 A | 1/1996 | Kawahara et al. | 364/514 |
| 5,485,409 A | 1/1996 | Gupta et al. | 395/186 |
| 5,485,460 A | 1/1996 | Schrier et al. | 370/94.1 |
| 5,491,750 A | 2/1996 | Bellare et al. | 380/21 |
| 5,495,610 A | 2/1996 | Shing et al. | 395/600 |
| 5,499,294 A | 3/1996 | Friedman | 380/10 |
| 5,504,454 A | 4/1996 | Daggett et al. | 329/304 |
| 5,509,074 A | 4/1996 | Choudhury et al. | 380/23 |
| 5,511,122 A | 4/1996 | Atkinson | 380/25 |
| 5,511,163 A | 4/1996 | Lerche et al. | 398/183.04 |
| 5,513,126 A | 4/1996 | Harkins et al. | 364/514 A |
| 5,513,323 A | 4/1996 | Williams et al. | 395/200.18 |
| 5,521,910 A | 5/1996 | Matthews | 370/256 |
| 5,530,852 A | 6/1996 | Meske, Jr. et al. | 395/600 |
| 5,535,276 A | 7/1996 | Ganesan | 380/25 |
| 5,537,533 A | 7/1996 | Staheli et al. | 395/182.03 |
| 5,539,824 A | 7/1996 | Bjorklund et al. | 380/21 |
| 5,541,993 A | 7/1996 | Fan et al. | 380/18 |
| 5,544,320 A | 8/1996 | Konrad | 395/200.09 |
| 5,548,646 A | 8/1996 | Aziz et al. | 380/23 |
| 5,550,984 A | 8/1996 | Gelb | 395/200.17 |
| 5,550,994 A | 8/1996 | Tashiro et al. | 395/375 |
| 5,553,145 A | 9/1996 | Micali | 380/30 |
| 5,555,309 A | 9/1996 | Kruys | 380/21 |
| 5,557,346 A | 9/1996 | Lipner et al. | 380/21 |
| 5,557,742 A | 9/1996 | Smaha et al. | 395/186 |
| 5,557,765 A | 9/1996 | Lipner et al. | 380/21 |
| 5,561,703 A | 10/1996 | Arledge et al. | 379/57 |
| 5,564,106 A | 10/1996 | Puhl et al. | 380/21 |
| 5,566,170 A | 10/1996 | Bakke et al. | 370/60 |
| 5,572,590 A | 11/1996 | Chess | 380/4 |
| 5,572,643 A | 11/1996 | Judson | 395/793 |
| 5,577,209 A | 11/1996 | Boyle et al. | 395/200.06 |

| Patent No. | Date | Inventor | Class |
|---|---|---|---|
| 5,583,940 A | 12/1996 | Vidrascu et al. .................. 380/49 |
| 5,583,995 A | 12/1996 | Gardner et al. ............ 395/200.09 |
| 5,586,260 A | 12/1996 | Hu .............................. 395/200.2 |
| 5,602,918 A | 2/1997 | Chen et al. ....................... 380/21 |
| 5,604,490 A | 2/1997 | Blakley, III et al. ....... 340/825.31 |
| 5,606,668 A | 2/1997 | Shwed ..................... 395/200.11 |
| 5,608,819 A | 3/1997 | Ikeuchi ....................... 382/156 |
| 5,608,874 A | 3/1997 | Ogawa et al. ............. 395/200.15 |
| 5,615,340 A | 3/1997 | Dai et al. .................. 395/200.17 |
| 5,619,648 A | 4/1997 | Canale et al. ............. 395/200.01 |
| 5,621,579 A | 4/1997 | Yuen ............................. 386/121 |
| 5,621,889 A | 4/1997 | Lermuzeaux et al. ........ 395/186 |
| 5,623,598 A | 4/1997 | Voigt et al. ............... 395/184.01 |
| 5,623,600 A | 4/1997 | Ji et al. ..................... 395/187.01 |
| 5,623,601 A | 4/1997 | Vu ............................ 395/187.01 |
| 5,623,637 A | 4/1997 | Jones et al. .................... 395/491 |
| 5,625,695 A | 4/1997 | M'Raihi et al. .................. 380/28 |
| 5,627,977 A | 5/1997 | Hickey et al. ................. 395/329 |
| 5,629,982 A | 5/1997 | Micali ............................. 380/30 |
| 5,631,961 A | 5/1997 | Mills et al. ..................... 380/21 |
| 5,632,011 A | 5/1997 | Landfield et al. ............. 395/326 |
| 5,636,371 A | 6/1997 | Yu ................................. 395/500 |
| 5,638,487 A | 6/1997 | Chigier ....................... 395/2.62 |
| 5,640,454 A | 6/1997 | Lipner et al. ................... 380/21 |
| 5,644,404 A | 7/1997 | Hashimoto et al. ........... 358/402 |
| 5,644,571 A | 7/1997 | Seaman ........................ 370/401 |
| 5,647,000 A | 7/1997 | Leighton ......................... 380/30 |
| 5,649,095 A | 7/1997 | Cozza ..................... 395/183.15 |
| 5,655,081 A | 8/1997 | Bonnell et al. ........... 395/200.32 |
| 5,657,461 A | 8/1997 | Harkins et al. ................. 395/333 |
| 5,666,416 A | 9/1997 | Micali ............................. 380/23 |
| 5,666,530 A | 9/1997 | Clark et al. .................... 395/617 |
| 5,671,279 A | 9/1997 | Elgamal .......................... 380/23 |
| 5,673,322 A | 9/1997 | Pepe et al. ....................... 380/49 |
| 5,675,507 A | 10/1997 | Bobo, II ........................ 709/206 |
| 5,675,733 A | 10/1997 | Williams ................. 395/200.01 |
| 5,677,955 A | 10/1997 | Doggett et al. ................ 380/24 |
| 5,684,951 A | 11/1997 | Goldman et al. ......... 395/188.01 |
| 5,687,235 A | 11/1997 | Perlman et al. ................. 380/25 |
| 5,689,565 A | 11/1997 | Spies et al. ...................... 380/25 |
| 5,689,566 A | 11/1997 | Nguyen ......................... 380/25 |
| 5,694,616 A | 12/1997 | Johnson et al. ............... 395/860 |
| 5,696,822 A | 12/1997 | Nachenberg ..................... 380/4 |
| 5,699,431 A | 12/1997 | Van Oorschot et al. ........ 380/30 |
| 5,699,513 A | 12/1997 | Feigen et al. ............. 395/187.01 |
| 5,706,442 A | 1/1998 | Anderson et al. .............. 395/227 |
| 5,706,507 A | 1/1998 | Schloss ......................... 395/615 |
| 5,708,780 A | 1/1998 | Levergood et al. ....... 395/200.12 |
| 5,708,826 A | 1/1998 | Ikeda et al. ................... 395/762 |
| 5,710,883 A | 1/1998 | Hong et al. ............... 395/200.17 |
| 5,717,757 A | 2/1998 | Micali ............................. 380/25 |
| 5,717,758 A | 2/1998 | Micali ............................. 380/25 |
| 5,724,428 A | 3/1998 | Rivest ............................. 380/37 |
| 5,724,512 A | 3/1998 | Winterbottom .......... 395/200.12 |
| 5,727,156 A | 3/1998 | Herr-Hoyman et al. . 395/200.49 |
| 5,740,231 A | 4/1998 | Cohn et al. ...................... 379/89 |
| 5,742,759 A | 4/1998 | Nessett et al. ............ 395/187.01 |
| 5,742,769 A | 4/1998 | Lee et al. ................... 395/200.36 |
| 5,745,573 A | 4/1998 | Lipner et al. ................... 380/21 |
| 5,745,574 A | 4/1998 | Muftic ............................. 380/23 |
| 5,751,956 A | 5/1998 | Kirsch .................... 395/200.33 |
| 5,758,343 A | 5/1998 | Vigil et al. ...................... 707/10 |
| 5,761,531 A | 6/1998 | Ohmura et al. ................ 710/21 |
| 5,764,906 A | 6/1998 | Edelstein et al. ........ 395/200.49 |
| 5,765,030 A | 6/1998 | Nachenberg et al. ........... 714/33 |
| 5,768,388 A | 6/1998 | Goldwasser et al. ........... 380/30 |
| 5,768,528 A | 6/1998 | Stumm ................... 395/200.61 |
| 5,769,942 A | 6/1998 | Maeda ............................ 117/89 |
| 5,771,348 A | 6/1998 | Kubatzki et al. .............. 395/186 |
| 5,778,372 A | 7/1998 | Cordell et al. ................. 707/100 |
| 5,781,729 A | 7/1998 | Baker et al. ................. 395/200.6 |
| 5,781,735 A | 7/1998 | Southard .................. 395/200.54 |
| 5,781,857 A | 7/1998 | Hwang et al. ................. 455/412 |
| 5,781,901 A | 7/1998 | Kuzma .......................... 707/10 |
| 5,790,664 A | 8/1998 | Coley et al. ....................... 380/4 |
| 5,790,789 A | 8/1998 | Suarez ..................... 395/200.32 |
| 5,790,790 A | 8/1998 | Smith et al. ............. 395/200.36 |
| 5,790,793 A | 8/1998 | Higley ..................... 395/200.48 |
| 5,790,856 A | 8/1998 | Lillich ........................... 395/703 |
| 5,793,763 A | 8/1998 | Mayes et al. .................. 370/389 |
| 5,793,868 A | 8/1998 | Micali ............................. 380/28 |
| 5,793,954 A | 8/1998 | Baker et al. ................ 395/200.8 |
| 5,793,972 A | 8/1998 | Shane ...................... 395/200.49 |
| 5,796,830 A | 8/1998 | Johnson et al. ................. 380/21 |
| 5,796,942 A | 8/1998 | Esbensen ................. 395/187.01 |
| 5,796,948 A | 8/1998 | Cohen ..................... 395/200.36 |
| 5,798,706 A | 8/1998 | Kraemer et al. .......... 340/825.07 |
| 5,799,083 A | 8/1998 | Brothers et al. ................. 380/20 |
| 5,801,700 A | 9/1998 | Ferguson ...................... 345/349 |
| 5,802,178 A | 9/1998 | Holden et al. .................. 380/49 |
| 5,802,277 A | 9/1998 | Cowlard ....................... 395/186 |
| 5,802,371 A | 9/1998 | Meier ........................... 395/704 |
| 5,805,719 A | 9/1998 | Pare, Jr. et al. ................ 382/115 |
| 5,805,801 A | 9/1998 | Holloway et al. ........ 395/187.01 |
| 5,812,398 A | 9/1998 | Nielsen ........................ 364/285.1 |
| 5,812,763 A | 9/1998 | Teng ......................... 395/187.01 |
| 5,812,776 A | 9/1998 | Gifford .................... 395/200.47 |
| 5,812,844 A | 9/1998 | Jones et al. .................... 395/674 |
| 5,815,573 A | 9/1998 | Johnson et al. ................. 380/21 |
| 5,815,657 A | 9/1998 | Williams et al. .............. 395/186 |
| 5,821,398 A | 10/1998 | Speirs et al. .................. 800/205 |
| 5,822,526 A | 10/1998 | Waskiewicz ............. 395/200.36 |
| 5,822,527 A | 10/1998 | Post ........................ 395/200.36 |
| 5,826,013 A | 10/1998 | Nachenberg ................. 395/186 |
| 5,826,014 A | 10/1998 | Coley et al. ............. 395/187.01 |
| 5,826,022 A | 10/1998 | Nielsen .................... 395/200.36 |
| 5,826,029 A | 10/1998 | Gore, Jr. et al. .......... 395/200.57 |
| 5,828,832 A | 10/1998 | Holden et al. ............ 395/187.01 |
| 5,828,893 A | 10/1998 | Wied et al. ................... 395/800 |
| 5,832,208 A | 11/1998 | Chen et al. ............... 395/187.01 |
| 5,835,087 A | 11/1998 | Herz et al. .................... 345/327 |
| 5,835,090 A | 11/1998 | Clark et al. ................... 345/339 |
| 5,835,600 A | 11/1998 | Rivest ............................. 380/44 |
| 5,835,758 A | 11/1998 | Nochur et al. ................. 395/613 |
| 5,842,216 A | 11/1998 | Anderson et al. ............. 707/203 |
| 5,845,084 A | 12/1998 | Cordell et al. ............ 395/200.64 |
| 5,850,442 A | 12/1998 | Muftic ............................. 381/21 |
| 5,852,665 A | 12/1998 | Gressel et al. .................. 380/30 |
| 5,855,020 A | 12/1998 | Kirsch ............................ 707/10 |
| 5,857,022 A | 1/1999 | Sudia ............................. 380/23 |
| 5,859,966 A | 1/1999 | Hayman et al. ............... 395/186 |
| 5,860,068 A | 1/1999 | Cook ............................. 705/26 |
| 5,862,325 A | 1/1999 | Reed et al. ................ 395/200.31 |
| 5,864,667 A | 1/1999 | Barkan .................... 395/187.01 |
| 5,864,683 A | 1/1999 | Boebert et al. ........... 395/200.79 |
| 5,864,852 A | 1/1999 | Luotonen ........................ 707/10 |
| 5,872,844 A | 2/1999 | Yacobi ........................... 380/24 |
| 5,872,849 A | 2/1999 | Sudia ............................. 380/49 |
| 5,872,931 A | 2/1999 | Chivaluri ................. 395/200.53 |
| 5,878,230 A | 3/1999 | Weber et al. ............. 395/200.68 |
| 5,884,033 A | 3/1999 | Duvall et al. ............ 395/200.36 |
| 5,889,943 A | 3/1999 | Ji et al. ..................... 395/187.01 |
| 5,892,825 A | 4/1999 | Mages et al. ..................... 380/3 |
| 5,892,903 A | 4/1999 | Klaus ....................... 395/187.01 |
| 5,892,904 A | 4/1999 | Atkinson et al. ......... 395/187.01 |
| 5,893,114 A | 4/1999 | Hashimoto et al. ........... 707/200 |
| 5,896,499 A | 4/1999 | McKelvey ............... 395/187.01 |
| 5,898,830 A | 4/1999 | Wesinger, Jr. et al. ... 395/187.01 |
| 5,898,836 A | 4/1999 | Freivald et al. .......... 395/200.48 |
| 5,901,227 A | 5/1999 | Perlman ......................... 380/21 |
| 5,903,651 A | 5/1999 | Kocher .......................... 380/25 |
| 5,903,723 A | 5/1999 | Beck et al. ................. 395/200.3 |
| 5,903,882 A | 5/1999 | Asay et al. ..................... 705/44 |
| 5,905,859 A | 5/1999 | Holloway et al. ........ 395/187.01 |
| 5,907,618 A | 5/1999 | Gennaro et al. ................ 380/21 |
| 5,907,620 A | 5/1999 | Klemba et al. ................. 380/25 |
| 5,911,776 A | 6/1999 | Guck ............................ 709/217 |
| 5,912,972 A | 6/1999 | Barton ........................... 380/23 |
| 5,919,257 A | 7/1999 | Trostle ......................... 713/200 |
| 5,919,258 A | 7/1999 | Kayashima et al. ........... 713/201 |
| 5,920,630 A | 7/1999 | Wertheimer et al. ........... 380/25 |
| 5,922,074 A | 7/1999 | Richard et al. ................ 713/200 |
| 5,923,846 A | 7/1999 | Gage et al. ................ 395/200.43 |
| 5,923,885 A | 7/1999 | Johnson et al. ............... 395/712 |
| 5,928,329 A | 7/1999 | Clark et al. .................... 709/227 |
| 5,930,479 A | 7/1999 | Hall .......................... 395/200.68 |
| 5,933,478 A | 8/1999 | Ozaki et al. ................. 379/93.24 |
| 5,933,498 A | 8/1999 | Schneck et al. ................... 380/4 |

| Patent No. | Date | Inventor | Class |
|---|---|---|---|
| 5,933,647 A | 8/1999 | Aronberg et al. | 395/712 |
| 5,937,066 A | 8/1999 | Gennaro et al. | 380/21 |
| 5,937,164 A | 8/1999 | Mages et al. | 395/200.48 |
| 5,940,591 A | 8/1999 | Boyle et al. | 395/187.01 |
| 5,941,998 A | 8/1999 | Tillson | 714/54 |
| 5,946,679 A | 8/1999 | Ahuja et al. | 1/1 |
| 5,948,062 A | 9/1999 | Tzelnic et al. | 709/219 |
| 5,948,104 A | 9/1999 | Gluck et al. | 713/200 |
| 5,950,195 A | 9/1999 | Stockwell et al. | 707/4 |
| 5,951,644 A | 9/1999 | Creemer | 709/229 |
| 5,951,698 A | 9/1999 | Chen et al. | 714/38 |
| 5,956,403 A | 9/1999 | Lipner et al. | 380/21 |
| 5,956,481 A | 9/1999 | Walsh et al. | 395/186 |
| 5,958,005 A | 9/1999 | Thorne et al. | 709/202 |
| 5,958,010 A | 9/1999 | Agarwal et al. | 709/224 |
| 5,959,976 A | 9/1999 | Kuo | 370/257 |
| 5,960,170 A | 9/1999 | Chen et al. | 395/183.14 |
| 5,963,915 A | 10/1999 | Kirsch | 705/26 |
| 5,964,889 A | 10/1999 | Nachenberg | 714/25 |
| 5,970,248 A | 10/1999 | Meier | 395/704 |
| 5,974,141 A | 10/1999 | Saito | 380/4 |
| 5,978,799 A | 11/1999 | Hirsch | 707/4 |
| 5,983,012 A | 11/1999 | Bianchi et al. | 395/500.44 |
| 5,983,228 A | 11/1999 | Kobayashi et al. | 707/10 |
| 5,987,606 A | 11/1999 | Cirasole et al. | 713/200 |
| 5,987,609 A | 11/1999 | Hasebe | 713/200 |
| 5,991,406 A | 11/1999 | Lipner et al. | 380/21 |
| 5,991,807 A | 11/1999 | Schmidt et al. | 709/225 |
| 5,991,879 A | 11/1999 | Still | 713/200 |
| 5,991,881 A | 11/1999 | Conklin et al. | 726/22 |
| 5,996,011 A | 11/1999 | Humes | 709/225 |
| 5,996,077 A | 11/1999 | Williams | 713/201 |
| 5,999,723 A | 12/1999 | Nachenberg | 395/500.43 |
| 5,999,932 A | 12/1999 | Paul | 707/10 |
| 5,999,967 A | 12/1999 | Sundsted | 709/206 |
| 6,000,041 A | 12/1999 | Baker et al. | 714/39 |
| 6,003,027 A | 12/1999 | Prager | 707/5 |
| 6,006,329 A | 12/1999 | Chi | 713/200 |
| 6,009,103 A | 12/1999 | Woundy | 370/401 |
| 6,009,274 A | 12/1999 | Fletcher et al. | 395/712 |
| 6,009,462 A | 12/1999 | Birrell et al. | 709/206 |
| 6,012,144 A | 1/2000 | Pickett | 713/201 |
| 6,014,651 A | 1/2000 | Crawford | 705/400 |
| 6,021,510 A | 2/2000 | Nachenberg | 714/38 |
| 6,023,723 A | 2/2000 | McCormick et al. | 709/206 |
| 6,026,414 A | 2/2000 | Anglin | 707/204 |
| 6,029,256 A | 2/2000 | Kouznetsov | 714/38 |
| 6,035,423 A | 3/2000 | Hodges et al. | 714/38 |
| 6,038,233 A | 3/2000 | Hamamoto et al. | 370/401 |
| 6,049,789 A | 4/2000 | Frison et al. | 705/59 |
| 6,052,531 A | 4/2000 | Waldin, Jr. et al. | 395/712 |
| 6,052,709 A | 4/2000 | Paul | 709/202 |
| 6,052,788 A | 4/2000 | Wesinger, Jr. et al. | 713/201 |
| 6,055,519 A | 4/2000 | Kennedy et al. | 705/80 |
| 6,058,381 A | 5/2000 | Nelson | 705/40 |
| 6,058,482 A | 5/2000 | Liu | 713/201 |
| 6,061,448 A | 5/2000 | Smith et al. | 380/21 |
| 6,061,722 A | 5/2000 | Lipa et al. | 709/224 |
| 6,067,410 A | 5/2000 | Nachenberg | 395/500.49 |
| 6,070,243 A | 5/2000 | See et al. | 713/201 |
| 6,072,942 A | 6/2000 | Stockwell et al. | 395/200.36 |
| 6,073,140 A | 6/2000 | Morgan et al. | 707/203 |
| 6,075,863 A | 6/2000 | Krishnan et al. | 380/49 |
| 6,078,929 A | 6/2000 | Rao | 707/200 |
| 6,085,320 A | 7/2000 | Kaliski, Jr. | 713/168 |
| 6,088,803 A | 7/2000 | Tso et al. | 713/201 |
| 6,088,804 A | 7/2000 | Hill et al. | 713/201 |
| 6,092,067 A | 7/2000 | Girling et al. | 707/100 |
| 6,092,102 A | 7/2000 | Wagner | 709/206 |
| 6,092,114 A | 7/2000 | Shaffer et al. | 709/232 |
| 6,092,191 A | 7/2000 | Shimbo et al. | 713/153 |
| 6,092,194 A | 7/2000 | Touboul | 713/200 |
| 6,092,201 A | 7/2000 | Turnbull et al. | 713/201 |
| 6,094,277 A | 7/2000 | Toyoda | 358/1.15 |
| 6,094,731 A | 7/2000 | Waldin et al. | 714/38 |
| 6,097,811 A | 8/2000 | Micali | 713/186 |
| 6,104,500 A | 8/2000 | Alam et al. | 358/1.15 |
| 6,108,683 A | 8/2000 | Kamada et al. | 709/103 |
| 6,108,688 A | 8/2000 | Nielsen | 709/206 |
| 6,108,691 A | 8/2000 | Lee et al. | 709/206 |
| 6,108,786 A | 8/2000 | Knowlson | 713/200 |
| 6,112,181 A | 8/2000 | Shear et al. | 705/1 |
| 6,118,856 A | 9/2000 | Paarsmarkt et al. | 379/93.24 |
| 6,119,137 A | 9/2000 | Smith et al. | 707/523 |
| 6,119,142 A | 9/2000 | Kosaka | 709/200 |
| 6,119,157 A | 9/2000 | Traversat et al. | 709/220 |
| 6,119,165 A | 9/2000 | Li et al. | 709/229 |
| 6,119,230 A | 9/2000 | Carter | 713/200 |
| 6,119,231 A | 9/2000 | Foss et al. | 713/200 |
| 6,119,236 A | 9/2000 | Shipley | 713/207 |
| 6,122,661 A | 9/2000 | Stedman et al. | 709/217 |
| 6,123,737 A | 9/2000 | Sadowsky | 717/11 |
| 6,134,550 A | 10/2000 | Van Oorschot et al. | 707/9 |
| 6,134,551 A | 10/2000 | Aucsmith | 707/10 |
| 6,138,254 A | 10/2000 | Voshell | 714/710 |
| 6,141,695 A | 10/2000 | Sekiguchi et al. | 709/246 |
| 6,141,778 A | 10/2000 | Kane et al. | 714/201 |
| 6,144,744 A | 11/2000 | Smith, Sr. et al. | 380/45 |
| 6,145,083 A | 11/2000 | Shaffer et al. | 713/201 |
| 6,151,643 A | 11/2000 | Cheng et al. | 710/36 |
| 6,151,675 A | 11/2000 | Smith | 713/153 |
| 6,154,769 A | 11/2000 | Cherkasova et al. | 709/207 |
| 6,154,844 A | 11/2000 | Touboul et al. | 713/201 |
| 6,154,879 A | 11/2000 | Pare et al. | 705/35 |
| 6,161,130 A | 12/2000 | Horvitz et al. | 709/206 |
| 6,161,137 A | 12/2000 | Ogdon et al. | 709/224 |
| 6,167,407 A | 12/2000 | Nachenberg et al. | 707/203 |
| 6,167,438 B1 | 12/2000 | Yates et al. | 709/216 |
| 6,169,969 B1 | 1/2001 | Cohen | 704/10 |
| 6,178,242 B1 | 1/2001 | Tsuria | 380/201 |
| 6,178,509 B1 | 1/2001 | Nardone et al. | 713/200 |
| 6,182,142 B1 | 1/2001 | Win et al. | 709/229 |
| 6,182,226 B1 | 1/2001 | Reid et al. | 713/201 |
| 6,185,678 B1 | 2/2001 | Arbaugh et al. | 713/2 |
| 6,185,682 B1 | 2/2001 | Tang | 713/168 |
| 6,185,689 B1 | 2/2001 | Todd, Sr. et al. | 713/201 |
| 6,192,360 B1 | 2/2001 | Dumais et al. | 707/6 |
| 6,192,407 B1 | 2/2001 | Smith et al. | 709/229 |
| 6,199,102 B1 | 3/2001 | Cobb | 709/206 |
| 6,202,157 B1 | 3/2001 | Brownlie et al. | 713/201 |
| 6,215,763 B1 | 4/2001 | Doshi et al. | 370/216 |
| 6,216,265 B1 | 4/2001 | Roop et al. | 725/54 |
| 6,219,706 B1 | 4/2001 | Fan et al. | 709/225 |
| 6,219,714 B1 | 4/2001 | Inhwan et al. | 709/238 |
| 6,223,094 B1 | 4/2001 | Muehleck et al. | 700/107 |
| 6,223,172 B1 | 4/2001 | Hunter et al. | 707/741 |
| 6,223,213 B1 | 4/2001 | Cleron et al. | 709/206 |
| 6,226,666 B1 | 5/2001 | Chang et al. | 709/202 |
| 6,230,190 B1 | 5/2001 | Edmonds et al. | 709/213 |
| 6,230,194 B1 | 5/2001 | Frailong et al. | 709/220 |
| 6,230,266 B1 | 5/2001 | Perlman et al. | 713/158 |
| 6,233,577 B1 | 5/2001 | Ramasubramani et al. | 707/9 |
| 6,240,401 B1 | 5/2001 | Oren et al. | 705/40 |
| 6,243,815 B1 | 6/2001 | Antur et al. | 713/201 |
| 6,249,575 B1 | 6/2001 | Heilmann et al. | 379/189 |
| 6,249,585 B1 | 6/2001 | McGrew et al. | 380/286 |
| 6,249,807 B1 | 6/2001 | Shaw et al. | 709/206 |
| 6,253,337 B1 | 6/2001 | Maloney et al. | 714/38 |
| 6,260,043 B1 | 7/2001 | Puri et al. | 707/101 |
| 6,260,142 B1 | 7/2001 | Thakkar et al. | 713/158 |
| 6,266,337 B1 | 7/2001 | Marco | 370/410 |
| 6,266,668 B1 | 7/2001 | Vanderveldt et al. | 707/10 |
| 6,266,692 B1 | 7/2001 | Greenstein | 709/206 |
| 6,266,700 B1 | 7/2001 | Baker et al. | 709/230 |
| 6,266,774 B1 | 7/2001 | Sampath et al. | 713/201 |
| 6,269,380 B1 | 7/2001 | Terry et al. | 707/200 |
| 6,269,447 B1 | 7/2001 | Maloney et al. | 713/201 |
| 6,269,456 B1 | 7/2001 | Hodges et al. | 714/38 |
| 6,272,532 B1 | 8/2001 | Feinleib | 709/206 |
| 6,272,632 B1 | 8/2001 | Carman et al. | 713/168 |
| 6,275,937 B1 | 8/2001 | Hailpern et al. | 713/188 |
| 6,275,942 B1 | 8/2001 | Bernhard et al. | 713/201 |
| 6,275,977 B1 | 8/2001 | Nagai et al. | 717/1 |
| 6,279,113 B1 * | 8/2001 | Vaidya | 726/23 |
| 6,279,133 B1 | 8/2001 | Vafai et al. | 714/763 |
| 6,282,565 B1 | 8/2001 | Shaw et al. | 709/206 |
| 6,285,991 B1 | 9/2001 | Powar | 705/76 |
| 6,289,214 B1 | 9/2001 | Backstrom | 455/422 |

| Patent No. | Date | Inventor | Class |
|---|---|---|---|
| 6,292,833 B1 | 9/2001 | Liao et al. | 709/229 |
| 6,298,445 B1 | 10/2001 | Shostack et al. | 713/201 |
| 6,301,668 B1 | 10/2001 | Gleichauf et al. | 713/201 |
| 6,301,699 B1 | 10/2001 | Hollander et al. | 717/4 |
| 6,304,898 B1 | 10/2001 | Shiigi | 709/206 |
| 6,304,904 B1 | 10/2001 | Sathyanarayan et al. | 709/224 |
| 6,304,973 B1 | 10/2001 | Williams | 713/201 |
| 6,311,207 B1 | 10/2001 | Mighdoll et al. | 709/203 |
| 6,311,273 B1 | 10/2001 | Helbig et al. | 726/2 |
| 6,314,190 B1 | 11/2001 | Zimmermann | 380/282 |
| 6,317,829 B1 | 11/2001 | Van Oorschot | 713/155 |
| 6,320,948 B1 | 11/2001 | Heilmann et al. | 379/189 |
| 6,321,267 B1 | 11/2001 | Donaldson | 709/229 |
| 6,324,569 B1 | 11/2001 | Ogilvie et al. | 709/206 |
| 6,324,647 B1 | 11/2001 | Bowman-Amuah | 713/201 |
| 6,324,656 B1 | 11/2001 | Gleichauf et al. | 714/37 |
| 6,327,579 B1 | 12/2001 | Crawford | 705/400 |
| 6,327,594 B1 | 12/2001 | Van Huben et al. | 707/200 |
| 6,327,620 B1 | 12/2001 | Tams et al. | 709/224 |
| 6,327,652 B1 | 12/2001 | England et al. | 713/2 |
| 6,330,551 B1 | 12/2001 | Burchetta et al. | 705/80 |
| 6,330,589 B1 | 12/2001 | Kennedy | 709/206 |
| 6,330,670 B1 | 12/2001 | England et al. | 713/2 |
| 6,332,163 B1 | 12/2001 | Bowman-Amuah | 709/231 |
| 6,338,141 B1 | 1/2002 | Wells | 713/201 |
| 6,341,369 B1 | 1/2002 | Degenaro et al. | 717/1 |
| 6,347,374 B1 | 2/2002 | Drake et al. | 713/200 |
| 6,347,375 B1 | 2/2002 | Reinert et al. | 713/200 |
| 6,353,886 B1 | 3/2002 | Howard et al. | 713/156 |
| 6,356,859 B1 | 3/2002 | Talbot et al. | 702/188 |
| 6,356,935 B1 | 3/2002 | Gibbs | 709/206 |
| 6,357,008 B1 | 3/2002 | Nachenberg | 726/24 |
| 6,362,836 B1 | 3/2002 | Shaw et al. | 345/744 |
| 6,363,489 B1 | 3/2002 | Comay et al. | 713/201 |
| 6,367,009 B1 | 4/2002 | Davis et al. | 713/166 |
| 6,367,012 B1 | 4/2002 | Atkinson et al. | 713/176 |
| 6,370,648 B1 | 4/2002 | Diep | 713/201 |
| 6,373,950 B1 | 4/2002 | Rowney | 380/255 |
| 6,381,694 B1 | 4/2002 | Yen | 713/2 |
| 6,385,596 B1 | 5/2002 | Wiser et al. | 705/51 |
| 6,385,655 B1 | 5/2002 | Smith et al. | 709/232 |
| 6,389,419 B1 | 5/2002 | Wong et al. | 709/245 |
| 6,393,465 B2 | 5/2002 | Leeds | 709/207 |
| 6,393,568 B1 | 5/2002 | Ranger et al. | 713/188 |
| 6,397,259 B1 | 5/2002 | Lincke et al. | 709/236 |
| 6,397,335 B1 | 5/2002 | Franczek et al. | 713/200 |
| 6,400,804 B1 | 6/2002 | Bilder | 379/76 |
| 6,401,210 B1 | 6/2002 | Templeton | 713/201 |
| 6,405,318 B1 | 6/2002 | Rowland | 713/200 |
| 6,411,716 B1 | 6/2002 | Brickell | 380/286 |
| 6,424,650 B1 | 7/2002 | Yang et al. | 370/380 |
| 6,430,184 B1 | 8/2002 | Robins et al. | 370/392 |
| 6,430,688 B1 | 8/2002 | Kohl et al. | 713/156 |
| 6,434,536 B1 | 8/2002 | Geiger | 705/37 |
| 6,438,549 B1 | 8/2002 | Aldred et al. | 707/9 |
| 6,438,576 B1 | 8/2002 | Huang et al. | 709/202 |
| 6,438,612 B1 | 8/2002 | Ylonen et al. | 709/249 |
| 6,442,588 B1 | 8/2002 | Clark et al. | 709/203 |
| 6,442,686 B1 | 8/2002 | McArdle et al. | 713/151 |
| 6,442,688 B1 | 8/2002 | Moses et al. | 713/158 |
| 6,442,689 B1 | 8/2002 | Kocher | 713/158 |
| 6,446,109 B2 | 9/2002 | Gupta | 709/203 |
| 6,449,367 B2 | 9/2002 | Van Wie et al. | 380/232 |
| 6,449,640 B1 | 9/2002 | Haverstock et al. | 709/219 |
| 6,452,613 B1 | 9/2002 | Lefebvre et al. | 345/733 |
| 6,453,345 B2 | 9/2002 | Trcka et al. | 709/224 |
| 6,453,352 B1 | 9/2002 | Wagner et al. | 709/229 |
| 6,453,419 B1 | 9/2002 | Flint et al. | 713/201 |
| 6,460,050 B1 | 10/2002 | Pace et al. | 1/1 |
| 6,460,141 B1 | 10/2002 | Olden | 713/201 |
| 6,469,969 B2 | 10/2002 | Carson et al. | 369/59.12 |
| 6,470,086 B1 | 10/2002 | Smith | 380/255 |
| 6,477,651 B1 | 11/2002 | Teal | 713/200 |
| 6,484,203 B1 | 11/2002 | Porras et al. | 709/224 |
| 6,487,599 B1 | 11/2002 | Smith et al. | 709/229 |
| 6,487,658 B1 | 11/2002 | Micali | 713/158 |
| 6,487,666 B1 | 11/2002 | Shanklin et al. | 713/201 |
| 6,496,974 B1 | 12/2002 | Sliger et al. | 717/106 |
| 6,496,979 B1 | 12/2002 | Chen et al. | 717/178 |
| 6,499,107 B1 | 12/2002 | Gleichauf et al. | 713/201 |
| 6,502,191 B1 | 12/2002 | Smith et al. | 713/201 |
| 6,507,851 B1 | 1/2003 | Fujiwara et al. | 707/104.1 |
| 6,510,431 B1 | 1/2003 | Eichstaedt et al. | 707/10 |
| 6,510,464 B1 | 1/2003 | Grantges, Jr. et al. | 709/225 |
| 6,510,466 B1 | 1/2003 | Cox et al. | 709/229 |
| 6,516,316 B1 | 2/2003 | Ramasubramani et al. | 707/9 |
| 6,516,411 B2 | 2/2003 | Smith | 713/153 |
| 6,519,264 B1 | 2/2003 | Carr et al. | 370/449 |
| 6,519,703 B1 | 2/2003 | Joyce | 713/201 |
| 6,526,171 B1 | 2/2003 | Furukawa | 382/232 |
| 6,529,498 B1 | 3/2003 | Cheng | 370/351 |
| 6,539,430 B1 | 3/2003 | Humes | 709/225 |
| 6,546,416 B1 | 4/2003 | Kirsch | 709/206 |
| 6,546,493 B1 | 4/2003 | Magdych et al. | 713/201 |
| 6,550,012 B1 | 4/2003 | Villa et al. | 713/201 |
| 6,560,632 B1 | 5/2003 | Chess et al. | 709/201 |
| 6,574,611 B1 | 6/2003 | Matsuyama et al. | 705/57 |
| 6,574,737 B1 | 6/2003 | Kingsford et al. | 713/201 |
| 6,577,920 B1 | 6/2003 | Hypponen et al. | 700/200 |
| 6,578,025 B1 | 6/2003 | Pollack et al. | 707/2 |
| 6,578,147 B1 | 6/2003 | Shanklin et al. | 713/200 |
| 6,584,488 B1 | 6/2003 | Brenner et al. | 709/103 |
| 6,584,564 B2 | 6/2003 | Olkin et al. | 713/152 |
| 6,587,949 B1 | 7/2003 | Steinberg | 713/193 |
| 6,606,708 B1 | 8/2003 | Devine et al. | 713/201 |
| 6,609,196 B1 | 8/2003 | Dickinson, III et al. | 713/154 |
| 6,609,205 B1 | 8/2003 | Bernhard et al. | 713/201 |
| 6,611,869 B1 | 8/2003 | Eschelbeck et al. | 709/228 |
| 6,611,925 B1 | 8/2003 | Spear | 714/38 |
| 6,615,242 B1 | 9/2003 | Riemers | 709/206 |
| 6,622,150 B1 | 9/2003 | Kouznetsov et al. | 707/200 |
| 6,647,400 B1 | 11/2003 | Moran | 707/205 |
| 6,650,890 B1 | 11/2003 | Irlam et al. | 455/412.1 |
| 6,654,787 B1 | 11/2003 | Aronson et al. | 709/206 |
| 6,658,568 B1 | 12/2003 | Ginter et al. | 713/193 |
| 6,662,230 B1 | 12/2003 | Eichstaedt et al. | 709/229 |
| 6,668,269 B1 | 12/2003 | Kamada et al. | 709/103 |
| 6,675,153 B1 | 1/2004 | Cook et al. | 705/74 |
| 6,675,209 B1 | 1/2004 | Britt | 709/224 |
| 6,678,270 B1 | 1/2004 | Garfinkel | 370/392 |
| 6,681,331 B1 | 1/2004 | Munson et al. | 713/201 |
| 6,684,335 B1 | 1/2004 | Epstein, III et al. | 713/201 |
| 6,687,687 B1 | 2/2004 | Smadja | 707/2 |
| 6,687,732 B1 | 2/2004 | Bector et al. | 709/200 |
| 6,691,156 B1 | 2/2004 | Drummond et al. | 709/206 |
| 6,694,023 B1 | 2/2004 | Kim | 380/203 |
| 6,697,950 B1 | 2/2004 | Ko | 713/201 |
| 6,701,440 B1 | 3/2004 | Kim et al. | 713/201 |
| 6,704,874 B1 | 3/2004 | Porras et al. | 713/201 |
| 6,707,915 B1 | 3/2004 | Jobst et al. | 380/247 |
| 6,711,127 B1 | 3/2004 | Gorman et al. | 370/230 |
| 6,711,679 B1 | 3/2004 | Guski et al. | 713/156 |
| 6,715,082 B1 | 3/2004 | Chang et al. | 713/201 |
| 6,721,721 B1 | 4/2004 | Bates et al. | 707/1 |
| 6,725,223 B2 | 4/2004 | Abdo et al. | 1/1 |
| 6,725,377 B1 | 4/2004 | Kouznetsov | 713/201 |
| 6,728,886 B1 | 4/2004 | Ji et al. | 713/201 |
| 6,731,756 B1 | 5/2004 | Pizano et al. | 380/201 |
| 6,732,101 B1 | 5/2004 | Cook | 707/10 |
| 6,732,149 B1 | 5/2004 | Kephart | 709/206 |
| 6,732,157 B1 | 5/2004 | Gordon et al. | 709/206 |
| 6,735,700 B1 | 5/2004 | Flint et al. | 713/200 |
| 6,735,703 B1 | 5/2004 | Kilpatrick et al. | 713/201 |
| 6,738,462 B1 | 5/2004 | Brunson | 379/142.06 |
| 6,738,814 B1 | 5/2004 | Cox et al. | 709/225 |
| 6,738,932 B1 | 5/2004 | Price | 714/38 |
| 6,741,595 B2 | 5/2004 | Maher, III et al. | 370/392 |
| 6,742,015 B1 | 5/2004 | Bowman-Amuah | 709/101 |
| 6,742,124 B1 | 5/2004 | Kilpatrick et al. | 713/200 |
| 6,742,128 B1 | 5/2004 | Joiner | 713/201 |
| 6,745,192 B1 | 6/2004 | Libenzi | 707/100 |
| 6,748,531 B1 | 6/2004 | Epstein | 713/158 |
| 6,754,705 B2 | 6/2004 | Joiner et al. | 709/224 |
| 6,757,830 B1 | 6/2004 | Tarbotton et al. | 713/188 |
| 6,760,765 B1 | 7/2004 | Asai et al. | 709/226 |
| 6,760,845 B1 | 7/2004 | Cafarelli et al. | 713/201 |
| 6,766,450 B2 | 7/2004 | Micali | 713/158 |
| 6,768,991 B2 | 7/2004 | Hearnden | 707/5 |

| Patent No. | Date | Inventor | Class |
|---|---|---|---|
| 6,769,016 B2 | 7/2004 | Rothwell et al. | 709/206 |
| 6,772,334 B1 | 8/2004 | Glawitsch | 713/153 |
| 6,772,346 B1 | 8/2004 | Chess et al. | 713/201 |
| 6,775,657 B1 | 8/2004 | Baker | 706/45 |
| 6,775,704 B1 | 8/2004 | Watson et al. | 709/229 |
| 6,779,033 B1 | 8/2004 | Watson et al. | 709/227 |
| 6,782,503 B1 | 8/2004 | Dawson | 714/739 |
| 6,785,728 B1 | 8/2004 | Schneider et al. | 709/229 |
| 6,785,732 B1 | 8/2004 | Bates et al. | 709/232 |
| 6,785,818 B1 | 8/2004 | Sobel et al. | 713/200 |
| 6,789,202 B1 | 9/2004 | Ko et al. | 713/201 |
| 6,792,546 B1 | 9/2004 | Shanklin et al. | 713/201 |
| 6,799,197 B1 | 9/2004 | Shetty et al. | 709/203 |
| 6,802,002 B1 | 10/2004 | Corella | 713/175 |
| 6,804,237 B1 | 10/2004 | Luo et al. | 370/392 |
| 6,804,778 B1 | 10/2004 | Levi et al. | 713/176 |
| 6,804,783 B1 | 10/2004 | Wesinger, Jr. et al. | 713/200 |
| 6,826,698 B1 | 11/2004 | Minkin et al. | 713/201 |
| 6,842,860 B1 | 1/2005 | Branstad et al. | 713/170 |
| 6,842,861 B1 | 1/2005 | Cox et al. | 713/188 |
| 6,845,449 B1 | 1/2005 | Carman et al. | 713/170 |
| 6,847,888 B2 | 1/2005 | Fox et al. | 701/208 |
| 6,851,057 B1 | 2/2005 | Nachenberg | 713/200 |
| 6,859,793 B1 | 2/2005 | Lambiase | 705/59 |
| 6,862,581 B1 | 3/2005 | Lambiase | 705/51 |
| 6,870,849 B1 | 3/2005 | Callon et al. | 370/395.32 |
| 6,883,101 B1 | 4/2005 | Fox et al. | 713/201 |
| 6,892,178 B1 | 5/2005 | Zacharia | 705/10 |
| 6,892,179 B1 | 5/2005 | Zacharia | 705/10 |
| 6,892,237 B1 | 5/2005 | Gai et al. | 709/229 |
| 6,892,241 B2 | 5/2005 | Kouznetsov et al. | 709/229 |
| 6,895,385 B1 | 5/2005 | Zacharia et al. | 705/10 |
| 6,895,436 B1 | 5/2005 | Caillau et al. | 709/224 |
| 6,907,430 B2 | 6/2005 | Chong et al. | 707/100 |
| 6,909,205 B2 | 6/2005 | Corcoran et al. | 310/12.14 |
| 6,910,134 B1 | 6/2005 | Maher, III et al. | 713/200 |
| 6,910,135 B1 | 6/2005 | Grainger | 713/201 |
| 6,915,426 B1 | 7/2005 | Carman et al. | 713/168 |
| 6,922,776 B2 | 7/2005 | Cook et al. | 713/153 |
| 6,928,550 B1 | 8/2005 | Le Pennec et al. | 713/200 |
| 6,928,556 B2 | 8/2005 | Black et al. | 713/201 |
| 6,934,857 B1 | 8/2005 | Bartleson et al. | 713/201 |
| 6,941,348 B2 | 9/2005 | Petry et al. | 709/206 |
| 6,941,467 B2 | 9/2005 | Judge et al. | 713/200 |
| 6,944,673 B2 | 9/2005 | Malan et al. | 709/237 |
| 6,947,442 B1 | 9/2005 | Sato et al. | 370/392 |
| 6,947,936 B1 | 9/2005 | Suermondt et al. | 707/7 |
| 6,950,933 B1 | 9/2005 | Cook et al. | 713/158 |
| 6,952,776 B1 | 10/2005 | Chess | 713/188 |
| 6,954,775 B1 | 10/2005 | Shanklin et al. | 709/105 |
| 6,968,336 B1 | 11/2005 | Gupta | 707/100 |
| 6,968,461 B1 | 11/2005 | Lucas et al. | 713/200 |
| 6,971,019 B1 | 11/2005 | Nachenberg | 713/188 |
| 6,976,168 B1 | 12/2005 | Branstad et al. | 713/175 |
| 6,976,271 B1 | 12/2005 | Le Pennec et al. | 726/24 |
| 6,978,223 B2 | 12/2005 | Milliken | 702/182 |
| 6,981,146 B1 | 12/2005 | Sheymov | 713/189 |
| 6,981,158 B1 | 12/2005 | Sanchez et al. | 726/2 |
| 6,985,923 B1 | 1/2006 | Bates et al. | 709/206 |
| 6,993,660 B1 | 1/2006 | Libenzi et al. | 713/188 |
| 7,010,696 B1 | 3/2006 | Cambridge et al. | 713/188 |
| 7,055,173 B1 | 5/2006 | Chaganty et al. | 726/11 |
| 7,058,974 B1 | 6/2006 | Maher, III et al. | 726/13 |
| 7,080,000 B1 | 7/2006 | Cambridge | 703/21 |
| 7,085,934 B1 | 8/2006 | Edwards | 726/24 |
| 7,093,002 B2 | 8/2006 | Wolff et al. | 709/219 |
| 7,107,618 B1 | 9/2006 | Gordon et al. | 726/24 |
| 7,117,358 B2 | 10/2006 | Bandini et al. | 713/153 |
| 7,117,533 B1 | 10/2006 | Libenzi | 726/24 |
| 7,120,252 B1 | 10/2006 | Jones et al. | 380/201 |
| 7,127,743 B1 | 10/2006 | Khanolkar et al. | 726/23 |
| 7,134,141 B2 | 11/2006 | Crosbie et al. | 726/23 |
| 7,136,487 B1 | 11/2006 | Schon et al. | 380/229 |
| 7,150,042 B2 | 12/2006 | Wolff et al. | 726/22 |
| 7,159,237 B2 | 1/2007 | Schneier et al. | 726/3 |
| 7,181,015 B2 | 2/2007 | Matt | 380/279 |
| 7,213,260 B2 | 5/2007 | Judge | 726/3 |
| 7,222,157 B1 | 5/2007 | Sutton et al. | 709/206 |
| 7,225,255 B2 | 5/2007 | Favier et al. | 709/225 |
| 7,225,466 B2 | 5/2007 | Judge | 726/22 |
| 7,234,168 B2 | 6/2007 | Gupta et al. | 726/25 |
| 7,308,715 B2 | 12/2007 | Gupta et al. | 726/23 |
| 7,310,818 B1 | 12/2007 | Parish et al. | 726/24 |
| 7,328,349 B2 | 2/2008 | Milliken | 713/181 |
| 7,366,764 B1 | 4/2008 | Vollebregt | 709/207 |
| 7,409,714 B2 | 8/2008 | Gupta et al. | 726/23 |
| 7,458,098 B2 | 11/2008 | Judge et al. | 726/23 |
| 7,519,994 B2 | 4/2009 | Judge et al. | 726/22 |
| 7,533,272 B1 | 5/2009 | Gordon et al. | 713/188 |
| 7,624,274 B1 | 11/2009 | Alspector et al. | 713/176 |
| 7,693,945 B1 | 4/2010 | Dulitz et al. | 709/206 |
| 2001/0005889 A1 | 6/2001 | Albrecht | 713/201 |
| 2001/0009580 A1 | 7/2001 | Ikeda | 380/201 |
| 2001/0011308 A1 | 8/2001 | Clark et al. | 710/20 |
| 2001/0034839 A1 | 10/2001 | Karjoth et al. | 713/190 |
| 2001/0039579 A1 | 11/2001 | Trcka et al. | 709/224 |
| 2001/0049793 A1 | 12/2001 | Sugimoto | 713/200 |
| 2002/0001384 A1 | 1/2002 | Buer et al. | 380/30 |
| 2002/0004902 A1 | 1/2002 | Toh et al. | 713/170 |
| 2002/0016826 A1 | 2/2002 | Johansson et al. | 709/207 |
| 2002/0016910 A1 | 2/2002 | Wright et al. | 713/150 |
| 2002/0019945 A1 | 2/2002 | Houston et al. | 713/201 |
| 2002/0023140 A1 | 2/2002 | Hile et al. | 709/217 |
| 2002/0026591 A1 | 2/2002 | Hartley et al. | 713/201 |
| 2002/0032860 A1 | 3/2002 | Wheeler et al. | 713/170 |
| 2002/0032871 A1 | 3/2002 | Malan et al. | 713/201 |
| 2002/0035683 A1 | 3/2002 | Kaashoek et al. | 713/154 |
| 2002/0038339 A1 | 3/2002 | Xu | 709/203 |
| 2002/0042876 A1 | 4/2002 | Smith | 713/155 |
| 2002/0042877 A1 | 4/2002 | Wheeler et al. | 713/155 |
| 2002/0046041 A1 | 4/2002 | Lang | 705/1 |
| 2002/0049853 A1 | 4/2002 | Chu et al. | 709/237 |
| 2002/0069263 A1 | 6/2002 | Sears et al. | 709/218 |
| 2002/0071438 A1 | 6/2002 | Singh | 370/398 |
| 2002/0078381 A1 | 6/2002 | Farley et al. | 713/201 |
| 2002/0078382 A1 | 6/2002 | Sheikh et al. | 713/201 |
| 2002/0080888 A1 | 6/2002 | Shu et al. | 375/295 |
| 2002/0083033 A1 | 6/2002 | Abdo et al. | 707/1 |
| 2002/0083342 A1 | 6/2002 | Webb et al. | 713/201 |
| 2002/0083343 A1 | 6/2002 | Crosbie et al. | 713/201 |
| 2002/0087882 A1 | 7/2002 | Schneier et al. | 713/201 |
| 2002/0091697 A1 | 7/2002 | Huang et al. | 707/10 |
| 2002/0091757 A1 | 7/2002 | Cuomo et al. | 709/203 |
| 2002/0095492 A1 | 7/2002 | Kaashoek et al. | 709/224 |
| 2002/0107853 A1 | 8/2002 | Hofmann et al. | 707/7 |
| 2002/0112008 A1 | 8/2002 | Christenson et al. | 709/206 |
| 2002/0112168 A1 | 8/2002 | Filipi-Martin et al. | 713/183 |
| 2002/0112185 A1 | 8/2002 | Hodges | 713/201 |
| 2002/0116463 A1 | 8/2002 | Hart | 709/206 |
| 2002/0116627 A1 | 8/2002 | Tarbotton et al. | 713/200 |
| 2002/0120705 A1 | 8/2002 | Schiavone et al. | 709/207 |
| 2002/0120853 A1 | 8/2002 | Tyree | 713/188 |
| 2002/0120874 A1 | 8/2002 | Shu et al. | 713/201 |
| 2002/0129002 A1 | 9/2002 | Alberts et al. | 707/1 |
| 2002/0129277 A1 | 9/2002 | Caccavale | 713/201 |
| 2002/0133365 A1 | 9/2002 | Grey et al. | 705/1 |
| 2002/0133586 A1 | 9/2002 | Shanklin et al. | 709/224 |
| 2002/0138416 A1 | 9/2002 | Lovejoy et al. | 705/38 |
| 2002/0138755 A1 | 9/2002 | Ko | 713/201 |
| 2002/0138759 A1 | 9/2002 | Dutta | 713/201 |
| 2002/0138762 A1 | 9/2002 | Horne | 713/201 |
| 2002/0143963 A1 | 10/2002 | Converse et al. | 709/229 |
| 2002/0147734 A1 | 10/2002 | Shoup et al. | 707/200 |
| 2002/0147780 A1 | 10/2002 | Liu et al. | 709/206 |
| 2002/0147915 A1 | 10/2002 | Chefalas et al. | 713/188 |
| 2002/0147925 A1 | 10/2002 | Lingafelt et al. | 713/201 |
| 2002/0152399 A1 | 10/2002 | Smith | 713/200 |
| 2002/0161718 A1 | 10/2002 | Coley et al. | 705/59 |
| 2002/0165971 A1 | 11/2002 | Baron | 709/228 |
| 2002/0169954 A1 | 11/2002 | Bandini et al. | 713/153 |
| 2002/0172367 A1 | 11/2002 | Mulder et al. | 380/277 |
| 2002/0174358 A1 | 11/2002 | Wolff et al. | 713/200 |
| 2002/0178227 A1 | 11/2002 | Matsa et al. | 709/206 |
| 2002/0178383 A1 | 11/2002 | Hrabik et al. | 713/201 |
| 2002/0181703 A1 | 12/2002 | Logan et al. | 380/30 |
| 2002/0186698 A1 | 12/2002 | Ceniza | 370/401 |
| 2002/0188864 A1 | 12/2002 | Jackson | 713/201 |
| 2002/0194161 A1 | 12/2002 | McNamee et al. | 707/2 |

| | | | | | | | |
|---|---|---|---|---|---|---|---|
| 2002/0194469 A1 | 12/2002 | Dominique et al. | 713/150 | 2003/0172120 A1 | 9/2003 | Tomkow et al. | 709/206 |
| 2002/0194490 A1 | 12/2002 | Halperin et al. | 713/200 | 2003/0172166 A1 | 9/2003 | Judge et al. | 709/229 |
| 2002/0199095 A1 | 12/2002 | Bandini et al. | 713/151 | 2003/0172167 A1 | 9/2003 | Judge et al. | 709/229 |
| 2003/0004688 A1 | 1/2003 | Gupta et al. | 702/188 | 2003/0172289 A1 | 9/2003 | Soppera | 726/13 |
| 2003/0004689 A1 | 1/2003 | Gupta et al. | 702/188 | 2003/0172291 A1 | 9/2003 | Judge et al. | 713/200 |
| 2003/0005326 A1 | 1/2003 | Flemming | 713/201 | 2003/0172292 A1 | 9/2003 | Judge | 713/200 |
| 2003/0009554 A1 | 1/2003 | Burch et al. | 709/224 | 2003/0172294 A1 | 9/2003 | Judge | 713/200 |
| 2003/0009693 A1 | 1/2003 | Brock et al. | 713/201 | 2003/0172301 A1 | 9/2003 | Judge et al. | 713/201 |
| 2003/0009696 A1 | 1/2003 | Bunker et al. | 713/201 | 2003/0172302 A1 | 9/2003 | Judge et al. | 713/201 |
| 2003/0009698 A1 | 1/2003 | Lindeman et al. | 713/201 | 2003/0187996 A1 | 10/2003 | Cardina et al. | 709/228 |
| 2003/0009699 A1 | 1/2003 | Gupta et al. | 713/201 | 2003/0212791 A1 | 11/2003 | Pickup | 709/225 |
| 2003/0014662 A1 | 1/2003 | Gupta et al. | 713/200 | 2003/0233328 A1 | 12/2003 | Scott et al. | 705/50 |
| 2003/0014664 A1 | 1/2003 | Hentunen | 713/200 | 2003/0236845 A1 | 12/2003 | Pitsos | 709/206 |
| 2003/0021280 A1 | 1/2003 | Makinson et al. | 370/401 | 2004/0015554 A1 | 1/2004 | Wilson | 709/206 |
| 2003/0023692 A1 | 1/2003 | Moroo | 709/206 | 2004/0025044 A1 | 2/2004 | Day | 713/200 |
| 2003/0023695 A1 | 1/2003 | Kobata et al. | 709/206 | 2004/0054886 A1 | 3/2004 | Dickinson, III et al. | 713/153 |
| 2003/0023873 A1 | 1/2003 | Ben-Itzhak | 713/201 | 2004/0058673 A1 | 3/2004 | Irlam et al. | 455/412.1 |
| 2003/0023874 A1 | 1/2003 | Prokupets et al. | 713/201 | 2004/0059811 A1 | 3/2004 | Sugauchi et al. | 709/224 |
| 2003/0023875 A1 | 1/2003 | Hursey et al. | 713/201 | 2004/0083384 A1 | 4/2004 | Hypponen | 713/200 |
| 2003/0028803 A1 | 2/2003 | Bunker et al. | 713/201 | 2004/0088570 A1 | 5/2004 | Roberts et al. | 713/201 |
| 2003/0033516 A1 | 2/2003 | Howard et al. | 713/152 | 2004/0103315 A1 | 5/2004 | Cooper et al. | 726/25 |
| 2003/0033542 A1 | 2/2003 | Goseva-Popstojanova et al. | 713/201 | 2004/0111531 A1 | 6/2004 | Staniford et al. | 709/246 |
| 2003/0037141 A1 | 2/2003 | Milo et al. | 709/225 | 2004/0139160 A1 | 7/2004 | Wallace et al. | 709/206 |
| 2003/0041263 A1 | 2/2003 | Devine et al. | 713/201 | 2004/0139334 A1 | 7/2004 | Wiseman | 713/188 |
| 2003/0041264 A1 | 2/2003 | Black et al. | 713/201 | 2004/0143763 A1 | 7/2004 | Radatti | 713/201 |
| 2003/0046421 A1 | 3/2003 | Horvitz et al. | 709/238 | 2004/0167968 A1 | 8/2004 | Wilson et al. | 709/207 |
| 2003/0051026 A1 | 3/2003 | Carter et al. | 709/224 | 2004/0177120 A1 | 9/2004 | Kirsch | 709/206 |
| 2003/0051163 A1 | 3/2003 | Bidaud | 713/201 | 2004/0181462 A1 | 9/2004 | Bauer et al. | 705/26.1 |
| 2003/0051168 A1 | 3/2003 | King et al. | 713/201 | 2004/0193482 A1 | 9/2004 | Hoffman et al. | 705/14 |
| 2003/0055931 A1 | 3/2003 | Cravo De Almeida et al. | 709/223 | 2004/0203593 A1 | 10/2004 | Wang et al. | 455/410 |
| | | | | 2004/0205135 A1 | 10/2004 | Hallam-Baker | 709/206 |
| 2003/0061502 A1 | 3/2003 | Teblyashkin et al. | 726/24 | 2004/0221062 A1 | 11/2004 | Starbuck et al. | 709/246 |
| 2003/0061506 A1 | 3/2003 | Cooper et al. | 713/201 | 2004/0236884 A1 | 11/2004 | Beetz | 710/68 |
| 2003/0065791 A1 | 4/2003 | Garg et al. | 709/229 | 2004/0267893 A1 | 12/2004 | Lin | 709/207 |
| 2003/0065943 A1 | 4/2003 | Geis et al. | 713/201 | 2005/0014749 A1 | 1/2005 | Chen et al. | 514/227.5 |
| 2003/0084020 A1 | 5/2003 | Shu | 707/1 | 2005/0021738 A1 | 1/2005 | Goeller et al. | 709/224 |
| 2003/0084280 A1 | 5/2003 | Bryan et al. | 713/153 | 2005/0043936 A1 | 2/2005 | Corston-Oliver et al. | 704/4 |
| 2003/0084320 A1 | 5/2003 | Tarquini et al. | 726/25 | 2005/0052998 A1 | 3/2005 | Oliver et al. | 370/231 |
| 2003/0084323 A1 | 5/2003 | Gales | 726/23 | 2005/0058129 A1 | 3/2005 | Jones et al. | 370/389 |
| 2003/0084347 A1 | 5/2003 | Luzzatto | 726/15 | 2005/0065810 A1 | 3/2005 | Bouron | 705/1 |
| 2003/0088680 A1 | 5/2003 | Nachenberg et al. | 709/229 | 2005/0081059 A1 | 4/2005 | Bandini et al. | 726/4 |
| 2003/0088792 A1 | 5/2003 | Card et al. | 713/201 | 2005/0086526 A1 | 4/2005 | Aguirre | 713/201 |
| 2003/0093667 A1 | 5/2003 | Dutta et al. | 713/161 | 2005/0102366 A1 | 5/2005 | Kirsch | 709/207 |
| 2003/0093695 A1 | 5/2003 | Dutta | 713/201 | 2005/0188045 A1 | 8/2005 | Katsikas | 709/206 |
| 2003/0093696 A1 | 5/2003 | Sugimoto | 713/201 | 2005/0204159 A1 | 9/2005 | Davis et al. | 726/5 |
| 2003/0095555 A1 | 5/2003 | McNamara et al. | 370/401 | 2005/0235360 A1 | 10/2005 | Pearson | 726/23 |
| 2003/0097439 A1 | 5/2003 | Strayer et al. | 709/224 | 2005/0262209 A1 | 11/2005 | Yu | 709/206 |
| 2003/0097564 A1 | 5/2003 | Tewari et al. | 713/171 | 2005/0262210 A1 | 11/2005 | Yu | 709/206 |
| 2003/0101381 A1* | 5/2003 | Mateev et al. | 714/38 | 2006/0036693 A1 | 2/2006 | Hulten et al. | 709/206 |
| 2003/0105827 A1 | 6/2003 | Tan et al. | 709/206 | 2006/0036727 A1 | 2/2006 | Kurapati et al. | 709/224 |
| 2003/0105859 A1 | 6/2003 | Garnett et al. | 709/224 | 2006/0042483 A1 | 3/2006 | Work et al. | 101/91 |
| 2003/0105976 A1 | 6/2003 | Copeland, III | 713/201 | 2006/0047794 A1 | 3/2006 | Jezierski | 709/221 |
| 2003/0110392 A1 | 6/2003 | Aucsmith et al. | 713/200 | 2006/0095404 A1 | 5/2006 | Adelman et al. | 707/3 |
| 2003/0110393 A1 | 6/2003 | Brock et al. | 726/23 | 2006/0095966 A1 | 5/2006 | Park | 726/22 |
| 2003/0110396 A1 | 6/2003 | Lewis et al. | 713/201 | 2006/0123083 A1 | 6/2006 | Goutte et al. | 709/206 |
| 2003/0115485 A1 | 6/2003 | Milliken | 713/201 | 2006/0168006 A1 | 7/2006 | Shannon et al. | 709/206 |
| 2003/0115486 A1 | 6/2003 | Choi et al. | 713/201 | 2006/0168017 A1 | 7/2006 | Stern et al. | 709/206 |
| 2003/0120604 A1 | 6/2003 | Yokota et al. | 705/57 | 2006/0212925 A1 | 9/2006 | Shull et al. | 726/1 |
| 2003/0120647 A1 | 6/2003 | Aiken et al. | 1/1 | 2006/0212930 A1 | 9/2006 | Shull et al. | 726/10 |
| 2003/0123665 A1 | 7/2003 | Dunstan et al. | 380/255 | 2006/0212931 A1 | 9/2006 | Shull et al. | 726/10 |
| 2003/0126464 A1 | 7/2003 | McDaniel et al. | 713/201 | 2006/0230039 A1 | 10/2006 | Shull et al. | 707/6 |
| 2003/0126472 A1 | 7/2003 | Banzhof | 713/201 | 2006/0253458 A1 | 11/2006 | Dixon et al. | 707/10 |
| 2003/0135749 A1 | 7/2003 | Gales et al. | 713/200 | 2006/0259551 A1 | 11/2006 | Caldwell, Jr. | 709/204 |
| 2003/0140137 A1 | 7/2003 | Joiner et al. | 709/224 | 2008/0060075 A1 | 3/2008 | Cox et al. | 726/24 |
| 2003/0140250 A1 | 7/2003 | Taninaka et al. | 713/201 | 2009/0064329 A1 | 3/2009 | Okumura et al. | 726/22 |
| 2003/0145212 A1 | 7/2003 | Crumly | 713/186 | 2009/0083413 A1 | 3/2009 | Levow et al. | 709/224 |
| 2003/0145225 A1 | 7/2003 | Bruton, III et al. | 713/201 | 2010/0017487 A1 | 1/2010 | Patinkin | 709/206 |
| 2003/0145226 A1 | 7/2003 | Bruton, III et al. | 713/201 | 2010/0049848 A1 | 2/2010 | Levow et al. | 709/224 |
| 2003/0145232 A1 | 7/2003 | Poletto et al. | 726/22 | | | | |
| 2003/0149887 A1 | 8/2003 | Yadav | 713/200 | | | | |
| 2003/0149888 A1 | 8/2003 | Yadav | 713/200 | | | | |
| 2003/0154393 A1 | 8/2003 | Young | 713/200 | | | | |
| 2003/0154399 A1 | 8/2003 | Zuk et al. | 713/201 | | | | |
| 2003/0154402 A1 | 8/2003 | Pandit et al. | 713/201 | | | | |
| 2003/0158905 A1 | 8/2003 | Petry et al. | 709/206 | | | | |
| 2003/0159069 A1 | 8/2003 | Choi et al. | 713/201 | | | | |
| 2003/0159070 A1 | 8/2003 | Mayer et al. | 713/201 | | | | |
| 2003/0167402 A1 | 9/2003 | Stolfo et al. | 726/23 | | | | |

FOREIGN PATENT DOCUMENTS

| | | |
|---|---|---|
| WO | WO0028420 | 5/2000 |
| WO | WO0155927 | 8/2001 |
| WO | WO0173523 | 10/2001 |
| WO | WO02101516 | 12/2002 |

OTHER PUBLICATIONS

Office Action from U.S. Appl. No. 12/762,368 which was mailed on Oct. 13, 2011.

Paul Graham; A Plan for Spam; http://www.paulgraham.com/spam.html; Aug. 2002; pp. 1-11.
Paul Vixie; Distributed Checksum Clearninghouse; Rhyolite Software; http://www.rhyolite.com/anti-spam/dcc/dcc-tree/dcc.html; Aug. 26, 2002; pp. 1-9.
RFC #1123; R. Braden; Requirements for Internet Hosts—Application and Support; Oct. 1989; pp. 1-97.
RFC #2045; N. Freed et al.; Multipurpose Internet Mail Extensions (MIME) Part One: Format of Internet Message Bodies; Nov. 1996; pp. 1-29.
RFC #2046; N. Freed et al.; Multipurpose Internet Mail Extensions (MIME) Part Two: Media Types; Nov. 1996; pp. 1-19.
RFC #2047; K. Moore; MIME (Multipurpose Internet Mail Extensions) Part Three: Message Header Extensions for Non-ASCII Text); Nov. 1996; pp. 1-15.
RFC #2048; N. Freed et al.; Multipurpose Internet Mail Extensions (MIME) Part Four: Registration Procedures; Nov. 1996; pp. 1-20.
RFC #2049; N. Freed et al.; Multipurpose Internet Mail Extensions MIME) Part Five: Conformance Criteria and Examples; Nov. 1996; pp. 1-23.
RFC #2231; N. Freed et al.; MIME Parameter Value and Encoded Word Extensions: Character Sets, Languages, and Continuations; Nov. 1997; pp. 1-10.
RFC #822; David H. Crocker; Standard for the Format of ARPA Internet Text Message; Aug. 13, 1982; pp. 1-49.
S. Staniford-Chen, and L. Todd Herberlein; "Holding Intruders Accountable on the Internet"; Proceedsings of the 1995 IEEE Symposium on Security and Privacy; Oakland, CA, pp. 39-49, May 8-10, 1995.
Savage et al., "Practical Network Support for IP Traceback," Department of Computer Science and Engineering, University of Washington, (2000).
Schwartz et al., "Smart Packets: Applying Active Networks to Network Management," ACM Transaction on Computer Systems, 18(1):67-88, (2000).
Skipper, Chad, "Polymorphism and IDS," Symantec, (2001).
Todd Heberlein; "Worm Detection and Prevention: Concept, Approach, and Experience"; Net Squared, Inc.; http://www.attackcenter.com/Information/WhitePapers/WormDetect/; Aug. 14, 2002; pp. 1-7.
International Search Report for PCT/US2004/028896 mailed on Dec. 13, 2004.
Bace, Rebecca Gurley, "Intrusion Detection—Technology Series"—Copyright 2000 by MacMillan Technical Publishing.
Amoroso, Edward G., "Intrusion Detection—An Introduction to Surveillance, Correlation, Traps, Trace Back, and Response." AT&T Laboratories, First Edition.—Copyright 1999 by AT&T, Inc.
Jackson, Kathleen, DuBois, David H., and Stallings, Cathy A., "A Phased Approach to Network Intrusion Detection," 14th National Computing Security Conference, 1991.
Paxson, Vern, "Bro: A System for Detecting Network Intruders in Real-Time," Proceedings of The 7th USENIX Security Symposium, San Antonio, TX, 1998.
Snapp, Steven R, Brentano, James, Dias, Gihan V., Goan, Terrance L., Heberlein, L. Todd, Ho, Che-Lin, Levitt, Karl N., Mukherjee, Biswanath, Smaha, Stephen E., Grance, Tim, Teal, Daniel M. and Mansur, Doug, "DIDS (Distributed Intrusion Detection System)—Motivation, Architecture, and An Early Prototype," The 14th National Computer Security Conference, Oct. 1991, pp. 167-176.

US App No. 00-4039CIP3.
U.S. Appl. No. 09/881,074, filed Jun. 14, 2001.
U.S. Appl. No. 09/881,145, filed Jun. 14, 2001.
U.S. Appl. No. 10/251,403, filed Sep. 20, 2002.
US App No. Frentz Jan. 14, 2003.
Notice of Allowance from U.S. Appl. No. 09/881,074 which was mailed on Jan. 6, 2005.
Notice of Allowance from U.S. Appl. No. 10/251,403 which was mailed on Aug. 10, 2007.
Office Action from U.S. Appl. No. 09/881,145 which was mailed on Nov. 30, 2006.
Office Action from U.S. Appl. No. 09/881,145 which was mailed on Apr. 20, 2005.
Office Action from U.S. Appl. No. 09/881,145 which was mailed on Aug. 16, 2007.
Office Action from U.S. Appl. No. 10/251,403 which was mailed on Dec. 8, 2006.
Office Action from U.S. Appl. No. 10/251,403 which was mailed on Apr. 25, 2006.
Office Action from U.S. Appl. No. 10/654,771 which was mailed on Jan. 13, 2011.
Office Action from U.S. Appl. No. 10/654,771 which was mailed on Dec. 11, 2008.
Office Action from U.S. Appl. No. 10/654,771 which was mailed on Jul. 22, 2010.
Office Action from U.S. Appl. No. 12/243,778 which was mailed on Oct. 7, 2010.
Office Action from U.S. Appl. No. 12/248,790 which was mailed on Feb. 11, 2010.
Office Action from U.S. Appl. No. 12/248,790 which was mailed on May 27, 2010.
Office Action from U.S. Appl. No. 12/243,785 which was mailed on Sep. 1, 2010.
Office Action from U.S. Appl. No. 12/243,785 which was mailed on Mar. 30, 2011.
Office Action from U.S. Appl. No. 12/249,803 which was mailed on Oct. 19, 2010.
Office Action from U.S. Appl. No. 12/249,803 which was mailed on Mar. 10, 2011.
Office Action from U.S. Appl. No. 12/249,804 which was mailed on Apr. 20, 2011.
Office Action from U.S. Appl. No. 12/249,804 which was mailed on Aug. 30, 2010.
Office Action from U.S. Appl. No. 12/249,823 which was mailed on Dec. 1, 2010.
Office Action from U.S. Appl. No. 12/249,832 which was mailed on Oct. 12, 2010.
Office Action from U.S. Appl. No. 12/762,365 which was mailed on Dec. 14, 2010.
Office Action from U.S. Appl. No. 12/762,366 which was mailed on Nov. 10, 2010.
Notice of Allowance from U.S. Appl. No. 12/248,790 which was mailed on Feb. 2, 2012.
Office Action from U.S. Appl. No. 12/762,368 which was mailed on Feb. 23, 2012.
US 5,373,559, 12/1994, Kaufman et al. (withdrawn)

* cited by examiner

| 314 | 322 | 332 | 334 |
|---|---|---|---|
| HASH ADDRESS | COUNTER | LINK ID | STATUS |
| HASH ADDRESS | COUNTER | LINK ID | STATUS |
| HASH ADDRESS | COUNTER | LINK ID | STATUS |
| HASH ADDRESS | COUNTER | LINK ID | STATUS |
| HASH ADDRESS | COUNTER | LINK ID | STATUS |

| HASH ADDRESS | INDICATOR FIELD | COUNTER | LINK ID | STATUS |
|---|---|---|---|---|
| HASH ADDRESS | INDICATOR FIELD | COUNTER | LINK ID | STATUS |
| HASH ADDRESS | INDICATOR FIELD | COUNTER | LINK ID | STATUS |
| HASH ADDRESS | INDICATOR FIELD | COUNTER | LINK ID | STATUS |
| ... | ... | ... | ... | ... |
| HASH ADDRESS | INDICATOR FIELD | COUNTER | LINK ID | STATUS |

| ADDRESS | INDICATOR BIT | TIME | LINK ID | STATUS |
|---|---|---|---|---|
| E(0) | 1 | T2 | 001 | |
| E(1) | 0 | | | |
| E(2) | 1 | T1 | 001 | |
| E(3) | 0 | | | |
| E(4) | 0 | | | |
| ⋮ | --- | --- | --- | |
| ⋮ | --- | --- | --- | |
| ⋮ | --- | --- | --- | |
| E(n) | 1 | T3 | 002 | |

R(2)

| E(0) | 1 | T1 | 004 | |
|---|---|---|---|---|
| E(n) | 1 | T2 | 004 | |

R(n)

| E(0) | 1 | T1 | 004 | |
|---|---|---|---|---|
| E(n) | 1 | T2 | 004 | |

Target ID:
Time:
Source:

| NODE ID | LINK | NODE RESPONSE | NODE TIME | TRANS-FORMED | STATUS |
|---|---|---|---|---|---|
| 01 | 001 | YES | 01:00:40.000 | NO | OFF |
| 02 | 002 | YES | 01:00:40.200 | NO | OFF |
| 03 | 003 | NO | | | ON |
| 04 | 004 | YES | 01:00:41.000 | YES | OFF |
| 04 | 004 | YES | 01:00:41.005 | YES | OFF |
| ● | --- | --- | --- | --- | --- |
| ● | --- | --- | --- | --- | --- |
| ● | --- | --- | --- | --- | --- |
| n | 006 | NO | | | ON |

FIG. 12

HASH-BASED SYSTEMS AND METHODS FOR DETECTING AND PREVENTING TRANSMISSION OF POLYMORPHIC NETWORK WORMS AND VIRUSES

RELATED APPLICATIONS

This application is a continuation of U.S. patent application Ser. No. 12/249,823, filed Oct. 10, 2008, which, in turn, is a continuation of U.S. patent application Ser. No. 10/654, 771, filed Sep. 4, 2003, which, in turn, claims priority under 35 U.S.C. §119 based on U.S. Provisional Application No. 60/407,975, filed Sep. 5, 2002, all of which are incorporated herein by reference. U.S. patent application Ser. No. 10/654, 771 is also a continuation-in-part of U.S. patent application Ser. No. 10/251,403, filed Sep. 20, 2002, now U.S. Pat. No. 7,328,349, which claims priority under 35 U.S.C. §119 based on U.S. Provisional Application No. 60/341,462, filed Dec. 14, 2001, both of which are incorporated herein by reference. U.S. patent application Ser. No. 10/654,771 is also a continuation-in-part of U.S. patent application Ser. No. 09/881,145, and U.S. patent application Ser. No. 09/881,074, now U.S. Pat. No. 6,981,158, both of which were filed on Jun. 14, 2001, and both of which claim priority under 35 U.S.C §119 based on U.S. Provisional Application No. 60/212,425, filed Jun. 19, 2000, all of which are incorporated herein by reference.

BACKGROUND OF THE INVENTION

1. Field of the Invention

The present invention relates generally to network security and, more particularly, to systems and methods for detecting and/or preventing the transmission of malicious packets, such as polymorphic worms and viruses.

2. Description of Related Art

Availability of low cost computers, high speed networking products, and readily available network connections has helped fuel the proliferation of the Internet. This proliferation has caused the Internet to become an essential tool for both the business community and private individuals. Dependence on the Internet arises, in part, because the Internet makes it possible for multitudes of users to access vast amounts of information and perform remote transactions expeditiously and efficiently. Along with the rapid growth of the Internet have come problems caused by malicious individuals or pranksters launching attacks from within the network. As the size of the Internet continues to grow, so does the threat posed by these individuals.

The ever-increasing number of computers, routers, and connections making up the Internet increases the number of vulnerable points from which these malicious individuals can launch attacks. These attacks can be focused on the Internet as a whole or on specific devices, such as hosts or computers, connected to the network. In fact, each router, switch, or computer connected to the Internet may be a potential entry point from which a malicious individual can launch an attack while remaining largely undetected. Attacks carried out on the Internet often consist of malicious packets being injected into the network. Malicious packets can be injected directly into the network by a computer, or a device attached to the network, such as a router or switch, can be compromised and configured to place malicious packets onto the network.

One particularly troublesome type of attack is a self-replicating network-transferred computer program, such as a virus or worm, that is designed to annoy network users, deny network service by overloading the network, or damage target computers (e.g., by deleting files). A virus is a program that infects a computer or device by attaching itself to another program and propagating itself when that program is executed, possibly destroying files or wiping out memory devices. A worm, on the other hand, is a program that can make copies of itself and spread itself through connected systems, using up resources in affected computers or causing other damage.

Various defenses, such as e-mail filters, anti-virus programs, and firewall mechanisms, have been employed against viruses and worms. Unfortunately, many viruses and worms are polymorphic. Polymorphic viruses and worms include viruses and worms that deliberately have a different set of bytes in each copy, as opposed to being substantially similar in each copy, to make them difficult to detect. Detection techniques based on byte sequence comparison, including older virus-detection techniques, may be generally ineffective in detecting polymorphic viruses and worms.

Accordingly, there is a need for new defenses to thwart the attack of polymorphic viruses and worms.

SUMMARY OF THE INVENTION

Systems and methods consistent with the present invention address these and other needs by providing a new defense that attacks malicious packets, such as polymorphic viruses and worms, at their most common denominator (i.e., the need to transfer a copy of their code over a network to multiple target systems).

In accordance with an aspect of the invention as embodied and broadly described herein, a method for detecting transmission of potentially malicious packets is provided. The method includes receiving packets; generating hash values based on variable-sized blocks of the received packets; comparing the generated hash values to hash values associated with prior packets; and determining that one of the received packets is a potentially malicious packet when one or more of the generated hash values associated with the received packet match one or more of the hash values associated with the prior packets.

In accordance with another aspect of the invention, a system for hampering transmission of potentially malicious packets is provided. The system includes means for observing packets, means for generating hash values based on variable-sized blocks of the observed packets, and means for comparing the generated hash values to hash values corresponding to prior packets. The system further includes means for identifying one of the observed packets as a potentially malicious packet when the generated hash values corresponding to the observed packet match the hash values corresponding to the prior packets, and means for hampering transmission of the observed packet when the observed packet is identified as a potentially malicious packet.

In accordance with yet another aspect of the invention, a device for detecting transmission of malicious packets is provided. The device includes a hash memory and a hash processor. The hash memory is configured to store information associated with hash values corresponding to prior packets. The hash processor is configured to observe a packet and generate one or more hash values based on variable-sized blocks of the packet. The hash processor is further configured to compare the one or more generated hash values to the hash values corresponding to the prior packets and identify the packet as a potentially malicious packet when a predetermined number of the one or more generated hash values match the hash values corresponding to the prior packets.

In accordance with a further aspect of the invention, a method for detecting transmission of a potentially malicious packet is provided. The method includes receiving a packet, selecting blocks of received packet of random block sizes, and performing multiple different hash functions on each of the blocks to generate multiple hash values. The method further includes comparing the generated hash values to hash values associated with prior packets, and identifying the received packet as a potentially malicious packet when one or more of the generated hash values correspond to one or more of the hash values associated with the prior packets.

In accordance with another aspect of the invention, a method for detecting transmission of a potentially malicious packet is provided. The method includes receiving a packet, selecting multiple blocks of the received packet of different block sizes, and performing a different hash function on each of the blocks to generate multiple hash values. The method further includes comparing the generated hash values to hash values associated with prior packets, and identifying the received packet as a potentially malicious packet when one or more of the generated hash values correspond to one or more of the hash values associated with the prior packets.

In accordance with yet another aspect of the invention, a method for detecting files suspected of containing a virus or worm on a computer is provided. The method includes receiving one or more first hash values associated with the virus or worm, hashing one or more variable-sized portions of the files to generate second hash values, comparing the second hash values to the one or more first hash values, and identifying one of the files as a file suspected of containing the virus or worm when one or more of the second hash values correspond to at least one of the one or more first hash values.

BRIEF DESCRIPTION OF THE DRAWINGS

The accompanying drawings, which are incorporated in and constitute a part of this specification, illustrate the invention and, together with the description, explain the invention. In the drawings.

FIGS. 3A-3E illustrate possible data structures that may be used within the hash memory of FIG. 2 in implementations consistent with the principles of the invention;

FIG. 11 is a schematic diagram of an exemplary data structure for storing information useable in conjunction with source path isolation techniques.

FIG. 12 is a schematic diagram of an exemplary data structure for storing information in a source path isolation server for use in performing source path isolation techniques;

DETAILED DESCRIPTION

Figure 1:
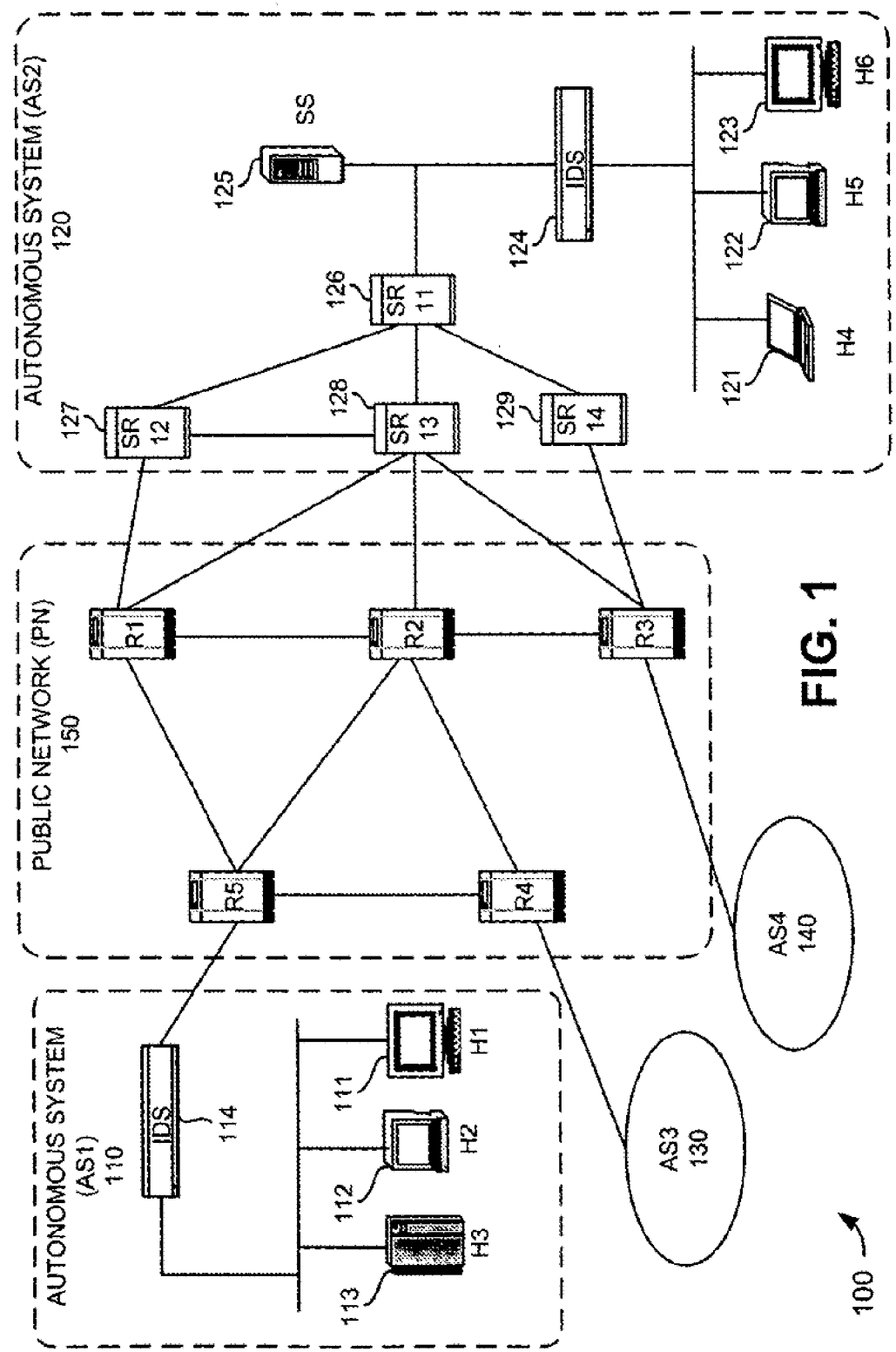
FIG. 1 is a diagram of a system in which systems and methods consistent with the present invention may be implemented.

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide mechanisms to detect and/or prevent the transmission of malicious packets. Malicious packets, as used herein, may include polymorphic viruses and worms, but may also apply to non-polymorphic viruses and worms and possibly other types of data with duplicated content, such as illegal mass e-mail (e.g., spam), that are repeatedly transmitted through a network.

Polymorphic viruses and worms are generally composed of two pieces: an obscured payload (which contains the majority of the virus/worm), and a decoding bootstrap that must be initially executable by the victim machine "as is," and turns the obscured payload into the executable remainder of the virus/worm. The design of the polymorphic viruses and worms are such that the contents of the obscured payload are essentially undetectable (e.g., by strong encryption), leaving two basic ways to detect the virus/worm: (1) detect it after the decoding bootstrap has run, which is a technique employed by many of today's virus detection software; and (2) detect the decoding bootstrap in a manner consistent with the principles of the invention.

While the decoding bootstrap must be executable by the target machine, it does not have to be the exact same code for every copy of the virus/worm. In other words, it can be made arbitrarily variable, as long as the effect of executing it results in the decoding of the obscured payload.

The most sophisticated polymorphic viruses/worms employ techniques, such as the interspersal of "no-ops" or other code that does not affect the decoding process, but adds to the variability of the byte string making up the decoder bootstrap. Another technique includes changing details of instructions in the actual decoder code, such as changing which registers are employed by the decoding code, or stringing small code fragments together with "branch" or "jump" instructions, allowing the execution sequence of the instructions to be relatively independent of the sequence of bytes making up the decoder bootstrap. "Dead" code, or gibberish bytes, can also be inserted between active code segments strung together this way.

Thus, detecting the decoder bootstrap of a polymorphic virus/worm is a very difficult task. It is most difficult when only one copy of the virus/worm is examined. When many potential copies of the virus/worm can be observed, however, certain similarities between various copies will eventually emerge, because there are only a finite set of transformations that the decoding bootstrap can be put through and still function properly. This opens up the opportunity to detect such viruses/worms in places where many copies can be observed over time, such as in the network nodes (and links) through which they propagate.

Another vulnerability to detection that some e-mail-based viruses/worms have is that they require user interaction with the message carrying the virus/worm in order to be executed. Thus, they are often accompanied by a text message in the body of the e-mail that is designed to entice the user into performing the necessary action to execute the virus/worm (usually opening a file attached to the e-mail message). A polymorphic virus/worm could relatively easily change the e-mail text used in minor ways, but to make substantial changes would likely render the message incoherent to the receiver and, thus, either make him suspicious or unlikely to perform the action needed for the virus/worm to execute. Systems and methods consistent with the principles of the invention can also detect the text of the e-mail message as possibly related to a virus/worm attack.

Systems and methods consistent with the principles of the invention hash incoming packets, using a varying hash-block size, varying between a minimum and a maximum value. The hash block size may be chosen randomly within this interval for each block, but other methods of varying the block size could also be used, as long as the method was not easily predictable by an attacker.

This serves two purposes. First, it reduces the need to hash multiple copies of non-polymorphic viruses/worms for pre-training, because each packet would now have a finite chance of sharing a block with previous packets, rather than no chance, if it did not share a prior copy's alignment within a packet. Second, it allows relatively short sequences of bytes to be hashed sometimes, greatly improving the chances of catching a fixed segment of a polymorphic virus/worm.

Systems and methods consistent with the present invention provide virus, worm, and unsolicited e-mail detection and/or prevention in e-mail servers. Placing these features in e-mail servers provides a number of new advantages, including the ability to align hash blocks to crucial boundaries found in e-mail messages and eliminate certain counter-measures by the attacker, such as using small Internet Protocol (IP) fragments to limit the detectable content in each packet. It also allows these features to relate e-mail header fields with the potentially-harmful segment of the message (usually an "attachment"), and decode common file-packing and encoding formats that might otherwise make a virus or worm undetectable by the packet-based technique (e.g., ".zip files").

By placing these features within an e-mail server, the ability to detect replicated content in the network at points where large quantities of traffic are present is obtained. By relating many otherwise-independent messages and finding common factors, the e-mail server may detect unknown, as well as known, viruses and worms. These features may also be applied to detect potential unsolicited commercial e-mail ("spam").

E-mail servers for major Internet Service Providers (ISPs) may process a million e-mail messages a day, or more, in a single server. When viruses and worms are active in the network, a substantial fraction of this e-mail may actually be traffic generated by the virus or worm. Thus, an e-mail server may have dozens to thousands of examples of a single e-mail-borne virus pass through it in a day, offering an excellent opportunity to determine the relationships between e- mail messages and detect replicated content (a feature that is indicative of virus/worm propagation) and spam, among other, more legitimate traffic (such as traffic from legitimate mailing lists).

Systems and methods consistent with the principles of the invention provide mechanisms to detect and stop e-mail-borne viruses and worms before the addressed user receives them, in an environment where the virus is still inert. Current e-mail servers do not normally execute any code in the e-mail being transported, so they are not usually subject to virus/worm infections from the content of the e-mails they process - though, they may be subject to infection via other forms of attack.

Besides e-mail-borne viruses and worms, another common problem found in e-mail is mass-e-mailing of unsolicited commercial e-mail, colloquially referred to as "spam." It is estimated that perhaps 25%-50% of all e-mail messages now received for delivery by major ISP e-mail servers is spam.

Users of network e-mail services are desirous of mechanisms to block e-mail containing viruses or worms from reaching their machines (where the virus or worm may easily do harm before the user realizes its presence). Users are also desirous of mechanisms to block unsolicited commercial e-mail that consumes their time and resources.

Many commercial e-mail services put a limit on each user's e-mail accumulating at the server, and not yet downloaded to the customer's machine. If too much e-mail arrives between times when the user reads his e-mail, additional e-mail is either "bounced" (i.e., returned to the sender's e-mail server) or even simply discarded, both of which events can seriously inconvenience the user. Because the user has no control over arriving e-mail due to e-mail-borne viruses/worms, or spam, it is a relatively common occurrence that the user's e-mail quota overflows due to unwanted and potentially harmful messages. Similarly, the authors of e-mail- borne viruses, as well as senders of spam, have no reason to limit the size of their messages. As a result, these messages are often much larger than legitimate e-mail messages, thereby increasing the risks of such denial of service to the user by overflowing the per-user e-mail quota.

Users are not the only group inconvenienced by spam and e-mail-borne viruses and worms. Because these types of unwanted e-mail can form a substantial fraction, even a majority, of e-mail traffic in the Internet, for extended periods of time, ISPs typically must add extra resources to handle a peak e-mail load that would otherwise be about half as large. This ratio of unwanted-to-legitimate e-mail traffic appears to be growing daily. Systems and methods consistent with the principles of the invention provide mechanisms to detect and discard unwanted e-mail in network e-mail servers.

Exemplary System Configuration

FIG. 1 is a diagram of an exemplary system 100 in which systems and methods consistent with the present invention may be implemented. System 100 includes autonomous systems (ASs) 110-140 connected to public network (PN) 150. Connections made in system 100 may be via wired, wireless, and/or optical communication paths. While FIG. 1 shows four autonomous systems connected to a single public network, there can be more or fewer systems and networks in other implementations consistent with the principles of the invention.

Public network 150 may include a collection of network devices, such as routers (R1-R5) or switches, that transfer data between autonomous systems, such as autonomous systems 110-140. In an implementation consistent with the present invention, public network 150 takes the form of the Internet, an intranet, a public telephone network, a wide area network (WAN), or the like.

An autonomous system is a network domain in which all network devices (e.g., routers) in the domain can exchange routing tables. Often, an autonomous system can take the form of a local area network (LAN), a WAN, a metropolitan area network (MAN), etc. An autonomous system may include computers or other types of communication devices (referred to as "hosts") that connect to public network 150 via an intruder detection system (IDS); a firewall, one or more border routers, or a combination of these devices.

Autonomous system 110, for example, includes hosts (H) 111-113 connected in a LAN configuration. Hosts 111-113 connect to public network 150 via an intruder detection system (IDS) 114. Intruder detection system 114 may include a commercially-available device that uses rule-based algorithms to determine if a given pattern of network traffic is abnormal. The general premise used by an intruder detection system is that malicious network traffic will have a different pattern from normal, or legitimate, network traffic.

Using a rule set, intruder detection system 114 monitors inbound traffic to autonomous system 110. When a suspicious pattern or event is detected, intruder detection system 114 may take remedial action, or it can instruct a border router or firewall to modify operation to address the malicious traffic pattern. For example, remedial actions may include disabling the link carrying the malicious traffic, discarding packets corning from a particular source address, or discarding packets addressed to a particular destination.

Autonomous system 120 contains different devices from autonomous system 110. These devices aid autonomous system 120 in identifying and/or preventing the transmission of potentially malicious packets within autonomous system 120 and tracing the propagation of the potentially malicious packets through autonomous system 120 and, possibly, public network 150. While FIG. 1 shows only autonomous system 120 as containing these devices, other autonomous systems, including autonomous system 110, may include them.

Autonomous system 120 includes hosts (H) 121-123, intruder detection system (IDS) 124, and security server (SS) 125 connected to public network 150 via a collection of devices, such as security routers (SR11-SR14) 126-129. Hosts 121-123 may include computers or other types of communication devices connected, for example, in a LAN configuration. Intruder detection system 124 may be configured similar to intruder detection system 114.

Security server 125 may include a device, such as a general-purpose computer or a server, that performs source path identification when a malicious packet is detected by intruder detection system 124 or a security router 126-129. While security server 125 and intruder detection system 124 are shown as separate devices in FIG. 1, they can be combined into a single unit performing both intrusion detection and source path identification in other implementations consistent with the present invention.

Figure 1A:
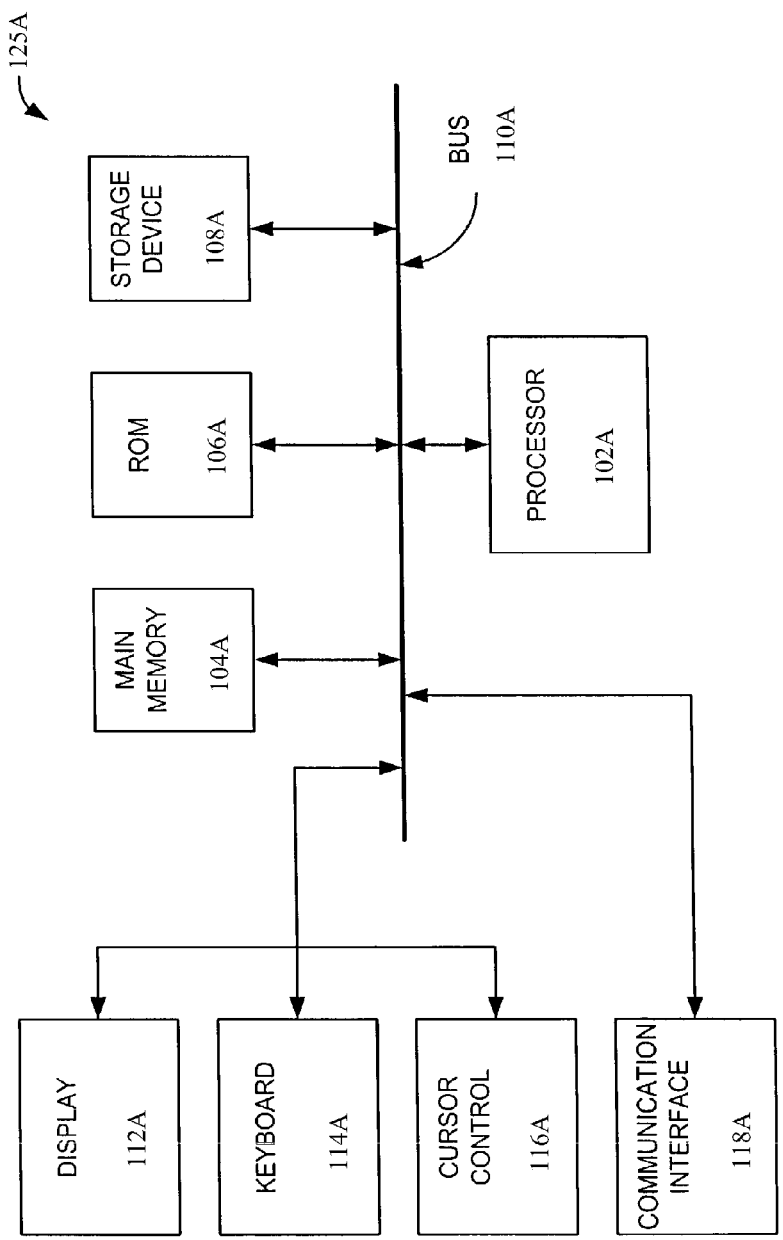
FIG. 1A is an exemplary diagram of a security server of FIG. 1 according to an implementation consistent with the principles of the invention.

FIG. 1A is an exemplary diagram of security sever 125 according to an implementation consistent with the principles of the invention. While one possible configuration of security server 125 is illustrated in FIG. 1A, other configurations are possible.

Security server 125 may include a processor 102A, main memory 104A, read only memory (ROM) 106A, storage device 108A, bus 110A, display 112A, keyboard 114A, cursor control 116A, and communication interface 118A. Processor 102A may include any type of conventional processing device that interprets and executes instructions.

Main memory 104A may include a random access memory (RAM) or a similar type of dynamic storage device. Main memory 104A may store information and instructions to be executed by processor 102A. Main memory 104A may also be used for storing temporary variables or other intermediate information during execution of instructions by processor 102A. ROM 106A may store static information and instructions for use by processor 102A. It will be appreciated that ROM 106A may be replaced with some other type of static storage device. Storage device 108A, also referred to as a data storage device, may include any type of magnetic or optical media and their corresponding interfaces and operational hardware. Storage device 1008 nay store information and instructions for use by processor 102A.

Bus 110A may include a set of hardware lines (conductors, optical fibers, or the like) that allow for data transfer among the components of security server 125. Display device 112A may be a cathode ray tube (CRT), liquid crystal display (LCD) or the like, for displaying information in an operator or machine-readable form. Keyboard 114A and cursor control 116A may allow the operator to interact with security server 125. Cursor control 116A may include, for example, a mouse. In an alternative configuration, keyboard 114A and cursor control 116A can be replaced with a microphone and voice recognition mechanisms to enable an operator or machine to interact with security server 125.

Communication interface 118A enables security server 125 to communicate with other devices/systems via any communications medium. For example, communication interface 118A may include a modem, an Ethernet interface to a LAN, an interface to the Internet, a printer interface, etc. Alternatively, communication interface 118A can include any other type of interface that enables communication between security server 125 and other devices, systems, or networks. Communication interface 118A can be used in lieu of keyboard 114A and cursor control 116A to facilitate operator or machine remote control and communication with security server 125.

As will be described in detail below, security server 125 may perform source path identification and/or prevention measures for a malicious packet that entered autonomous system 120. Security server 125 may perform these functions in response to processor 102A executing sequences of instructions contained in, for example, memory 104A. Such instructions may be read into memory 104A from another computer-readable medium, such as storage device 108A, or from another device coupled to bus 110A or coupled via communication interface 118A.

Alternatively, hardwired circuitry may be used in place of or in combination with software instructions to implement the functions of security server 125. For example, the functionality may be implemented in an application specific integrated circuit (ASIC), a field-programmable gate array (FPGA), or the like, either alone or in combination with other devices.

Security routers 126-129 may include network devices, such as routers, that may detect and/or prevent the transmission of malicious packets and perform source path identification functions. Security routers 127-129 may include border routers for autonomous system 120 because these routers include connections to public network 150. As a result, security routers 127-129 may include routing tables for routers outside autonomous system 120.

Figure 2:
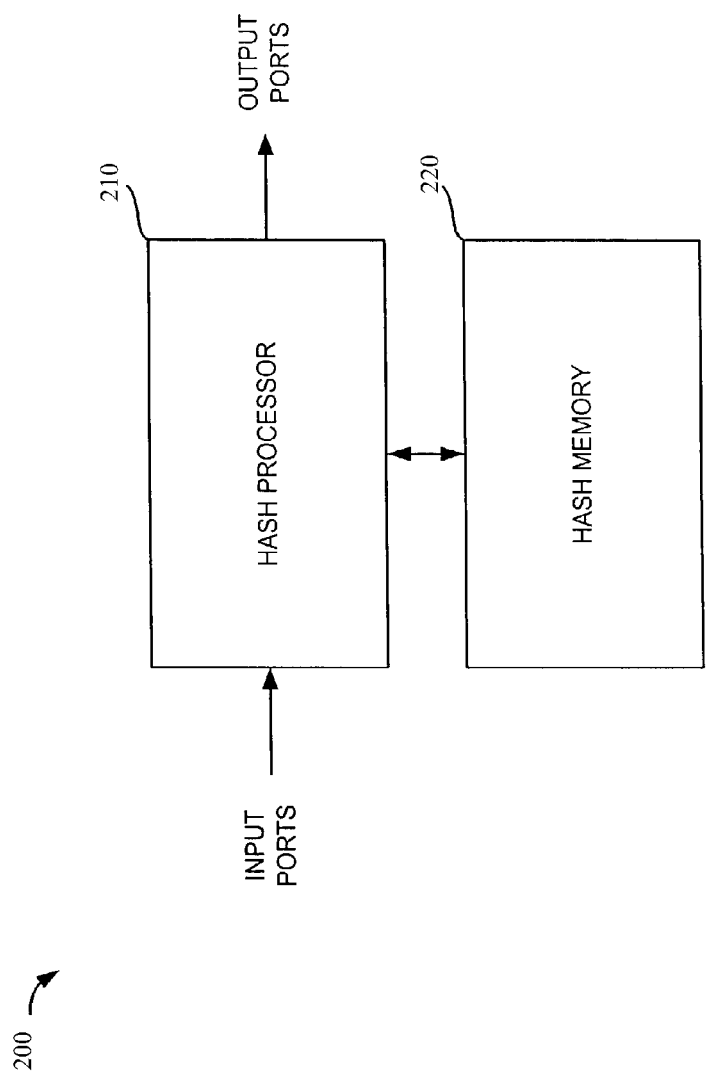
FIG. 2 is an exemplary diagram of packet detection logic according to an implementation consistent with the principles of the invention.

FIG. 2 is an exemplary functional block diagram of packet detection logic 200 according to an implementation consistent with the principles of the invention. Packet detection logic 200 may be implemented within a device that taps one or more bidirectional links of a router, such as security routers 126-129, an intruder detection system, such as intruder detection systems 114 and 124, a security server, such as security server 125, a host, such as hosts 111-113 and 121-123, or another type of device. In another implementation, packet detection logic 200 may be implemented within one of these devices. In the discussion that follows, it may be assumed that packet detection logic 200 is implemented within a security router.

Packet detection logic 200 may include hash processor 210 and hash memory 220. Hash processor 210 may include a conventional processor, an application specific integrated circuit (ASIC), a field-programmable gate array (FPGA), or some other type of device that generates one or more representations for each received packet and records the packet representations in hash memory 220.

A packet representation will likely not be a copy of the entire packet, but rather it may include a portion of the packet or some unique value representative of the packet. Because modern routers can pass gigabits of data per second, storing complete packets is not practical because memories would have to be prohibitively large. By contrast, storing a value representative of the contents of a packet uses memory in a much more efficient manner. By way of example, if incoming packets range in size from 256 bits to 1000 bits, a fixed width number may be computed across blocks making up the content (or payload) of a packet in a manner that allows the entire packet to be identified.

To further illustrate the use of representations, a 32-bit hash value, or digest, may be computed across blocks of each packet. Then, the hash value may be stored in hash memory 220 or may be used as an index, or address, into hash memory 220. Using the hash value, or an index derived therefrom, results in efficient use of hash memory 220 while still allowing the content of each packet passing through packet detection logic 200 to be identified.

Systems and methods consistent with the present invention may use any storage scheme that records information about each packet in a space-efficient fashion, that can definitively determine if a packet has not been observed, and that can respond positively (i.e., in a predictable way) when a packet has been observed. Although systems and methods consistent with the present invention can use virtually any technique for deriving representations of packets, the remaining discussion will use hash values as exemplary representations of packets having passed through a participating router.

Hash processor 210 may determine one or more hash values over variable-sized blocks of bytes in the payload field (i.e., the contents) of an observed packet. When multiple hashes are employed, they may, but need not, be done on the same block of payload bytes. As described in more detail below, hash processor 210 may use the hash results of the hash operation to recognize duplicate occurrences of packet content and raise a warning if it detects packets with replicated content within a short period of time. Hash processor 210 may also use the hash results for tracing the path of a malicious packet through the network.

According to implementations consistent with the present invention, the content (or payload) of a packet may be hashed to detect the packet or trace the packet through a network. In other implementations, the header of a packet may be hashed. In yet other implementations, some combination of the content and the header of a packet may be hashed.

In one implementation consistent with the principles of the invention, hash processor 210 may perform three hashes covering each byte of the payload field. Thus, a hash block size may be chosen uniformly from a range of 4 to 128 bytes, in 4-byte increments (to accommodate a common data-path granularity in high-speed network devices). At the start of the packet payload, hash processor 210 may select a random block size from this range and hash the block with the three different hash functions, or hash processor 210 may select a different block size for each hash function. In the former case, a new block size may be chosen when the first block finishes, and all three hash functions may start at the same place on the new block. In the latter case, as each hash function completes its current block, it selects a random size for the next block it will hash.

Each hash value may be determined by taking an input block of data and processing it to obtain a numerical value that represents the given input data. Suitable hash functions are readily known in the art and will not be discussed in detail herein. Examples of hash functions include the Cyclic Redundancy Check (CRC) and Message Digest 5 (MD5). The resulting hash value, also referred to as a message digest or hash digest, may include a fixed length value. The hash value may serve as a signature for the data over which it was computed. For example, incoming packets could have fixed hash value(s) computed over their content.

The hash value essentially acts as a fingerprint identifying the input block of data over which it was computed. Unlike fingerprints, however, there is a chance that two very different pieces of data will hash to the same value, resulting in a hash collision. An acceptable hash function should provide a good distribution of values over a variety of data inputs in order to prevent these collisions. Because collisions occur when different input blocks result in the same hash value, an ambiguity may arise when attempting to associate a result with a particular input.

Hash processor 210 may store a representation of each packet it observes in hash memory 220. Hash processor 210 may store the actual hash values as the packet representations or it may use other techniques for minimizing storage requirements associated with retaining hash values and other information associated therewith. A technique for minimizing storage requirements may use one or more bit arrays or Bloom filters.

Rather than storing the actual hash value, which can typically be on the order of 32 bits or more in length, hash processor 210 may use the hash value as an index for addressing a bit array within hash memory 220. In other words, when hash processor 210 generates a hash value for a block of a packet, the hash value serves as the address location into the bit array. At the address corresponding to the hash value, one or more bits may be set at the respective location thus indicating that a particular hash value, and hence a particular data packet content, has been seen by hash processor 210. For example, using a 32-bit hash value provides on the order of 4.3 billion possible index values into the bit array. Storing one bit per block rather than storing the block itself, which can be 512 bits long, produces a compression factor of 1:512. While bit arrays are described by way of example, it will be appreciated by those skilled in the relevant art, that other storage techniques may be employed without departing from the spirit of the invention.

Figure 3A:
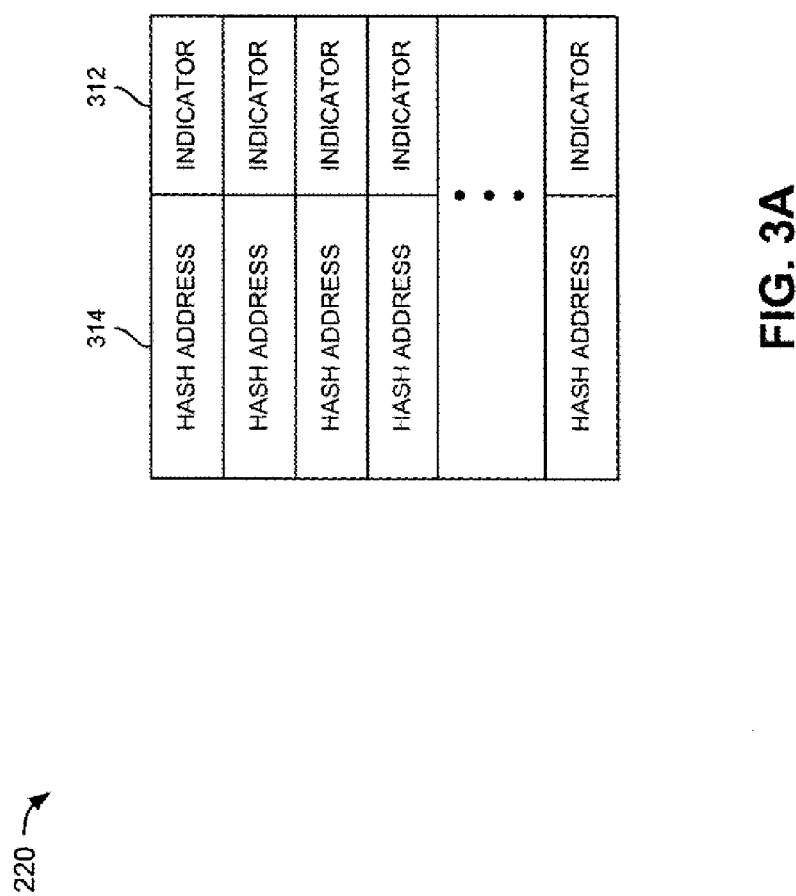

FIGS. 3A-3E illustrate possible data structures that may be used within hash memory 220 in implementations consistent with the principles of the invention. As shown in FIG. 3A, hash memory 220 may include indicator fields 312 addressable by corresponding hash addresses 314. Hash addresses 314 may correspond to possible hash values generated by hash processor 210. Indicator field 312 may store one or more bits that indicate whether a packet block with the corresponding hash value has been observed by hash processor 210. In this case, a packet may be deemed suspicious if, during the hashing process, a significant number of the packet's hash values collide in hash memory 220. Shorter block sizes are more likely to be repeated in totally random traffic, leading to an increase in the generation of "false alarm" matches. To account for this, the threshold number of matches for "suspicion" may need to be configured somewhat higher.

Figure 3B:
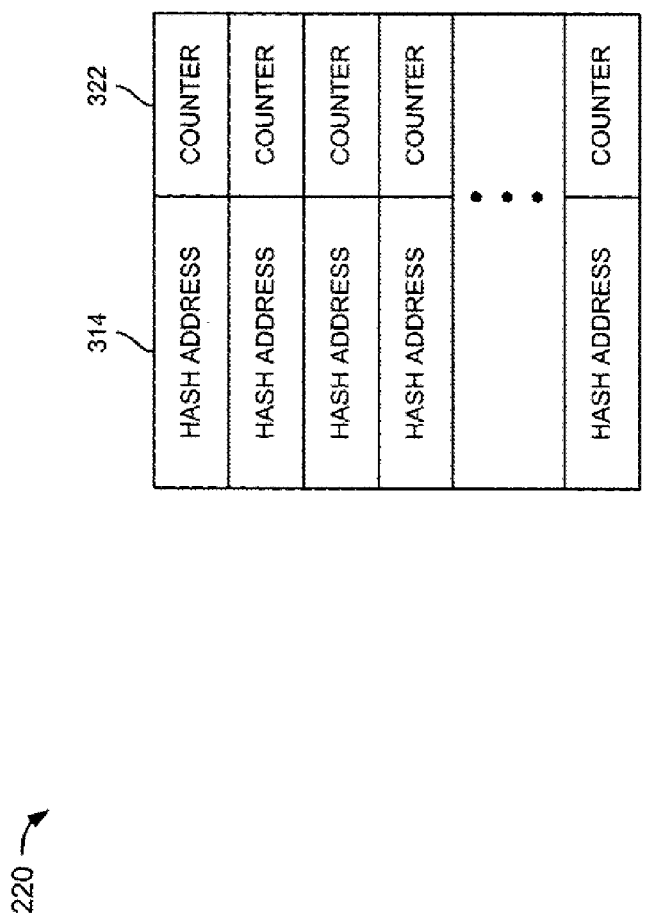

As shown in FIG. 3B, hash memory 220 may alternatively include counter fields 322 addressable by corresponding hash addresses 314. Counter field 322 may record the number of occurrences of packet blocks with the corresponding hash value. Counter field 322 may be incremented on each hit. The more hits a counter receives, the more important the hit should be considered in determining the overall suspiciousness of the packet.

As shown in FIG. 3C, hash memory 220 may store additional information relating to a packet. For example, hash memory 220 may include link identifier (ID) fields 332 and status fields 334. Link ID field 332 may store information regarding the particular link upon which the packet arrived at packet detection logic 200. Status field 334 may store information to aid in monitoring the status of packet detection logic 200 or the link identified by link ID field 332.

Because shorter block sizes are more likely to be repeated in totally random traffic, another variation might include the use of different memories for different block sizes. Thus, a given count level for a shorter block size may be less reason for suspicion than the same count level found in a longer block size.

In an alternate implementation consistent with the principles of the invention, hash memory 220 may be preprogrammed to store hash values corresponding to known malicious packets, such as known viruses and worms. Hash memory 220 may store these hash values separately from the hash values of observed packets. In this case, hash processor 210 may compare a hash value for a received packet to not only the hash values of previously observed packets, but also to hash values of known malicious packets.

In yet another implementation consistent with the principles of the invention, hash memory 220 may be preprogrammed to store source addresses of known sources of legitimate duplicated content, such as packets from a multicast server, a popular page on a web server, an output from a mailing list "exploder" server, or the like. In this case, hash processor 210 may compare the source address for a received packet to the source addresses of known sources of legitimate duplicated content.

Over time, hash memory 220 may fill up and the possibility of overwriting an existing index value increases. The risk of overwriting an index value may be reduced if the bit array is periodically flushed to other storage media, such as a magnetic disk drive, optical media, solid state drive, or the like. Alternatively, the bit array may be slowly and incrementally erased. To facilitate this, a time-table may be established for flushing/erasing the bit array. If desired, the flushing/erasing cycle can be reduced by computing hash values only for a subset of the packets passing through the router. While this approach reduces the flushing/erasing cycle, it increases the possibility that a target packet may be missed (i.e., a hash value is not computed over a portion of it).

When hash memory 220 includes counter fields 322, non-zero storage locations may be decremented periodically rather than being erased. This may ensure that the "random noise" from normal packets would not remain in the bit array indefinitely. Replicated traffic (e.g., from a virus/worm propagating repeatedly across the network), however, would normally cause the relevant storage locations to stay substantially above the "background noise" level.

Figure 3D:
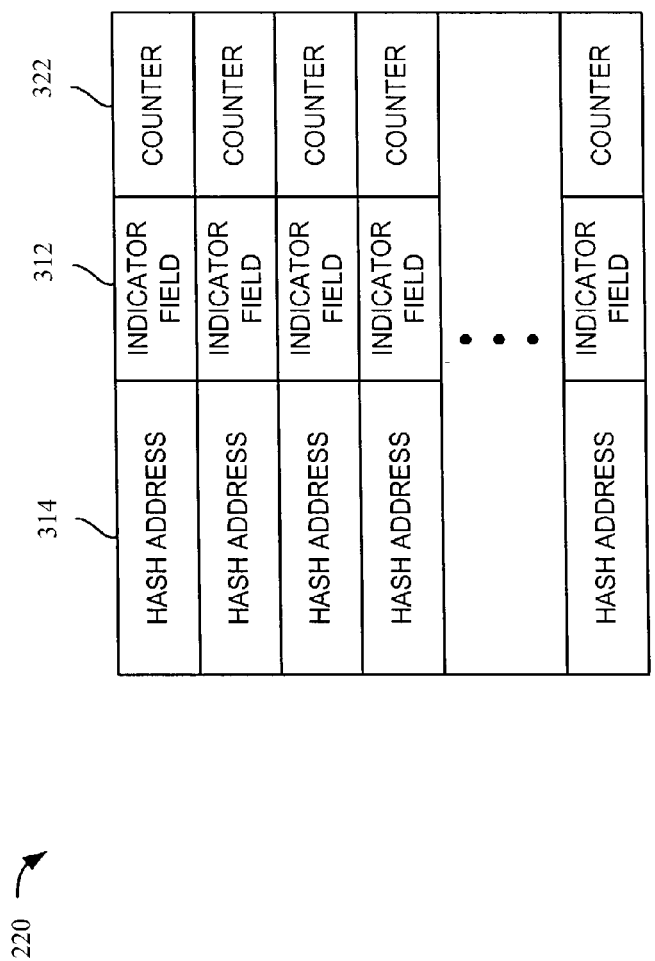

As shown in FIG. 3D, hash memory 220 may include indicator fields 312 and counter fields 322 addressable by corresponding hash addresses 314. Hash addresses 314 may correspond to possible hash values generated by hash processor 210.

Indicator filed 312 may store one or more bits that indicate whether a packet block with the corresponding hash value has been observed by hash processor 210. Counter field 322 may record the number of occurrences of packet blocks with the corresponding hash value. Counter field 322 may periodically decrement its count for flushing purposes.

As shown in FIG. 3E, hash memory 220 may store additional information relating to a packet. For example, hash memory 220 may include link identifier (ID) fields 332 and status fields 334. Link ID field 332 may store information regarding the particular link upon which the packet arrived at packet detection logic 200. Status field 334 may store information to aid in monitoring the status of packet detection logic 200 or the link identified by link ID field 332.

In an alternate implementation consistent with the principles of the invention, hash memory 220 may be preprogrammed to store hash values corresponding to known malicious packets, such as known viruses and worms. Hash memory 220 may store these hash values separately from the hash values of observed packets. In this case, hash processor 210 may compare a hash value for a received packet to not only the hash values of previously observed packets, but also to hash values of known malicious packets.

In yet another implementation consistent with the principles of the invention, hash memory 220 may be preprogrammed to store source addresses of known sources of legitimate duplicated content, such as packets from a multicast server, a popular page on a web server, an output from a mailing list "exploder" server, or the like. In this case, hash processor 210 may compare the source address for a received packet to the source addresses of known sources of legitimate duplicated content.

Exemplary Processing for Malicious Packet Detection/Prevention

Figure 4:
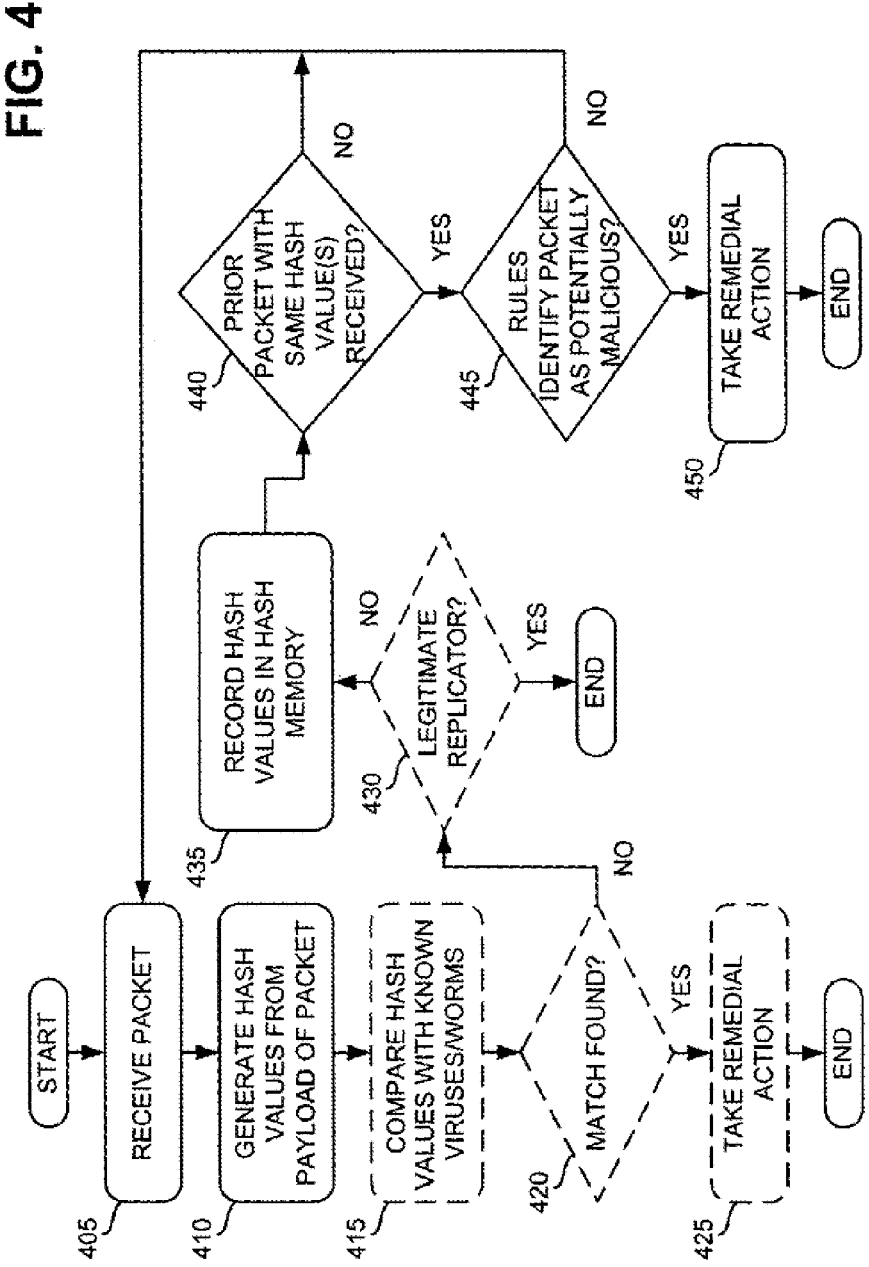
FIG. 4 is a flowchart of exemplary processing for detecting and/or preventing transmission of a malicious packet, such as a polymorphic virus or worm, according to an implementation consistent with the principles of the invention.

FIG. 4 is a flowchart of exemplary processing for detecting and/or preventing transmission of a malicious packet, such as a polymorphic virus or worm, according to an implementation consistent with the principles of the invention. The processing of FIG. 4 may be performed by packet detection logic 200 within a tap device, a security router, such as security router 126, an IDS, such as IDS 124, a LAN switch, or other devices configured to detect and/or prevent transmission of malicious packets. In other implementations, one or more of the described acts may be performed by other systems or devices within system 100.

Processing may begin when packet detection logic 200 receives, or otherwise observes, a packet (act 405). Hash processor 210 may generate one or more hash values by hashing variable-sized blocks from the packet's payload field (act 410). Hash processor 210 may use one or more conventional techniques to perform the hashing operation.

In one implementation consistent with the principles of the invention, three hashes may be performed covering each byte of the payload field. A hash block size may be chosen uniformly from a range of 4 to 128 bytes, in 4-byte increments. At the start of the packet payload, a random block size may be selected from this range and the block may be hashed with the three different hash functions. A new block size may then be chosen when the first block finishes, and all three hash functions may start at the same place on the new block. Alternatively, a different block size may be selected for each hash function. In this case, as each hash function completes its current block, it selects a random size for the next block it will hash.

Hash processor 210 may optionally compare the generated hash value(s) to hash values of known viruses and/or worms within hash memory 220 (act 415). In this case, hash memory 220 may be preprogrammed to store hash values corresponding to known viruses and/or worms. If one or more of the generated hash values match one of the hash values of known viruses and/or worms, hash processor 210 may take remedial actions (acts 420 and 425). The remedial actions may include raising a warning for a human operator, delaying transmission of the packet, capturing a copy of the packet for human or automated analysis, dropping the packet and possibly other packets originating from the same Internet Protocol (IP) address as the packet, sending a Transmission Control Protocol (TCP) close message to the sender thereby preventing complete transmission of the packet, disconnecting the link on which the packet was received, and/or corrupting the packet content in a way likely to render any code contained therein inert (and likely to cause the receiver to drop the packet). Some of the remedial actions, such as dropping or corrupting the packet, may be performed probabilistically based, for example, on the count value in counter field 322 (FIGS. 3B and 3C), which may also be used to determine a probability that the packet is potentially malicious.

If the generated hash value(s) do not match any of the hash values of known viruses and/or worms, or if such a comparison was not performed, hash processor 210 may optionally determine whether the packet's source address indicates that the packet was sent from a legitimate source of duplicated packet content (i.e., a legitimate "replicator") (act 430). For example, hash processor 210 may maintain a list of legitimate replicators in hash memory 220 and check the source address of the packet with the addresses of legitimate replicators on the list. If the packet's source address matches the address of one of the legitimate replicators, then hash processor 210 may end processing of the packet. For example, processing may return to act 405 to await receipt of the next packet.

Otherwise, hash processor 210 may record the generated hash value(s) in hash memory 220 (act 435). For example, hash processor 210 may set the one or more bits stored in indicator field 312 (FIGS. 3A-3C) or increment the count value in counter field 322 (FIGS. 3B and 3C), corresponding to each of the generated hash values, to indicate that the corresponding packet was observed by hash processor 210.

Hash processor 210 may then determine whether any prior packets with the same hash value(s) have been received (act 440). For example, hash processor 210 may use each of the generated hash value(s) as an address into hash memory 220. Hash processor 210 may then examine indicator field 312 at each address to determine whether the one or more bits stored therein indicate that a prior packet has been received. Alternatively, hash processor 210 may examine counter field 322 to determine whether the count value indicates that a prior packet has been received.

If there were no prior packets received with the same hash value(s), then processing may return to act 405 to await receipt of the next packet. If hash processor 210 determines that a prior packet has been observed with the same hash value, however, hash processor 210 may determine whether the packet is potentially malicious (act 445). Hash processor 210 may use a set of rules to determine whether to identify a packet as potentially malicious. For example, the rules might specify that more than x (where x>1) packets with the same hash value have to be observed by hash processor 210 before the packets are identified as potentially malicious. The rules might also specify that these packets have to have been observed by hash processor 210 within a specified period of time of one another. The reason for the latter rule is that, in the case of malicious packets, such as polymorphic viruses and worms, multiple packets will likely pass through packet detection logic 200 within a short period of time.

A packet may contain multiple hash blocks that partially match hash blocks associated with prior packets. For example, a packet that includes multiple hash blocks may have somewhere between one and all of its hashed content blocks match hash blocks associated with prior packets. The rules might specify the number of blocks and/or the number and/or length of sequences of blocks that need to match before hash processor 210 identifies the packet as potentially malicious. The rules might differ for different block sizes.

When hash processor 210 determines that the packet is not malicious (e.g., not a polymorphic worm or virus), such as when less than x number of packets with the same hash value or less than a predetermined number of the packet blocks with the same hash values are observed or when the packets are observed outside the specified period of time, processing may return to act 405 to await receipt of the next packet. When hash processor 210 determines that the packet may be malicious, however, hash processor 210 may take remedial actions (act 450). In some cases, it may not be possible to determine whether the packet is actually malicious because there is some probability that there was a false match or a legitimate replication. As a result, hash processor 210 may determine the probability of the packet actually being malicious based on information gathered by hash processor 210.

The remedial actions may include raising a warning for a human operator, saving the packet for human analysis, dropping the packet, corrupting the packet content in a way likely to render any code contained therein inert (and likely to cause the receiver to drop the packet), delaying transmission of the packet, capturing a copy of the packet for human or automated analysis, dropping other packets originating from the same IP address as the packet, sending a TCP close message to the sender thereby preventing complete transmission of the packet, and/or disconnecting the link on which the packet was received. Some of the remedial actions, such as dropping or corrupting the packet, may be performed probabilistically based, for example, on the count value in counter field 322 (FIGS. 3B and 3C), which may also be used to determine a probability that the packet is potentially malicious. This may greatly slow the spread rate of a virus or worm without completely stopping legitimate traffic that happened to match a suspect profile.

Once a malicious packet, such as a polymorphic virus or worm, has been identified, the path taken by the malicious packet may be traced. To do this, processing similar to that described in U.S. patent application Ser. No. 10/251,403, now U.S. Pat. No. 7,328,349, from which this application claims priority and which has been previously incorporated by reference, may be performed.

Exemplary Processing for Source Path Identification

Figure 5:
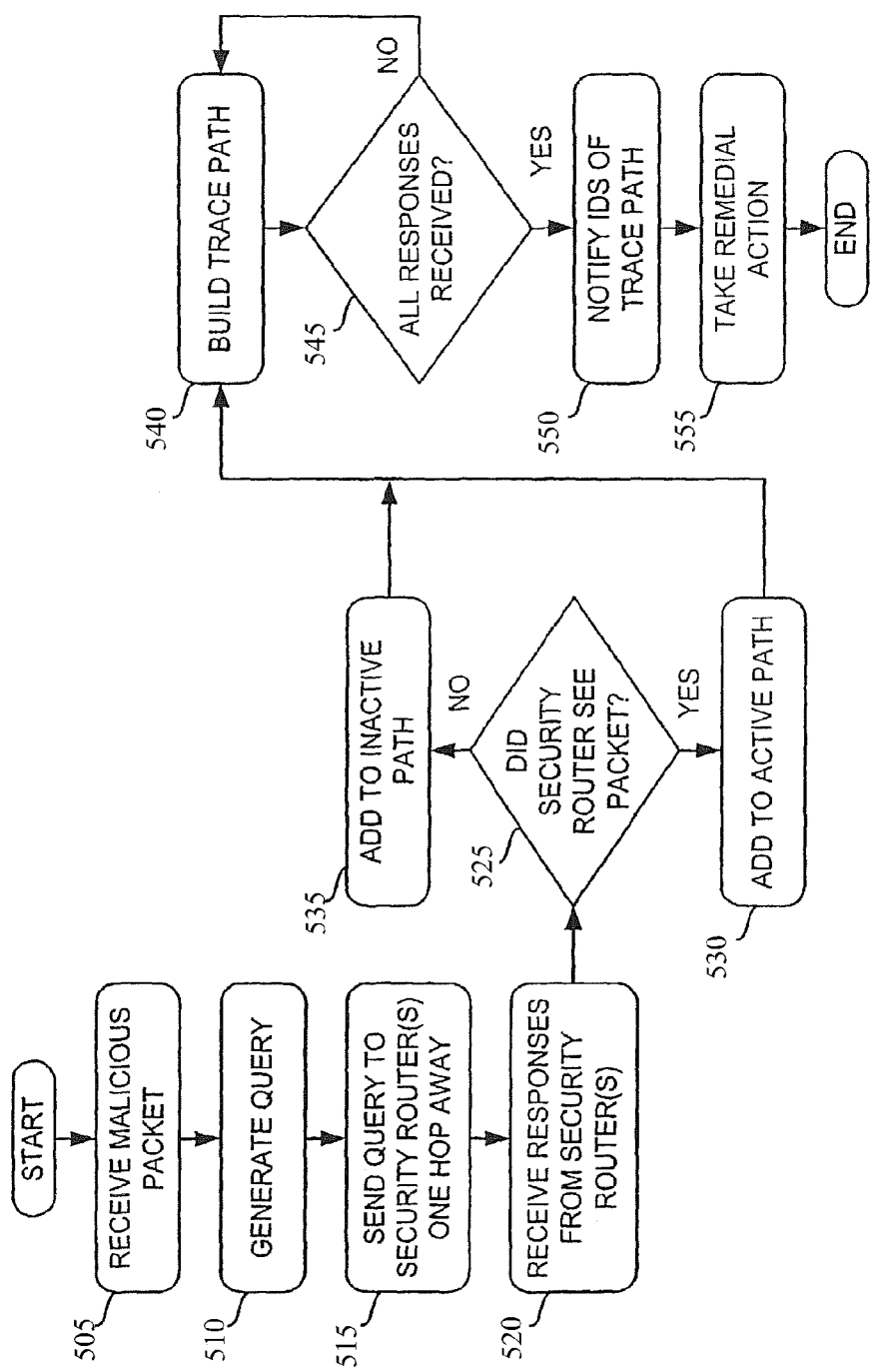
FIG. 5 is a flowchart of exemplary processing for identifying the path taken through a network by a malicious packet, such as a virus or worm, according to an implementation consistent with the principles of the invention.

FIG. 5 is a flowchart of exemplary processing for identifying the path taken through a network by a malicious packet, such as a virus or worm, according to an implementation consistent with the principles of the invention. The processing of FIG. 5 may be performed by a security server, such as security server 125, or other devices configured to trace the paths taken by malicious packets. In other implementations, one or more of the described acts may be performed by other systems or devices within system 100.

Processing may begin with intruder detection system 124 detecting a malicious packet. Intruder detection system 124 may use conventional techniques to detect the malicious packet. For example, intruder detection system 124 may use rule-based algorithms to identify a packet as part of an abnormal network traffic pattern. When a malicious packet is detected, intruder detection system 124 may notify security server 125 that a malicious packet has been detected within autonomous system 120. The notification may include the malicious packet or portions thereof along with other information useful for security server 125 to begin source path identification. Examples of information that intruder detection system 124 may send to security server 125 along with the malicious packet include time-of-arrival information, encapsulation information, link information, and the like.

After receiving the malicious packet, security server 125 may generate a query that includes the malicious packet and any additional information desirable for facilitating communication with participating routers, such as security routers 126-129 (acts 505 and 510). Examples of additional information that may be included in the query are, but are not limited to, destination addresses for participating routers, passwords required for querying a router, encryption keying information, time-to-live (TTL) fields, information for reconfiguring routers, and the like. Security server 125 may then send the query to security router(s) located one hop away (act 515). The security router(s) may analyze the query to determine whether they have seen the malicious packet. To make this determination, the security router(s) may use processing similar to that described below with regard to FIG. 6.

After processing the query, the security router(s) may send a response to security server. The response may indicate that the security router has seen the malicious packet, or alternatively, that it has not. It is important to observe that the two answers are not equal in their degree of certainty. If a security router does not have a hash matching the malicious packet, the security router has definitively not seen the malicious packet. If the security router has a matching hash, however, then the security router has seen the malicious packet or a packet that has the same hash value as the malicious packet. When two different packets, having different contents, hash to the same value it is referred to as a hash collision.

The security router(s) may also forward the query to other routers or devices to which they are connected. For example, the security router(s) may forward the query to the security router(s) that are located two hops away from security server, which may forward the query to security router(s) located three hops away, and so on. This forwarding may continue to include routers or devices within public network 150 if these routers or devices have been configured to participate in the tracing of the paths taken by malicious packets. This approach may be called an inward-out approach because the query travels a path that extends outward from security server 125. Alternatively, an outward-in approach may be used.

Security server 125 receives the responses from the security routers indicating whether the security routers have seen the malicious packet (acts 520 and 525). If a response indicates that the security router has seen the malicious packet, security server 125 associates the response and identification (ID) information for the respective security router with active path data (act 530). Alternatively, if the response indicates that the security router has not seen the malicious packet, security server 125 associates the response and the ID information for the security router with inactive path data (act 535).

Security server 125 uses the active and inactive path data to build a trace of the potential paths taken by the malicious packet as it traveled, or propagated, across the network (act 540). Security server 125 may continue to build the trace until it receives all the responses from the security routers (acts 540 and 545). Security server 125 may attempt to build a trace with each received response to determine the ingress point for the malicious packet. The ingress point may identify where the malicious packet entered autonomous system 120, public network 150, or another autonomous system.

As security server 125 attempts to build a trace of the path taken by the malicious packet, several paths may emerge as a result of hash collisions occurring in the participating routers.

When hash collisions occur, they act as false positives in the sense that security server 125 interprets the collision as an indication that the malicious packet has been observed. Fortunately, the occurrences of hash collisions can be mitigated. One mechanism for reducing hash collisions is to compute large hash values over the packets since the chances of collisions rise as the number of bits comprising the hash value decreases. Another mechanism to reduce false positives resulting from collisions is for each security router (e.g., security routers 126-129) to implement its own unique hash function. In this case, the same collision will not occur in other security routers.

A further mechanism for reducing collisions is to control the density of the hash tables in the memories of participating routers. That is, rather than computing a single hash value and setting a single bit for an observed packet, a plurality of hash values may be computed for each observed packet using several unique hash functions. This produces a corresponding number of unique hash values for each observed packet. While this approach fills the hash table at a faster rate, the reduction in the number of hash collisions makes the tradeoff worthwhile in many instances. For example, Bloom Filters may be used to compute multiple hash values over a given packet in order to reduce the number of collisions and, hence, enhance the accuracy of traced paths.

When security server 125 has determined an ingress point for the malicious packet, it may notify intruder detection system 124 that the ingress point for the malicious packet has been determined (act 550). Security server 125 may also take remedial actions (act 555). Often it will be desirable to have the participating router closest to the ingress point close off the ingress path used by the malicious packet. As such, security server 125 may send a message to the respective participating router instructing it to close off the ingress path using known techniques.

Security server 125 may also archive copies of solutions generated, data sent, data received, and the like either locally or remotely. Furthermore, security server 125 may communicate information about source path identification attempts to devices at remote locations coupled to a network. For example, security server 125 may communicate information to a network operations center, a redundant security server, or to a data analysis facility for post processing.

Figure 6:
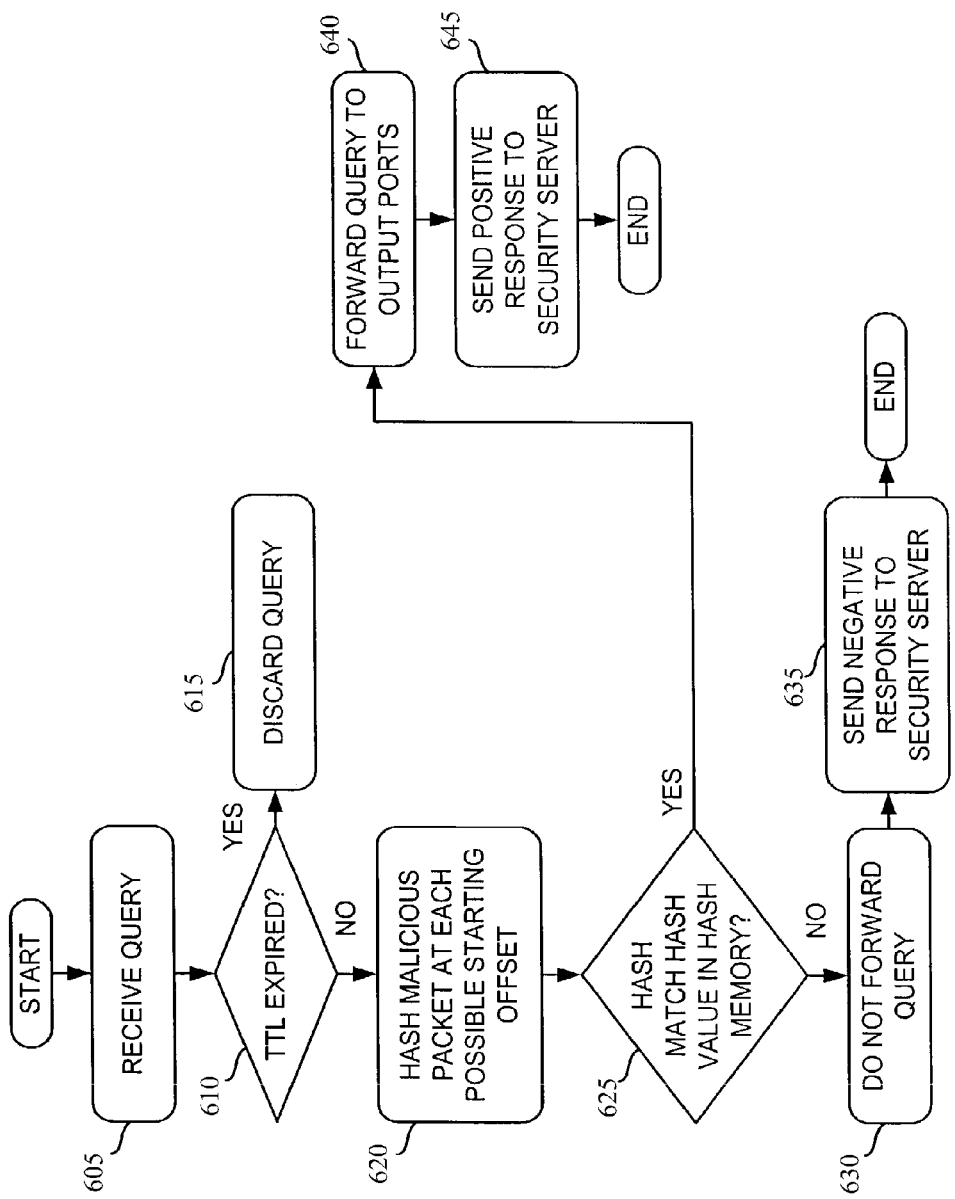
FIG. 6 is a flowchart of exemplary processing for determining whether a malicious packet, such as a virus or worm, has been observed according to an implementation consistent with the principles of the invention.

Exemplary Processing for Determining Whether a Malicious Packet has Been Observed FIG. 6 is a flowchart of exemplary processing for determining whether a malicious packet, such as a virus or worm, has been observed according to an implementation consistent with the principles of the invention. The processing of FIG. 6 may be performed by packet detection logic 200 implemented within a security router, such as security router 126, or by other devices configured to trace the paths taken by malicious packets. In other implementations, one or more of the described acts may be performed by other systems or devices within system 100.

Processing may begin when security router 126 receives a query from security server 125 (act 605). As described above, the query may include a TTL field. A TTL field may be employed because it provides an efficient mechanism for ensuring that a security router responds only to relevant, or timely, queries. In addition, employing TTL fields may reduce the amount of data traversing the network between security server 125 and participating routers because queries with expired TTL fields may be discarded.

If the query includes a TTL field, security router 126 may determine if the TTL field in the query has expired (act 610). If the TTL field has expired, security router 126 may discard the query (act 615). If the TTL field has not expired, security router 126 may hash the malicious packet contained within the query at each possible starting offset within a block (act 620). Security router 126 may generate multiple hash values because the code body of a virus or worm may appear at any arbitrary offset within the packet that carries it (e.g., each copy may have an e-mail header attached that differs in length for each copy).

Security router 126 may then determine whether any of the generated hash values match one of the recorded hash values in hash memory 220 (act 625). Security router 126 may use each of the generated hash values as an address into hash memory 220. At each of the addresses, security router 126 may determine whether indicator field 312 indicates that a prior packet with the same hash value has been observed. If none of the generated hash values match a hash value in hash memory 220, security router 126 does not forward the query (act 630), but instead may send a negative response to security server 125 (act 635).

If one or more of the generated hash values match a hash value in hash memory 220, however, security router 126 may forward the query to all of its output ports excluding the output port in the direction from which the query was received (act 640). Security router 126 may also send a positive response to security server 125, indicating that the packet has been observed (act 645). The response may include the address of security router 126 and information about observed packets that have passed through security router 126.

Detailed Description of Preferred Embodiment

Figure 7:
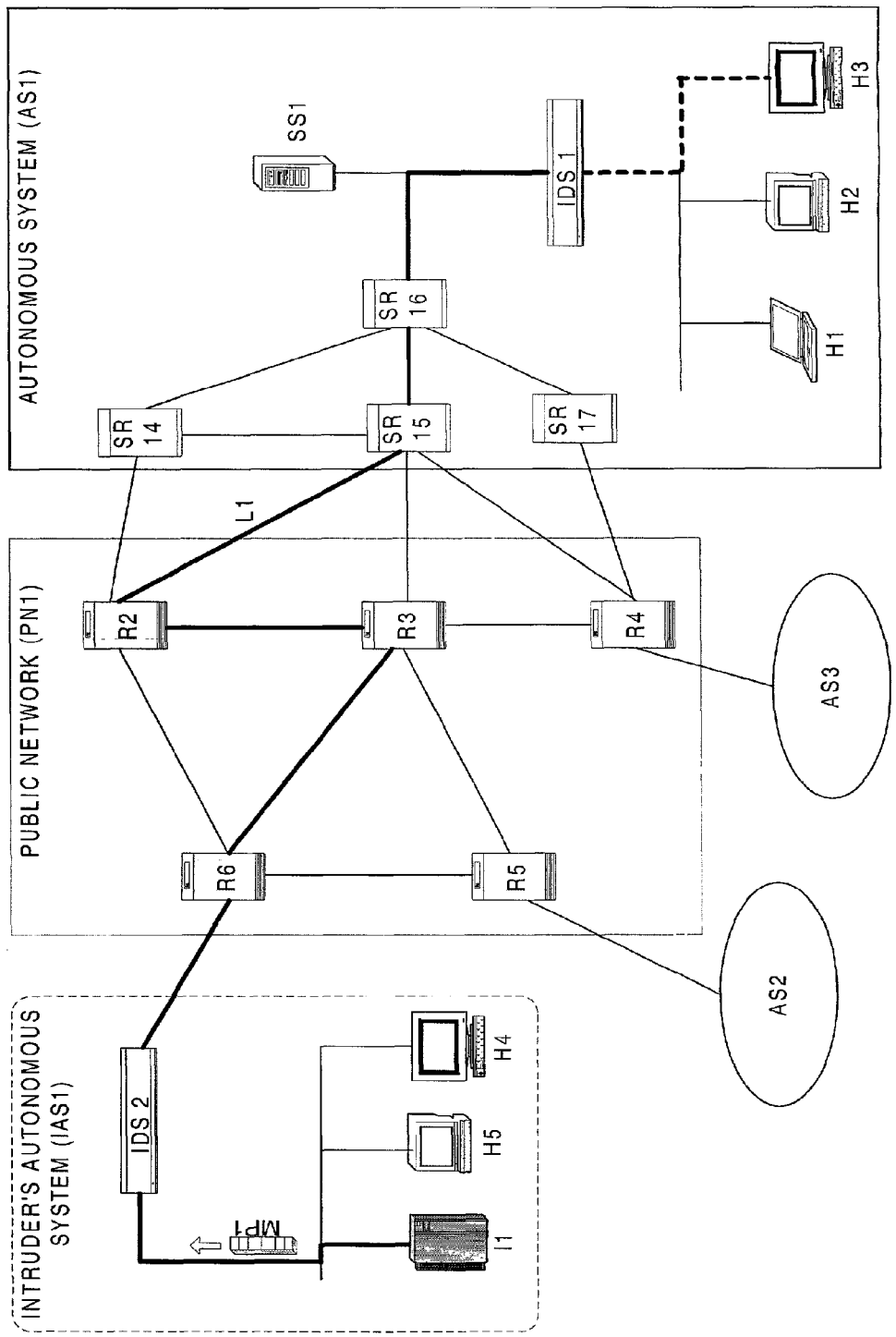
FIG. 7 is a block diagram of an exemplary embodiment of the present invention operating in conjunction with an Internet network.

A preferred embodiment uses a server and one or more specially configured network components, or devices, such as a router, within an autonomous system (AS) to determine the ingress point, or location, for a malicious packet (MP1). FIG. 7 illustrates an embodiment that may be used with an Internet Protocol network. More particularly, FIG. 7 is broken into three general areas enclosed within borders with communication media, such as links, carrying data traffic across the network, connecting the general areas. Links serve as a transmission media for data and signals on the network and may be comprised of wire, optical fiber, radio frequency (RF) transponders, or the like.

The rightmost portion of FIG. 7 denotes an AS, shown as AS1, enhanced by the addition of a source path isolation server (SS1) and network components, here routers, modified to work as source path isolation routers (SRs), denoted by SR14-17, respectively. Also included within AS1 is a detection device, here an intrusion detection system (IDS) denoted as IDS1, and host computers H1-H3. IDS1 may take the form of a commercially available IDS, or alternatively it may be developed specifically for participating in source path isolation systems and methods. IDSs and firewalls are well known in the art and will not be described in detail herein. An informative source of information on IDS and firewall functionality that may be used with the disclosed embodiments can be found in Firewalls and Internet Security: Repelling the Wily Hacker, by William R. Cheswick and Steven M. Bellowin, Addison-Wesley (1994).

SS1 may be comprised of a general-purpose computer, or server, operatively coupled to the network of AS1 and executing machine-readable code enabling it to perform source path isolation in conjunction with SR14-17 and IDS1. While SS1 and IDS1 are shown as separate devices in FIG. 7, it is noted that they can be combined into a single unit performing both intrusion detection and source path isolation. SR14-17 may be comprised of commercially available routers, or similar devices such as switches, bridges or the like, employing software and hardware enabling them to participate in source path isolation.

The central portion of FIG. 7 represents the public network, shown as PN1, carrying traffic between the autonomous systems, namely IAS1, and AS1, AS2 and AS3. PN1 comprises routers R2-R6, links operatively coupling the routers making up PN1, and links attaching to ASs coupled to PN1. PN1 may also comprise computers external to an AS (not shown). In the foregoing discussion, routers that have not been modified to act as source path isolation routers (SRs) are denoted as Rx, such as those located in PN1, where x is a number such as 2, 3, 4, etc.

The lower portion of FIG. 7 includes other autonomous systems, AS2 and AS3 that may be operatively connected to PN1. AS2 and AS3 may employ source path isolation apparatus and methods, or alternatively, they may be prior art autonomous systems (PAS).

The leftmost portion of FIG. 7 shows an autonomous system (IAS1) used by an intruder to launch an attack on AS1. IAS1 contains an IDS, shown as IDS2, operatively coupled to three host computers H4, H5 and I1 using links. In FIG. 7, I1 has been configured such that it places a malicious packet (MP1) onto IAS1 for transmission to AS1 via PN1. While FIG. 7 illustrates a computer configured to place MP1 onto the network, routers, switches, gateways and other hardware capable of placing machine-readable data onto a network may be used in place of or in conjunction with such computer.

When a device has been configured to inject an MP1 onto a network, it is referred to as an intruder or intruding device.

To launch an attack, an intruder generates malicious data traffic and places it onto a link for transmission to one or more destination devices having respective destination addresses. In FIG. 7, the heavy lines are used to indicate the path taken by MP1, namely I1 to IDS2, IDS2-R6, R6-R3, R3-R2, R2-SR15, SR15-SR16, and SR16-IDS1 (where hyphenation implies operative coupling between network components). The thick dashed link from IDS1-H3 denotes the intended path to the targeted device H3.

Detection and source path isolation of MP1 may be accomplished as follows. Detection device, here IDS1, identifies MP1 using known methods. After detecting MP1, IDS1 generates a notification packet, or triggering event, and sends it to SS1 thus notifying SS1 that a malicious packet has been detected within AS1. The notification packet may include MP1 or portions thereof along with other information useful for SS1 to begin source path isolation. Examples of information that may be sent from IDS1 to SS1 along with MP1 are time-of-arrival, encapsulation information, link information, and the like. When MP1 (or fraction thereof) has been identified and forwarded to SS1 it is referred to as a target packet (TP1) because it becomes the target of the source path isolation method further described herein.

SS1 may then generate a query message (QM1) containing TP1, a portion thereof, or a representation of TP1 such as a hash value. After generating QM1 containing identification information about TP1, SS1 sends it to some, or all, participating routers. Accordingly, SS1 may send QM1 to participating routers located one hop away; however the disclosed invention is not limited to single hops. For example, SR16 is one hop away from SS1, whereas SR14, SR15 and SR17 are two hops away from SS1 and one hop away from SR16, respectively. When SR16 receives QM1 from SS1, SR16 determines if TP1 has been seen. This determination is made by comparing TP1 with a database containing signatures of other characteristics representative of packets having passed through SR16. Typically, SR16 is considered to have observed, or encountered, a packet when the packet is passed from one of its input ports to one of its output ports such as would be done when SR16 forwards during normal operation within a network.

To determine if a packet has been observed, SR16 first stores a representation of each packet it forwards. Then SR16 compares the stored representation to the information about TP1 contained in QM1. Typically, a representation of a packet passed through SR16 will not be a copy of the entire packet, but rather it will be comprised of a portion of the packet or some unique value representative of the packet. Since modern routers can pass gigabits of data per second, storing complete packets is not practical because memories become prohibitively large. In contrast, storing a value representative of the contents of a packet uses memory in a more efficient manner. By way of example, if incoming packets range in size from 256 bits to 1000 bits, a fixed width number may be computed across the bits making up a packet in a manner that allows the entire packet to be uniquely identified. A hash value, or hash digest, is an example of such a fixed width number. To further illustrate the use of representations, if a 32-bit hash digest is computed across each packet, then the digest may be stored in memory or, alternatively, the digest may be used as an index, or address, into memory. Using the digest, or an index derived therefrom, results in efficient use of memory while still allowing identification of each packet passing through a router. The disclosed invention works with any storage scheme that saves information about each packet in a space efficient fashion, that can definitively determine if a packet has not been observed, and that will respond positively (i.e. in a predictable way) when a packet has been observed. Although the invention works with virtually any technique for deriving representations of packets, for brevity, the remaining discussion will use hash digests as exemplary representations of packets having passed through a participating router.

Returning to the discussion of FIG. 7, if SR16 has not observed TP1, it may so inform SS1. But if SR16 has a hash matching TP1, it may send a response to SS1 indicating that the packet was observed by, or at, SR16. In addition, SR16 may forward QM1 to adjacent routers 1 hop away. In FIG. 7, SR16 sends QM1 to SR14, SR15 and SR17. Then, SR14, 15 and 17 determine if they have seen TP1 and notify SS1 accordingly. In this fashion, the query message/reply process is forwarded to virtually all SRs within an AS on a hop-by-hop basis.

In FIG. 7, routers SR14, SR15 and SR17 are border routers for AS1, namely they are the routers that contain routing tables for routers outside AS1. If routers external to AS1 have not been configured to operate as SRs, then the query message/reply process stops at SR 14-17; however, if the public network routers are configured to act as SRs then the query message/reply process may continue until the SR closest to the ingress point of TP1 is reached. When the SR closest to the ingress point is found, it can be instructed to disconnect the link used by the intruder or it can be instructed to drop packets originating from the intruder's Internet Protocol (IP) address on a particular link, or based on other identifying information.

Still referring to FIG. 7 and the route taken by MP1, if the routers making up PN1 are not participating as SRs, then SR15 would be instructed to exclude TPs. SR15 excludes a TP, present at an input port, by preventing it from passing to an output port. In contrast, if the routers making up PN1 were participating as SRs then R6 could be instructed to exclude TPs present at its input port.

The process used to perform source path isolation in FIG. 7 is referred to as an inward-out technique. After being triggered by an IDS, an inward-out technique begins its queries from a generally central portion of an AS. The inward-out technique then employs QMs that hop outward from the central portion of the AS toward the border routers comprised therein.

Figure 8:
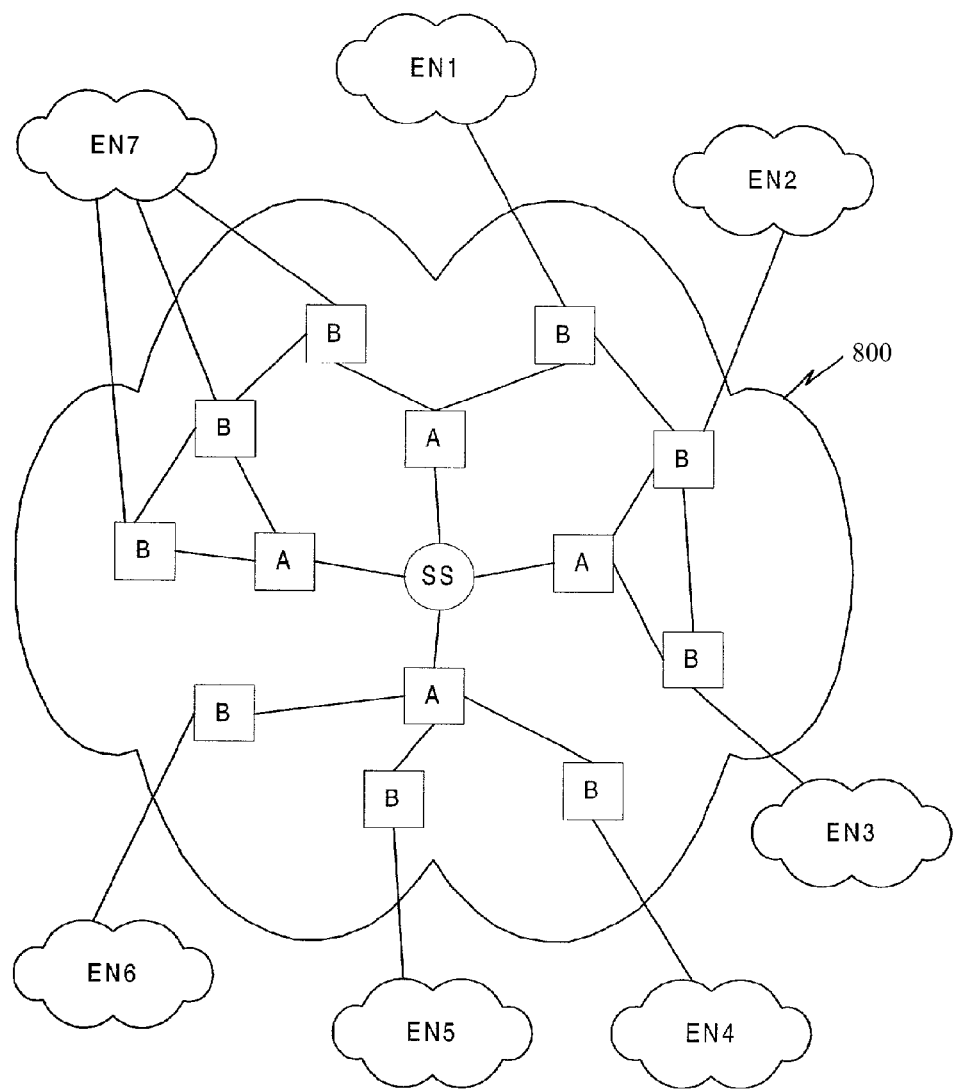
FIG. 8 is a schematic diagram of an autonomous system coupled to a plurality of external networks.

FIG. 8 illustrates an autonomous system (AS), 800, employing border routers denoted generally as B connected to external networks EN1-EN7, other routers within 800 connected to the border routers generally denoted as A, and a source path isolation server denoted as SS. AS 800 may also include additional routers (not shown) located between SS and border routers B. An inward-out solution begins with SS at the center of FIG. 8 and works outward one hop at a time until the border routers, B, are reached. For FIG. 8, the routers labeled A are queried on the first hop and the border routers, B, are queried on a second, or subsequent, hop. Since the locations of border routers are known within AS 800, an outward-in solution may also be employed. With an outward-in solution, SS first queries the border routers, B, and they in turn query the routers labeled A. As can be seen from FIG. 8, an outward-in solution gets progressively closer to the center of AS 800. The disclosed technique can be used on networks containing virtually any number of participating routers. While inward-out and outward-in techniques have been herein described, the disclosed techniques are not limited to any particular types of solution or localization algorithms. Furthermore, SS may send queries to participating routers located virtually anywhere in the network so that many types of source path isolation techniques can be employed. Thus it can be seen that the disclosed technique is very scalable and flexible.

Further detail of the operation of a source path isolation server (SS) and a source path isolation router (SR) are provided hereinbelow.

Exemplary Method for Source Path Isolation Server

Figure 9:
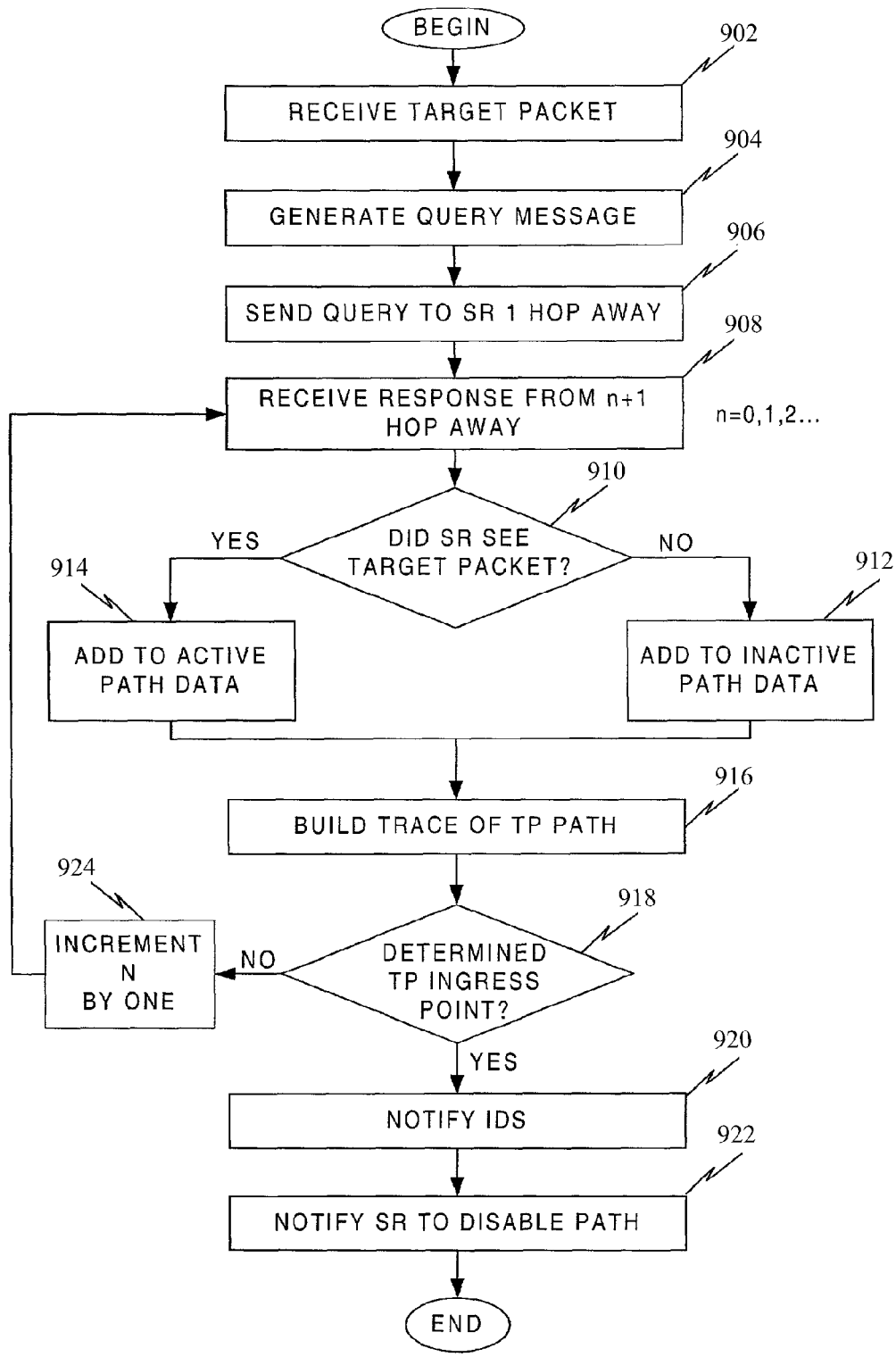
FIG. 9 is a flowchart illustrating an exemplary method for use with a source path isolation server.

FIG. 9 illustrates an exemplary method for accomplishing source path isolation. The method begins when SS1 receives TP1 from IDS1 operating within AS1 (step 902).

After receiving TP1, SS1 may generate QM1 comprising TP1 and any additional information desirable for facilitating communication with participating routers (SRs) (step 904).

Examples of additional information that may be included in QM1 are, but are not limited to, destination addresses for participating routers, passwords required for querying a router, encryption keying information, time-to-live (TTL) fields, a hash digest of TP1, information for reconfiguring routers, and the like. SS1 may then send QM1 to SRs located at least one hop away (step 906). SR may then process QM1 by hashing TP1 contained therein and comparing the resulting value to hash values stored in local memory, where the stored hash values identify packets having previously passed through SR.

After processing QM1, an SR may send a reply to SS1 (step 908). The response may indicate that a queried router has seen TP1, or alternatively, that it has not (step 910). It is important to observe that the two answers are not equal in their degree of certainty. If SR does not have a hash matching TP1, SR has definitively not seen TP1. However, if SR has a matching hash, then SR has seen TP1 or a packet that has the same hash as TP1. When two different packets, having different contents, hash to the same value it is referred to as a hash collision.

If a queried SR has seen TP1, a reply and identification (ID) information for the respective SR is associated as active path data (step 914). Alternatively, if an SR has not seen TP1, the reply is associated as inactive path data (step 912). Replies received from queried SRs are used to build a source path trace of possible paths taken by TP through the network using known methods (step 916). SS1 may then attempt to identify the ingress point for TP1 (step 918). If SS1 is unable to determine the ingress point of TP1, subsequent responses from participating routers located an additional hop away are processed by executing steps 908-918 again (step 924).

Examples of source path tracing techniques that may be employed with embodiments disclosed herein are, but are not limited to, a breadth-first search or a depth-first search. In a breadth-first search, all SRs in an area are queried to determine which SRs may have observed a target packet. Then, one or more graphs, containing nodes, are generated from the responses received by SS1. Where the nodes indicate locations that TP1 may have passed. Any graphs containing a node where TP1 was observed are associated as active, or candidate, paths, i.e. paths that TP1 may have traversed. With a depth-first search, only SRs adjacent to a location where TP1 was observed are queried. SRs issuing a positive reply are treated as starting points for candidate graphs because they have observed TP1. Next, all SRs adjacent to those that responded with a positive reply are queried. The process of moving the query/response process out one hop at a time is referred to as a round. This process is repeated until all participating routers have been queried or all SRs in a round respond with a negative reply indicating that they have not observed TP1. When a negative reply is received, it is associated as inactive path data.

When SS1 has determined an ingress point for TP1, it may send a message to IDS1 indicating that a solution has been found (step 920). Often it will be desirable to have the participating router closest to the ingress point close off the ingress path used by TP1. As such, SS1 may send a message to the respective participating router instructing it to close off the ingress path using known techniques (step 922). SS1 may also archive path solutions, data sent, data received, and the like either locally or remotely. Furthermore, SS1 may communicate information about source path isolation attempts to devices at remote locations coupled to a network. For example, SS1 may communicate information to a network operations center (NOC), a redundant source path isolation server, or to a data analysis facility for post processing.

Here it is noted that as SS1 attempts to build a trace of the path taken by TP1, multiple paths may emerge as a result of hash collisions occurring in participating routers. When collisions occur, they act as false positives in the sense that SS1 interprets the collision as an indication that a desired TP1 has been observed. Fortunately the occurrences of hash collisions can be mitigated. One mechanism for reducing hash collisions is to compute large hash values over the packets since the chances of collisions rise as the number of bits comprising the hash value decreases. Another mechanism for reducing collisions is to control the density of the hash tables in the memories of participating routers. That is, rather than computing a single hash value and setting a single bit for an observed packet, a plurality of hash values are computed for each observed packet using several unique hash functions. This produces a corresponding number of unique hash values for each observed packet. While this approach fills the router's hash table at a faster rate, the reduction in the number of hash collisions makes the tradeoff worthwhile in many instances. For example, Bloom Filters may be used to compute multiple hash values over a given packet in order to reduce the number of collisions and hence enhance the accuracy of traced paths. Therefore, the disclosed invention is not limited to any particular method of computing hash functions nor is it limited to a particular type of source path localization algorithm or technique.

Exemplary Source Path Isolation Router

To participate in source path isolation of target packets, a router is modified so that it can determine a hash value over the immutable portion of each packet received and/or forwarded. A router forwards a packet when it moves a data packet present at an input port to an output port for transmittal toward a desired destination. Modifying a router to record information about observed packets after computing a hash value provides an efficient method for retaining unique information about each packet seen, or observed, by a participating router. Techniques for quickly computing hash values are readily available and they can be implemented in the processing hardware and software currently used in routers without unduly reducing performance of the forwarding engines within the routers. In order to make use of hash value information, a participating router, SR, may store information in a manner facilitating rapid recall when QM1 is received from SS1. Since, modern routers are capable of forwarding large numbers of packets very quickly, attempting to store even a byte per data packet would require very large amounts of high-speed memory. Employing hash values significantly reduces the memory requirements for storing information about packets.

An SR determines a hash value over an immutable portion of a packet observed at an input port. The hash value is determined by taking an input block of data, such as a data packet, and processing it to obtain a numerical value that is unique for the given input data. The hash value, also referred to as a message digest or hash digest, is a fixed length whereas the input data may vary in size. Since the hash digest is unique for each input block of data, it serves as a signature for the data over which it was computed. For example, incoming packets varying in size from 32 bits to 1000 bits could have a fixed 32-bit hash value computed over their length. Furthermore, the hash value may be computed in such a way that it is a function of all of the bits making up the input data, or alternatively it can be computed over a portion of input data. When used, a hash value essentially acts as a fingerprint identifying the input block of data over which it was computed. However, unlike fingerprints, there is a chance that two very different pieces of data will hash to the same value, i.e. a hash collision. An acceptable hash function should provide a good distribution of values over a variety of data inputs in order to prevent these collisions. Since collisions occur when different, i.e. unique, input blocks result in the same hash value, an ambiguity arises when attempting to associate a result with a particular input. Suitable hash functions are readily known in the art and will not be discussed in detail herein. For example, hash functions used in the art, which may be used in conjunction with the matter disclosed herein, can be found in Cryptography And Network Security Principles And Practice, Stallings, Prentice Hall (2000). An example of a useful hash function that can be used with the invention is the Cyclical Redundancy Check (CRC).

To further reduce collisions, each SR may implement its own unique hash function. By way of example, if there are two adjacent routers, SR15 and SR16, coupled together and each employs the same hash function, and there are two target packets, TP1 and TP2 on a network. Now assume, TP1 passes only through SR15, and TP2 passes through SR16 before arriving at SR15. If TP1 and TP2 have a hash collision at SR15, then the tracing algorithm will include SR16 in the traced path because SR16 would incorrectly report TP2's hash value as a potential signal that TP1 had passed through SR16 because of the identical hash values of TP1 and TP2. However, if SR16 employs a different hash function, then TP1 and TP2 will have different hash values at SR16, and thus SR16 would not be included in the tracing path even though a collision occurred between TP1 and TP2 at SR15.

Generally packets have an immutable portion and a mutable portion. These names are used to help distinguish between the portions of the packet that may change as it is routed through the network and the portion, or portions, remaining intact, or unchanged. Immutable is used to describe the portions of a packet that do not change as a function of the packet's path across, or through, a network. In contrast, mutable describes the portions of a packet that change as a function of the packet's path through the network. Typically, the data, or baggage, portion of a packet is thought to be immutable whereas the header portion is considered to be mutable. Although the header portion may be largely comprised of mutable fields, it often contains immutable fields as well. When practicing the invention it is desirable to compute hash values over at least a portion of the immutable fields of a packet to produce hash values that do not change as the packet traverses a network.

Embodiments disclosed herein may store the actual hash values to identify packets traversing the network, or they may use other techniques for minimizing storage requirements associated with retaining hash values and other information associated therewith. One such technique for minimizing storage requirements uses a bit array for storing hash values. Rather than storing the actual hash value, which can typically be on the order of 32 bits or more in length, the invention uses the hash value as an index for addressing into a bit array. In other words, when a hash value is computed for a forwarded packet, the hash value serves as the address location into the bit array. At the address corresponding to the hash value, a single bit is set at the respective location thus indicating that a particular hash value, and hence a particular data packet, has been seen by the router. For example, using a 32 bit hash value provides on the order of 4.3 billion possible index values into a bit array. Storing one bit per packet rather than storing the packet itself, which can be 1000 bits long, produces a storage ratio of 1:1000. While bit arrays are described by way of example, it will be obvious to those skilled in the relevant art, that other storage techniques may be employed without departing from the spirit of the invention.

While using a bit array significantly reduces memory requirements for participating routers, they are not eliminated. Over time, a memory will fill up and the possibility of overwriting an existing index value increases. The risk of overwriting an index value may be reduced if the bit array is periodically flushed to other storage media such as a magnetic disk drive, optical media, solid state drive, or the like. To facilitate this, a time-table may be established for flushing the bit array, wherein such time-table may be based on the speed of the router, number of input data streams, the size of available fast memory, and the like. If desired, the flushing cycle can be reduced by computing hash values only for a subset of the packets passing through a router. While this approach reduces the flushing cycle, it increases the possibility that a target packet may be missed, i.e. a hash value is not computed over a portion of it.

Figure 10:
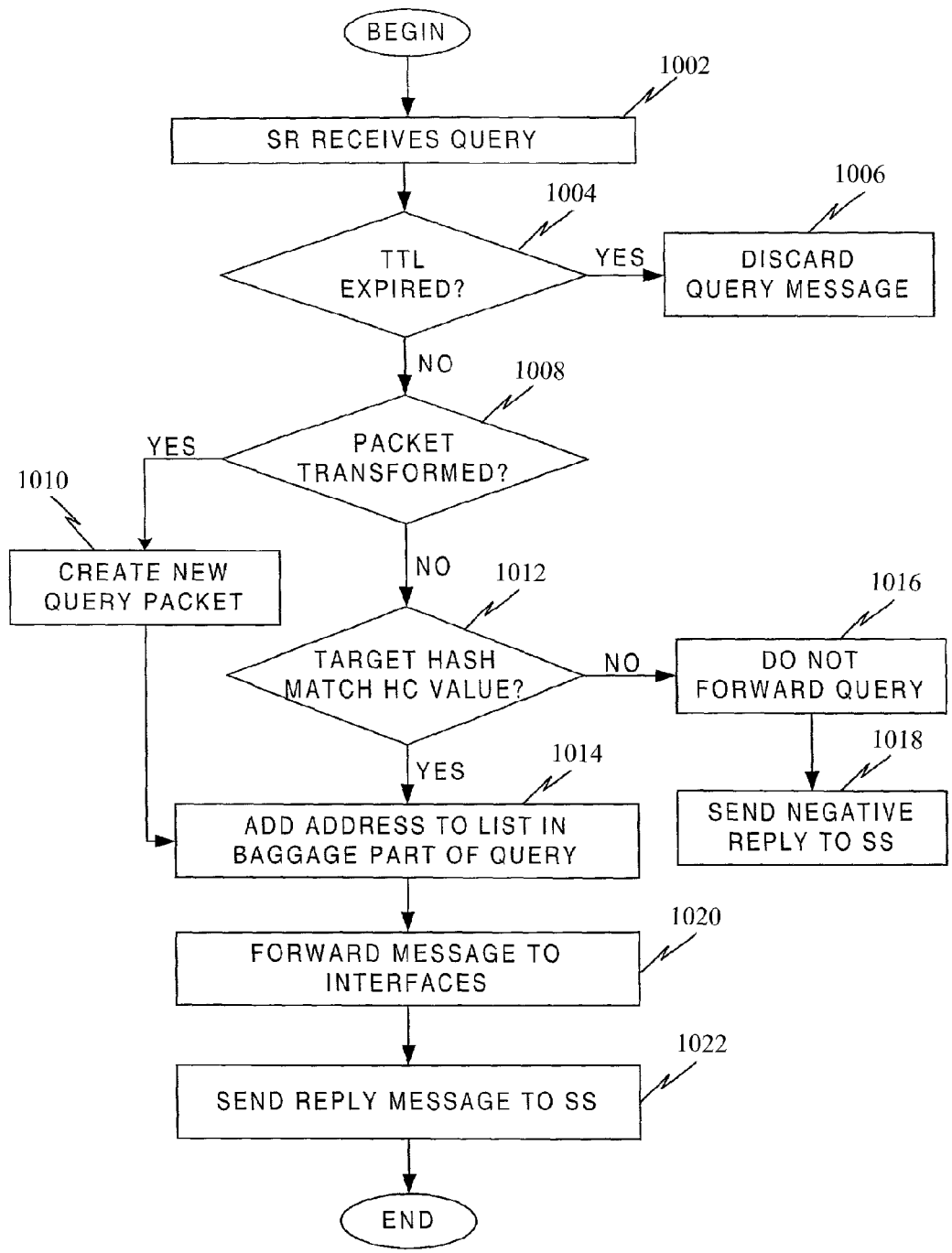
FIG. 10 is a flowchart illustrating an exemplary method for use with a source path isolation router.

FIG. 10 presents an exemplary method for an SR. While the foregoing discussion utilizes a single SR, namely SRI, it will be readily apparent to those skilled in the art that multiple SR's may be queried, and hence perform source path isolation essentially simultaneously. SRI receives QMI from SSI within ASI (step 1002). After receiving QM1, SRI may determine if a time-to-live (TTL) field in the query is expired (step 1004). If a TTL field is used, QM1 is discarded if the TTL field is expired (step 1006). A TTL field is normally employed because it provides an efficient mechanism for ensuring that SRI responds only to relevant, or timely, queries. In addition, employing TTL fields reduces the amount of data traversing the network between SS I and participating routers.

If the TTL field is not expired, SRI determines if TP1 has been transformed (step 1008). TP1 is transformed when it undergoes a transformation in route through a network such that a hash value computed over the immutable portion of the packet has a different value from that of the non-transformed portion. For example, TP1 may have undergone a transformation of the baggage portion of the packet in an attempt to make identification of TP1 and/or its source more difficult. If TP1 has been transformed, SRI creates a new query packet (QM2) containing a hash value for the immutable portion of the transformed packet (step 1010). Where no packet transformation has occurred, the method determines if the hash value computed matches an index value in the bit array (step 1012). As previously noted, index values contained in the bit array identify hash values of packets that have been forwarded by a queried router, here SRI. Depending on available memory in SRI, the hash value may be compared to bit array indices retrieved either from disk or from volatile memory.

If the hash value does not match an index value, SRI does not forward QM1 (step 1016), but instead may send a negative reply to SS1 (step 1018). If a queried SR determines that TP1 has been transformed, the hash value of this variant, referred to as QM2, may be added to the baggage portion of QM1 (step 1014), or alternatively can be used to create a new message (not shown) for forwarding to other devices. Next, QM1 is preferably forwarded to all interfaces excluding the one that QM1 was received on (step 1020). After forwarding the message, SRI sends a positive reply to SSI indicating that the packet has been observed (step 1022). The reply may contain the address of SRI, information about observed packets, and information about transformed packets, such as QM2, that have passed through SRI.

Exemplary Data Structure for Storing Packet Information

FIG. 11 illustrates exemplary data structures for storing information about TPs that have passed through SRI. Data structures can be divided into records, shown as R(1)-R(n) to facilitate storage and retrieval. Additionally, data structures may be stored in volatile or non-volatile memory. Since fast, or volatile, memory is expensive, it may be desirable to store incoming data to fast memory for a specified period of time that is a function of the memory size and incoming data rate. Often the time period will be chosen such that it ends when a selected record size is filled. When the record is full, it may be closed and flushed to less costly disk storage. Upon flushing a record from memory, a new record is opened and information about incoming data is stored. The flushing and opening of records can be overlapped in time to ensure that all incoming packets are accounted for. To further aid in efficient recall of flushed records, it may be desirable to time stamp records when they are opened. Time stamping records provides a convenient mechanism for tracking them in both volatile and non-volatile memory. In FIG. 11, R(1) is being filled in a fast memory such as RAM, and records R(2)-R(n) are stored to disk or other storage device.

As previously disclosed herein, a hash value is preferably determined over an immutable portion of TP1 when it passes through SRI, and the resulting hash value is used as an index value, or address, into a memory. The index value is used to facilitate the storage of information about a packet so that it can be uniquely identified. In FIG. 11, the index values are represented by E(0)-E(n) where n is the last entry location in memory. Since the hash value is used as the address, the number of available addresses will be determined by the size of the hash value used, for example 32, 64 or 128 bits. It is desirable that the memory be sized so that likelihood of an index being overwritten is very small. Also, it is beneficial to set all of the data storage locations to the same initial value, say "0", before storing data into memory, where "0" indicates that a packet has not yet been observed.

When a hash value is determined for a particular TP1, an indicator bit, or flag, is set at an address corresponding to that hash value. The indicator bit is used to confirm that a particular TP1 has either been "seen" or "not-seen". If a hash value is computed for a TP1, then the indicator bit is set to some state, for example to a "1". The "1" indicates that the respective TP1 has been "seen" by SRI. In FIG. 11, an indicator bit entry with a "1" denotes that the corresponding hash value has been seen, while a "0" indicates that a corresponding hash value has not been seen.

Exemplary Data Structure for Storing Trace Information

FIG. 12 illustrates an exemplary data structure 1200 stored in a database (not shown) in a memory on a source path isolation server. Data structure 1200 stores information used in conjunction with performing source path isolation of a target packet. While FIG. 12 illustrates one data structure, it will be obvious to those skilled in the relevant arts that a plurality of data structures may be employed and that the data structures may include additional parameters and take on different forms from those of the exemplary data structure discussed herein.

Data structure 1200 is comprised of a record R(1) containing attributes, or parameters, having data associated therewith. In the upper left portion of FIG. 12 are three parameters associated with the entire record R(1), namely a target packet attribute, shown as Target ID, a time attribute, shown as Time, and a source attribute, shown as Source. These attributes together serve as a handle for R(1) to facilitate storage into, and recall from, a machine-readable memory (not shown). Here Target ID is associated with unique information associated with a particular target packet (TP) received from a detection device such as an IDS or firewall. Time may be used to identify either the time at which TP was received at an SS, the time that TP was received at a detection device, or the time that R(1) was opened. Source may be used to identify the link that TP was detected on by the detection device, or alternatively, source may be used to uniquely identify the detection device that forwarded TP to SS.

Within 1200 are exemplary column headings indicating still other attributes that may be used to facilitate source path isolation of TP. For example, a network component identification attribute, shown as node D, may be used to identify particular nodes, such as routers, switches, bridges, or the like, within a network that have been queried by SS. Link may be used to identify the particular link on which TP was observed. A reply packet attribute, shown as Node Response, may be used to indicate if a queried node has observed TP. Node time may indicate the time, preferably using some common reference, at which a respective node observed TP.

Time is useful for assessing how long TP has been in the network and for performing comparisons with fields such as time-to-live (TTL). The attribute Transformed is used to track variants of TP in the event it has undergone a transformation. If TP has been transformed, it may be useful to have multiple entries associated the respective TP. For example in FIG. 12, node 04 has two entries for tracing an untransformed and a transformed version of TP. Status may be used to monitor network links associated with queried nodes. For example, a status of "ON" may indicate that a link is still active, i.e. carrying data traffic, while a status of "OFF" may indicate that a link has been disabled to exclude data traffic.

FIG. 12 illustrates one exemplary embodiment of a data structure that may be used for facilitating source path isolation; however, variations of the data structure format and number of records may be readily employed without departing from the spirit of the invention. For example, the terms "YES/NO" and "ON/OFF" used in conjunction with node response, transformed, and status may be desirable when conveying information to an operator; however, flags such as 1 or 0 may also be used to indicate the status of various attributes. In addition, a plurality of records may be generated when performing source path isolation. Additionally, other column entries may be used in conjunction with, or in place of, those shown in FIG. 12. For example, it may be desirable to associate the hash value, or alternatively, the contents of TP with each record. It may also be desirable to have a record associated with each target packet encountered or, alternatively, with each detection device employed within a network. And, it may be desirable to have still other data structures or records associated with source path solutions that have been generated in response to detected TPs.

Exemplary System for Performing Method

Figure 13:
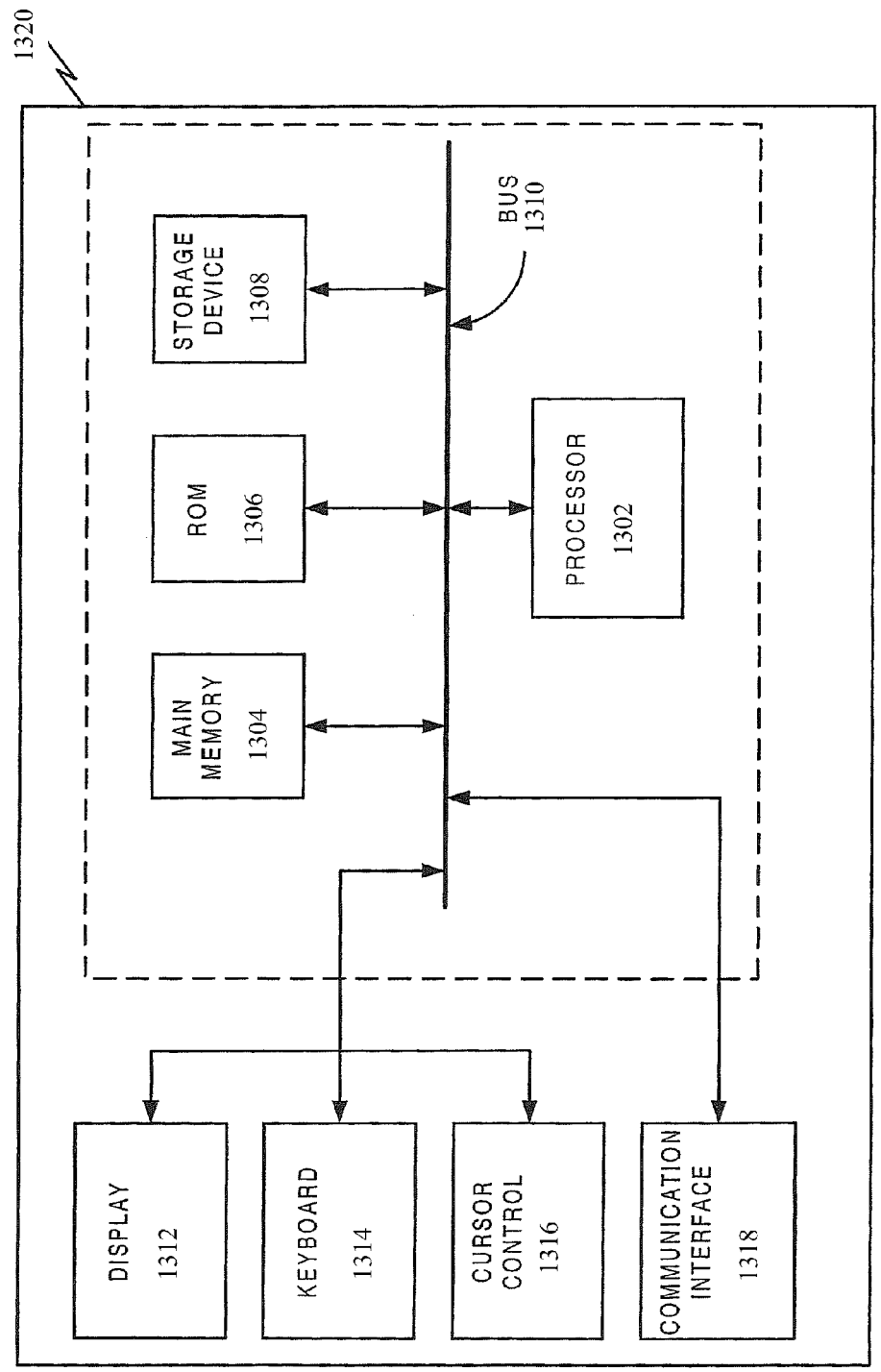
FIG. 13 is a block diagram of a general-purpose computer configurable for practicing exemplary embodiments or the invention.

FIG. 13 illustrates a system 1320 comprising a general-purpose computer that can be configured to practice disclosed embodiments. System 1320 executes machine-readable code to perform the methods heretofore disclosed and includes a processor 1302, main memory 1304, read only memory (ROM) 1306, storage device 1308, bus 1310, display 1312, keyboard 1314, cursor control 1316, and communication interface 1318.

Processor 1302 may be any type of conventional processing device that interprets and executes instructions. Main memory 1304 may be a random access memory (RAM) or a similar dynamic storage device. Main memory 1304 stores information and instructions to be executed by processor 1302. Main memory 1304 may also be used for storing temporary variables or other intermediate information during execution of instructions by processor 1302. ROM 1306 stores static information and instructions for processor 1302. It will be appreciated that ROM 1306 may be replaced with some other type of static storage device. Storage device 1308, also referred to as data storage device, may include any type of magnetic or optical media and their corresponding interfaces and operational hardware. Storage device 1308 stores information and instructions for use by processor 1302. Bus 1310 includes a set of hardware lines (conductors, optical fibers, or the like) that allow for data transfer among the components of system 1320. Display device 1312 may be a cathode ray tube (CRT), liquid crystal display (LCD) or the like, for displaying information in an operator or machine-readable form. Keyboard 1314 and cursor control 1316 allow the operator to interact with system 1320. Cursor control 1316 may be, for example, a mouse. In an alternative configuration, keyboard 1314 and cursor control 1316 can be replaced with a microphone and voice recognition means to enable an operator or machine to interact with system 1320.

Communication interface 1318 enables system 1320 to communicate with other devices/systems via any communications medium. For example, communication interface 1318 may be a modem, an Ethernet interface to a LAN, an interface to the Internet, a printer interface, etc. Alternatively, communication interface 1318 can be any other interface that enables communication between system 1320 and other devices, systems or networks. Communication interface 1318 can be used in lieu of keyboard 1314 and cursor control 1316 to facilitate operator or machine remote control and communication with system 1320. As will be described in detail below, system 1320 may provide SS1 operating within AS1 with the ability to perform source path isolation for a given TP. SS1 may receive MP1 from IDS1 and generate QM1 in response to processor 1302 executing sequences of instructions contained in, for example, memory 1304. Such instructions may be read into memory 1304 from another computer-readable medium, such as storage device 1308, or from another device coupled to bus 1310 or coupled via communication interface 1318. Execution of sequences of instructions contained in memory 1304 causes processor 1302 to perform the method described in conjunction with FIG. 9. For example, processor 1302 may execute instructions to perform the functions of receiving a target packet (step 1302), receiving replies from queried routers (step 1308), and building a trace of the path traveled by TP (step 1316). Alternatively, hard-wired circuitry may be used in place of or in combination with software instructions to implement the functions of SS1. Thus, the disclosed embodiments of SS1 are not limited to any specific combination of hardware circuitry and software. For example, the functionality may be implemented in an application specific integrated circuit (ASIC), a field-programmable gate array (FPGA), or the like, either alone or in combination with other devices to provide desired functionality.

Exemplary E-Mail System Configuration

Figure 14:
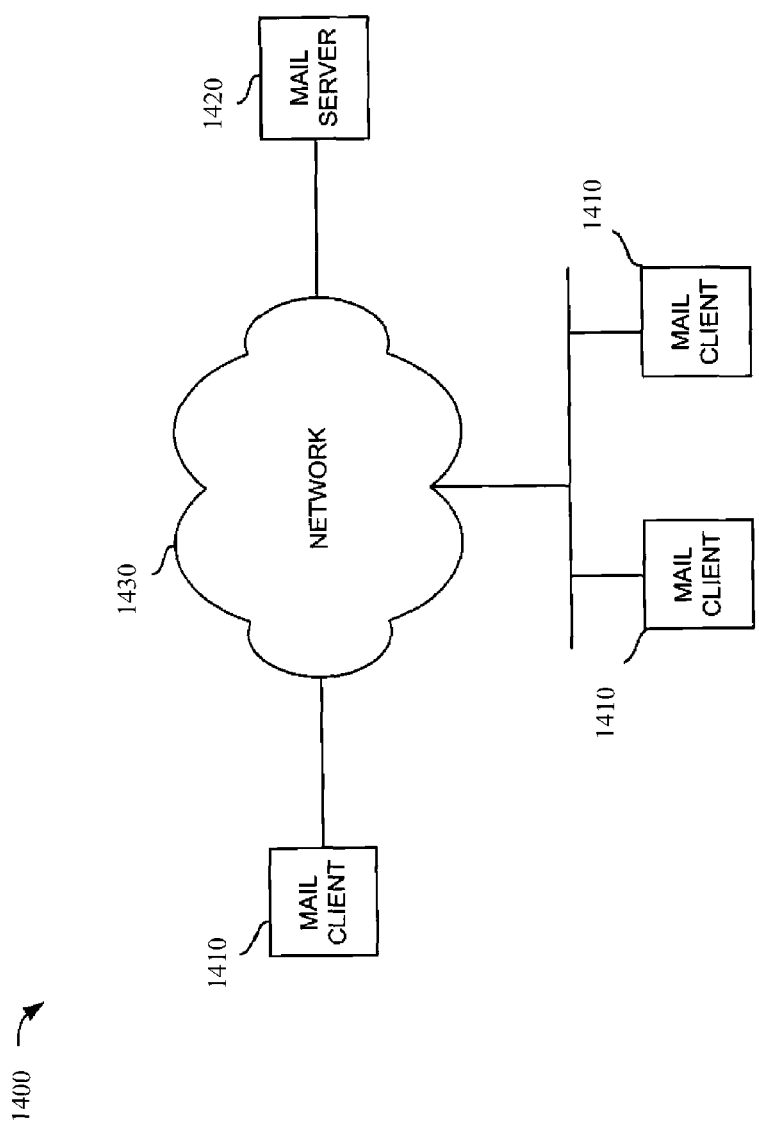
FIG. 14 is a diagram of a system in which systems and methods consistent with the present invention may be implemented.

FIG. 14 is a diagram of an exemplary system 1400 in which systems and methods consistent with the present invention may be implemented. System 1400 includes mail clients 1410 connected to a mail server 1420 via a network 1430. Connections made in system 1400 may be via wired, wireless, and/or optical communication paths. While FIG. 14 shows three mail clients 1410 and a single mail server 1420, there can be more or fewer clients and servers in other implementations consistent with the principles of the invention.

Network 1430 may facilitate communication between mail clients 1410 and mail server 1420. Typically, network 1430 may include a collection of network devices, such as routers or switches, that transfer data between mail clients 1410 and mail server 1420. In an implementation consistent with the present invention, network 1430 may take the form of a wide area network, a local area network, an intranet, the Internet, a public telephone network, a different type of network, or a combination of networks.

Mail clients 1410 may include personal computers, laptops, personal digital assistants, or other types of wired or wireless devices that are capable of interacting with mail server 1420 to receive e-mails. In another implementation, clients 1410 may include software operating upon one of these devices. Client 1410 may present e-mails to a user via a graphical user interface.

Mail server 1420 may include a computer or another device that is capable of providing e-mail services for mail clients 1410. In another implementation, server 1420 may include software operating upon one of these devices.

Figure 15:
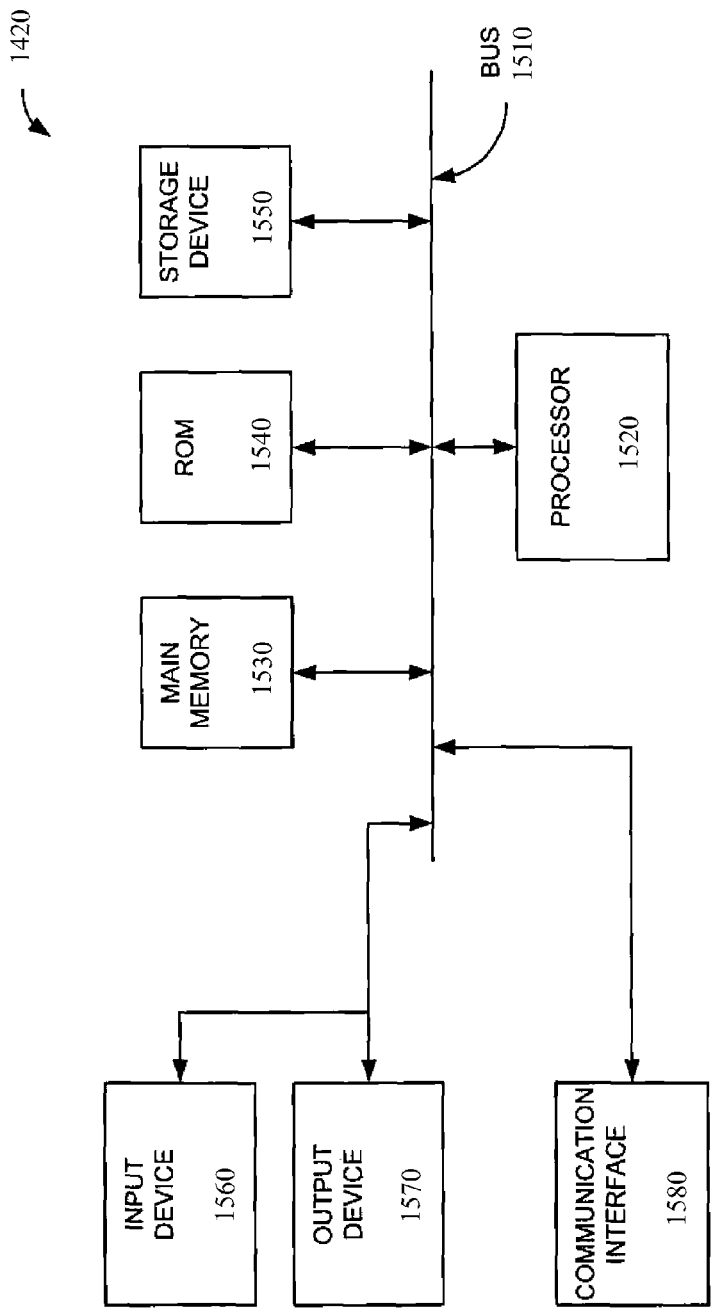
FIG. 15 is an exemplary diagram of the e-mail server of FIG. 14 according to an implementation consistent with the principles of the invention.

FIG. 15 is an exemplary diagram of mail server 1420 according to an implementation consistent with the principles of the invention. Server 1420 may include bus 1510, processor 1520, main memory 1530, read only memory (ROM) 1540, storage device 1550, input device 1560, output device 1570, and communication interface 1580. Bus 1510 permits communication among the components of server 1420.

Processor 1520 may include any type of conventional processor or microprocessor that interprets and executes instructions. Main memory 1530 may include a random access memory (RAM) or another type of dynamic storage device that stores information and instructions for execution by processor 1520. ROM 1540 may include a conventional ROM device or another type of static storage device that stores static information and instructions for use by processor 1520. Storage device 1550 may include a magnetic and/or optical recording medium and its corresponding drive.

Input device 1560 may include one or more conventional mechanisms that permit an operator to input information to server 1420, such as a keyboard, a mouse, a pen, voice recognition and/or biometric mechanisms, etc. Output device 1570 may include one or more conventional mechanisms that output information to the operator, such as a display, a printer, a pair of speakers, etc. Communication interface 1580 may include any transceiver-like mechanism that enables server 1420 to communicate with other devices and/or systems. For example, communication interface 1580 may include mechanisms for communicating with another device or system via a network, such as network 1430.

As will be described in detail below, server 1420, consistent with the present invention, provides e-mail services to clients 1410, while detecting unwanted e-mails and/or preventing unwanted e-mails from reaching clients 1410. Server 1420 may perform these tasks in response to processor 1520 executing sequences of instructions contained in, for example, memory 1530. These instructions may be read into memory 1530 from another computer-readable medium, such as storage device 1550 or a carrier wave, or from another device via communication interface 1580.

Execution of the sequences of instructions contained in memory 1530 may cause processor 1520 to perform processes that will be described later. Alternatively, hardwired circuitry may be used in place of or in combination with software instructions to implement processes consistent with the present invention. Thus, processes performed by server 1420 are not limited to any specific combination of hardware circuitry and software.

Figure 16:
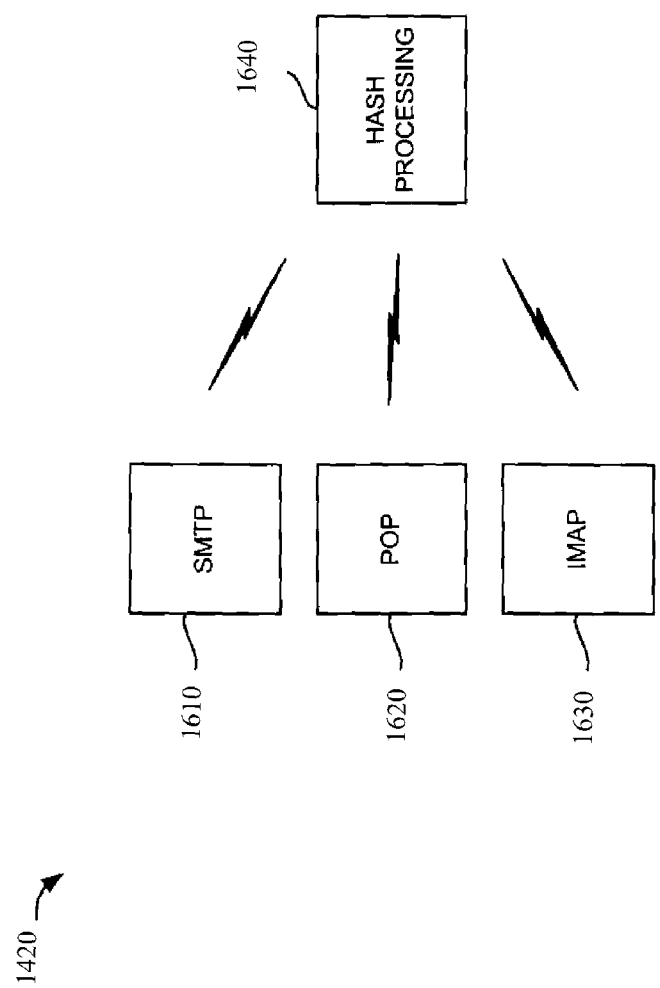
FIG. 16 is an exemplary functional block diagram of the e-mail server of FIG. 15 according to an implementation consistent with the principles of the invention.

FIG. 16 is an exemplary functional block diagram of mail server 1420 according to an implementation consistent with the principles of the invention. Server 1420 may include a Simple Mail Transfer Protocol (SMTP) block 1610, a Post Office Protocol (POP) block 1620, an Internet Message Access Protocol (IMAP) block 1630, and a hash processing block 1640.

SMTP block 1610 may permit mail server 1420 to communicate with other mail servers connected to network 1430 or another network. SMTP is designed to efficiently and reliably transfer e-mail across networks. SMTP defines the interaction between mail servers to facilitate the transfer of e-mail even when the mail servers are implemented on different types of computers or running different operating systems.

POP block 1620 may permit mail clients 1410 to retrieve e-mail from mail server 1420. POP block 1620 may be designed to always receive incoming e-mail. POP block 1620 may then hold e-mail for mail clients 1410 until mail clients 1410 connect to download them.

IMAP block 1630 may provide another mechanism by which mail clients 1410 can retrieve e-mail from mail server 1420. IMAP block 1630 may permit mail clients 1410 to access remote e-mail as if the e-mail was local to mail clients 1410.

Hash processing block 1640 may interact with SMTP block 1610, POP block 1620, and/or IMAP block 1630 to detect and prevent transmission of unwanted e-mail, such as e-mails containing viruses or worms and unsolicited commercial e-mail (spam).

Figure 17:
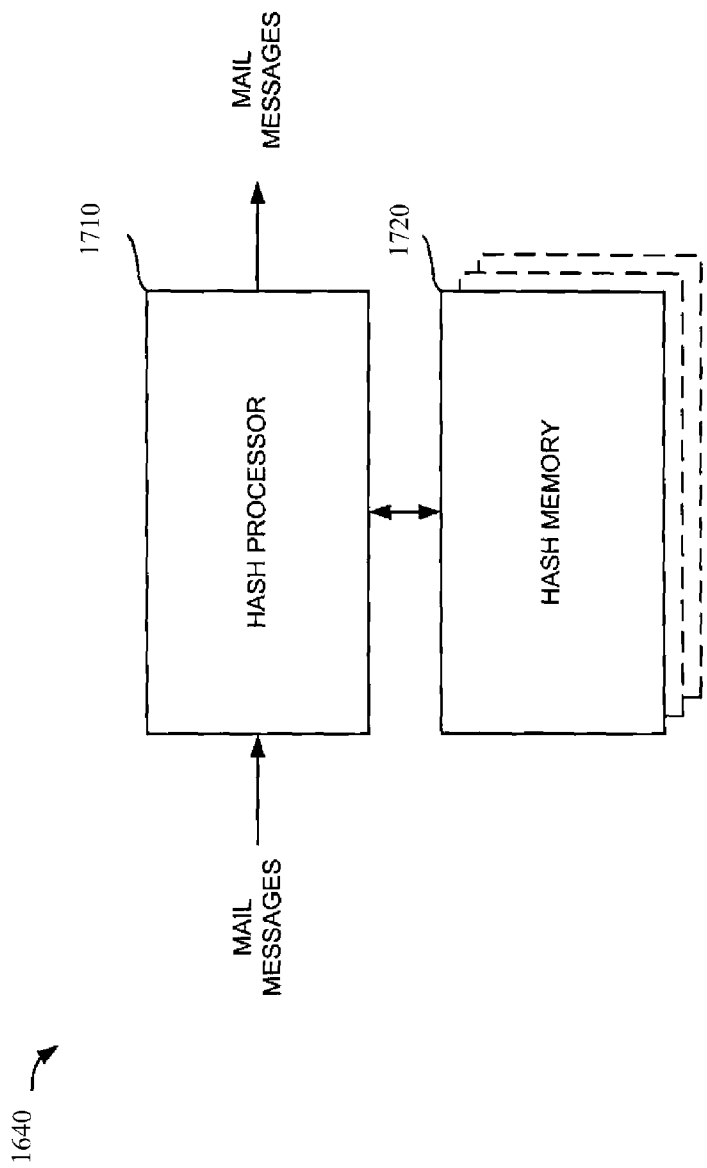
FIG. 17 is an exemplary diagram of the hash processing block of FIG. 16 according to an implementation consistent with the principles of the invention.

FIG. 17 is an exemplary diagram of hash processing block 1640 according to an implementation consistent with the principles of the invention. Hash processing block 1640 may include hash processor 1710 and one or more hash memories 1720. Hash processor 1710 may include a conventional processor, an application specific integrated circuit (ASIC), a field-programmable gate array (FPGA), or some other type of device that generates one or more representations for each received e-mail and records the e-mail representations in hash memory 1720.

An e-mail representation will likely not be a copy of the entire e-mail, but rather it may include a portion of the e-mail or some unique value representative of the e-mail. For example, a fixed width number may be computed across portions of the e-mail in a manner that allows the entire e-mail to be identified.

To further illustrate the use of representations, a 32-bit hash value, or digest, may be computed across portions of each e-mail. Then, the hash value may be stored in hash memory 1720 or may be used as an index, or address, into hash memory 1720. Using the hash value, or an index derived therefrom, results in efficient use of hash memory 1720 while still allowing the content of each e-mail passing through mail server 1420 to be identified.

Systems and methods consistent with the present invention may use any storage scheme that records information about one or more portions of each e-mail in a space-efficient fashion, that can definitively determine if a portion of an e-mail has not been observed, and that can respond positively (i.e., in a predictable way) when a portion of an e-mail has been observed. Although systems and methods consistent with the present invention can use virtually any technique for deriving representations of portions of e-mails, the remaining discussion will use hash values as exemplary representations of portions of e-mails received by mail server 1420.

In implementations consistent with the principles of the invention, hash processor 1710 may hash one or more portions of a received e-mail to produce a hash value used to facilitate hash-based detection. For example, hash processor 1710 may hash one or more of the main text within the message body, any attachments, and one or more header fields, such as sender-related fields (e.g., "From:," "Sender:," "Reply-To:," "Return-Path:," and "Error-To:"). Hash processor 1710 may perform one or more hashes on each of the e-mail portions using the same or different hash functions.

As described in more detail below, hash processor 1710 may use the hash results of the hash operation to recognize duplicate occurrences of e-mails and raise a warning if the duplicate e-mail occurrences arrive within a short period of time and raise their level of suspicion above some threshold. It may also be possible to use the hash results for tracing the path of an unwanted e-mail through the network.

Each hash value may be determined by taking an input block of data and processing it to obtain a numerical value that represents the given input data. Suitable hash functions are readily known in the art and will not be discussed in detail herein. Examples of hash functions include the Cyclic Redundancy Check (CRC) and Message Digest 5 (MD5). The resulting hash value, also referred to as a message digest or hash digest, may include a fixed length value. The hash value may serve as a signature for the data over which it was computed.

The hash value essentially acts as a fingerprint identifying the input block of data over which it was computed. Unlike fingerprints, however, there is a chance that two very different pieces of data will hash to the same value, resulting in a hash collision. An acceptable hash function should provide a good distribution of values over a variety of data inputs in order to prevent these collisions. Because collisions occur when different input blocks result in the same hash value, an ambiguity may arise when attempting to associate a result with a particular input.

Hash processor 1710 may store a representation of each e-mail it observes in hash memory 1720. Hash processor 1710 may store the actual hash values as the e-mail representations or it may use other techniques for minimizing storage requirements associated with retaining hash values and other information associated therewith. A technique for minimizing storage requirements may use one or more arrays or Bloom filters.

Rather than storing the actual hash value, which can typically be on the order of 32 bits or more in length, hash processor 1710 may use the hash value as an index for addressing an array within hash memory 1720. In other words, when hash processor 1710 generates a hash value for a portion of an e-mail, the hash value serves as the address location into the array. At the address corresponding to the hash value, a count value may be incremented at the respective storage location, thus, indicating that a particular hash value, and hence a particular e-mail portion, has been seen by hash processor 1710. In one implementation, the count value is associated with an 8-bit counter with a maximum value that sticks at 255. While counter arrays are described by way of example, it will be appreciated by those skilled in the relevant art, that other storage techniques may be employed without departing from the spirit of the invention.

Hash memory 1720 may store a suspicion count that is used to determine the overall suspiciousness of an e-mail message. For example, the count value (described above) may be compared to a threshold, and the suspicion count for the e-mail may be incremented if the threshold is exceeded. Hence, there may be a direct relationship between the count value and the suspicion count, and it may be possible for the two values to be the same. The larger the suspicion count, the more important the hit should be considered in determining the overall suspiciousness of the packet. Alternatively, the suspicion count can be combined in a "scoring function" with values from this or other hash blocks in the same message in order to determine whether the message should be considered suspicious.

It is not enough, however, for hash memory 1720 to simply identify that an e-mail contains content that has been seen recently. There are many legitimate sources (e.g., e-mail list servers) that produce multiple copies of the same message, addressed to multiple recipients. Similarly, individual users often e-mail messages to a group of people and, thus, multiple copies might be seen if several recipients happen to receive their mail from the same server. Also, people often forward copies of received messages to friends or co-workers.

In addition, virus/worm authors typically try to minimize the replicated content in each copy of the virus/worm, in order to not be detected by existing virus and worm detection technology that depends on detecting fixed sequences of bytes in a known virus or worm. These mutable viruses/worms are usually known as polymorphic, and the attacker's goal is to minimize the recognizability of the virus or worm by scrambling each copy in a different way. For the virus or worm to remain viable, however, a small part of it can be mutable in only a relatively small number of ways, because some of its code must be immediately-executable by the victim's computer, and that limits the mutation and obscurement possibilities for the critical initial code part.

In order to accomplish the proper classification of various types of legitimate and unwanted e-mail messages, multiple hash memories 1720 can be employed, with separate hash memories 1720 being used for specific sub-parts of a standard e-mail message. The outputs of different ones of hash memories 1720 can then be combined in an overall "scoring" or classification function to determine whether the message is undesirable or legitimate, and possibly estimate the probability that it belongs to a particular class of traffic, such as a virus/worm message, spam, e-mail list message, normal user-to-user message.

For e-mail following the Internet mail standard RFC 822 (and its various extensions), hashing of certain individual e-mail header fields into field-specific hash memories 1720 may be useful. Among the header fields for which this may be helpful are: (1) various sender-related fields, such as "From:", "Sender:", "Reply-To:", "Return-Path:" and "Error-To:"; (2) the "To:" field (often a fixed value for a mailing list, frequently missing or idiosyncratic in spam messages); and (3) the last few "Received:" headers (i.e., the earliest ones, since they are normally added at the top of the message), excluding any obvious timestamp data. It may also be useful to hash a combination of the "From:" field and the e-mail address of the recipient (transferred as part of the SMTP mail-transfer protocol, and not necessarily found in the message itself).

Any or all of hash memories 1420 may be pre-loaded with knowledge of known good or bad traffic. For example, known viruses and spam content (e.g., the infamous "Craig Shergold letter" or many pyramid swindle letters) can be pre-hashed into the relevant hash memories 1720, and/or periodically refreshed in the memory as part of a periodic "cleaning" process described below. Also, known legitimate mailing lists, such as mailing lists from legitimate e-mail list servers, can be added to a "From:" hash memory 1720 that passes traffic without further examination.

Over time, hash memories 1720 may fill up and the possibility of overflowing an existing count value increases. The risk of overflowing a count value may be reduced if the counter arrays are periodically flushed to other storage media, such as a magnetic disk drive, optical media, solid state drive, or the like. Alternatively, the counter arrays may be slowly and incrementally erased. To facilitate this, a time-table may be established for flushing/erasing the counter arrays. If desired, the flushing/erasing cycle can be reduced by computing hash values only for a subset of the e-mails received by mail server 1420. While this approach reduces the flushing/erasing cycle, it increases the possibility that a target e-mail may be missed (i.e., a hash value is not computed over a portion of it).

Non-zero storage locations within hash memories 1720 may be decremented periodically rather than being erased. This may ensure that the "random noise" from normal e-mail traffic would not remain in a counter array indefinitely. Replicated traffic (e.g., e-mails containing a virus/worm that are propagating repeatedly across the network), however, would normally cause the relevant storage locations to stay substantially above the "background noise" level.

One way to decrement the count values in the counter array fairly is to keep a total count, for each hash memory 1720, of every time one of the count values is incremented. After this total count reaches some threshold value (probably in the millions), for every time a count value is incremented in hash memory 1720, another count value gets decremented. One way to pick the count value to decrement is to keep a counter, as a decrement pointer, that simply iterates through the storage locations sequentially. Every time a decrement operation is performed, the following may done: (a) examine the candidate count value to be decremented and if non-zero, decrement it and increment the decrement pointer to the next storage location; and (b) if the candidate count value is zero, then examine each sequentially-following storage location until a non-zero count value is found, decrement that count value, and advance the decrement pointer to the following storage location.

It may be important to avoid decrementing any counters below zero, while not biasing decrements unfairly. Because it may be assumed that the hash is random, this technique should not favor any particular storage location, since it visits each of them before starting over. This technique may be superior to a timer-based decrement because it keeps a fixed total count population across all of the storage locations, representing the most recent history of traffic, and is not subject to changes in behavior as the volume of traffic varies over time.

A variation of this technique may include randomly selecting a count value to decrement, rather than processing them cyclically. In this variation, if the chosen count value is already zero, then another one could be picked randomly, or the count values in the storage locations following the initially-chosen one could be examined in series, until a non-zero count value is found.

Exemplary Processing for Unwanted E-Mail Detection/Prevention

FIGS. 18A-18E are flowcharts of exemplary processing for detecting and/or preventing transmission of unwanted e-mail, such as an e-mail containing a virus or worm, including a polymorphic virus or worm, or an unsolicited commercial e-mail (spam), according to an implementation consistent with the principles of the invention. The processing of FIGS. 18A-18E will be described in terms of a series of acts that may be performed by mail server 1420. In implementations consistent with the principles of the invention, some of the acts may be optional and/or performed in an order different than that described. In other implementations, different acts may be substituted for described acts or added to the process.

Figure 18A:
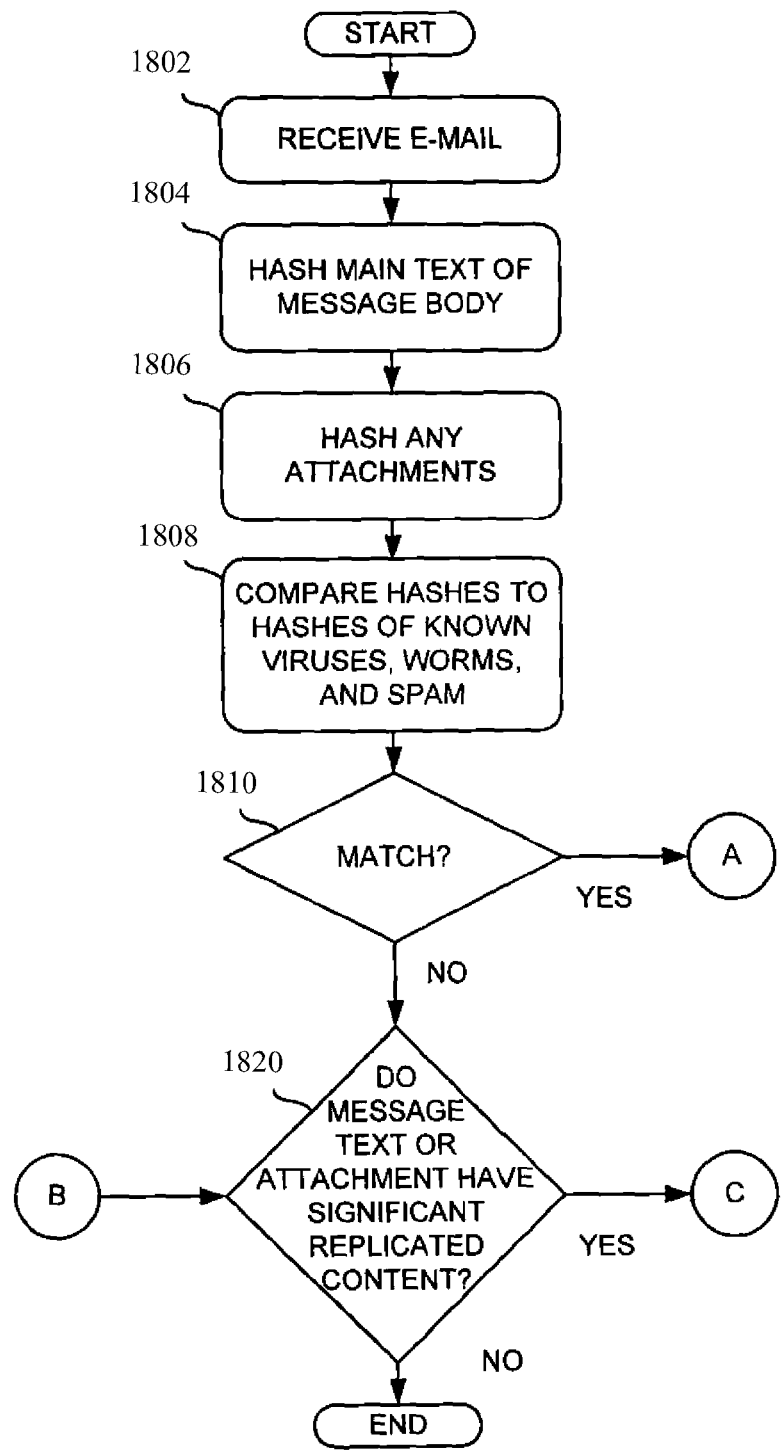
FIGS. 18A-18E are flowcharts of exemplary processing for detecting and/or preventing transmission of an unwanted e-mail message, such as an e-mail containing a virus or worm, including a polymorphic virus or worm, or an unsolicited commercial e-mail, according to an implementation consistent with the principles of the invention.

Processing may begin when hash processor 1710 (FIG. 17) receives, or otherwise observes, an e-mail message (act 1802) (FIG. 18A). Hash processor 1710 may hash the main text of the message body, excluding any attachments (act 1804). When hashing the main text, hash processor 1710 may perform one or more conventional hashes covering one or more portions, or all, of the main text. For example, hash processor 1710 may perform hash functions on fixed or variable sized blocks of the main text. It may be beneficial for hash processor 1710 to perform multiple hashes on each of the blocks using the same or different hash functions.

It may be desirable to pre-process the main text to remove attempts to fool pattern-matching mail filters. An example of this is HyperText Markup Language (HTML) e-mail, where spammers often insert random text strings in HTML comments between or within words of the text. Such e-mail may be referred to as "polymorphic spam" because it attempts to make each message appear unique. This method for evading detection might otherwise defeat the hash detection technique, or other string-matching techniques. Thus, removing all HTML comments from the message before hashing it may be desirable. It might also be useful to delete HTML tags from the message, or apply other specialized, but simple, pre-processing techniques to remove content not actually presented to the user. In general, this may be done in parallel with the hashing of the message text, since viruses and worms may be hidden in the non-visible content of the message text.

Hash processor 1710 may also hash any attachments, after first attempting to expand them if they appear to be known types of compressed files (e.g., "zip" files) (act 1806). When hashing an attachment, hash processor 1710 may perform one or more conventional hashes covering one or more portions, or all, of the attachment. For example, hash processor 1710 may perform hash functions on fixed or variable sized blocks of the attachment. It may be beneficial for hash processor 1710 to perform multiple hashes on each of the blocks using the same or different hash functions.

Hash processor 1710 may compare the main text and attachment hashes with known viruses, worms, or spam content in a hash memory 1720 that is pre-loaded with information from known viruses, worms, and spam content (acts 1808 and 1810). If there are any hits in this hash memory 1720, there is a probability that the e-mail message contains a virus or worm or is spam. A known polymorphic virus may have only a small number of hashes that match in this hash memory 1720, out of the total number of hash blocks in the message. A non-polymorphic virus may have a very high fraction of the hash blocks hit in hash memory 1720. For this reason, storage locations within hash memory 1720 that contain entries from polymorphic viruses or worms may be given more weight during the pre-loading process, such as by giving them a high initial suspicion count value.

A high fraction of hits in this hash memory 1720 may cause the message to be marked as a probable known virus/worm or spam. In this case, the e-mail message can be sidetracked for remedial action, as described below.

A message with a significant "score" from polymorphic virus/worm hash value hits may or may not be a virus/worm instance, and may be sidetracked for further investigation, or marked as suspicious before forwarding to the recipient. An additional check may also be made to determine the level of suspicion.

Figure 18B:
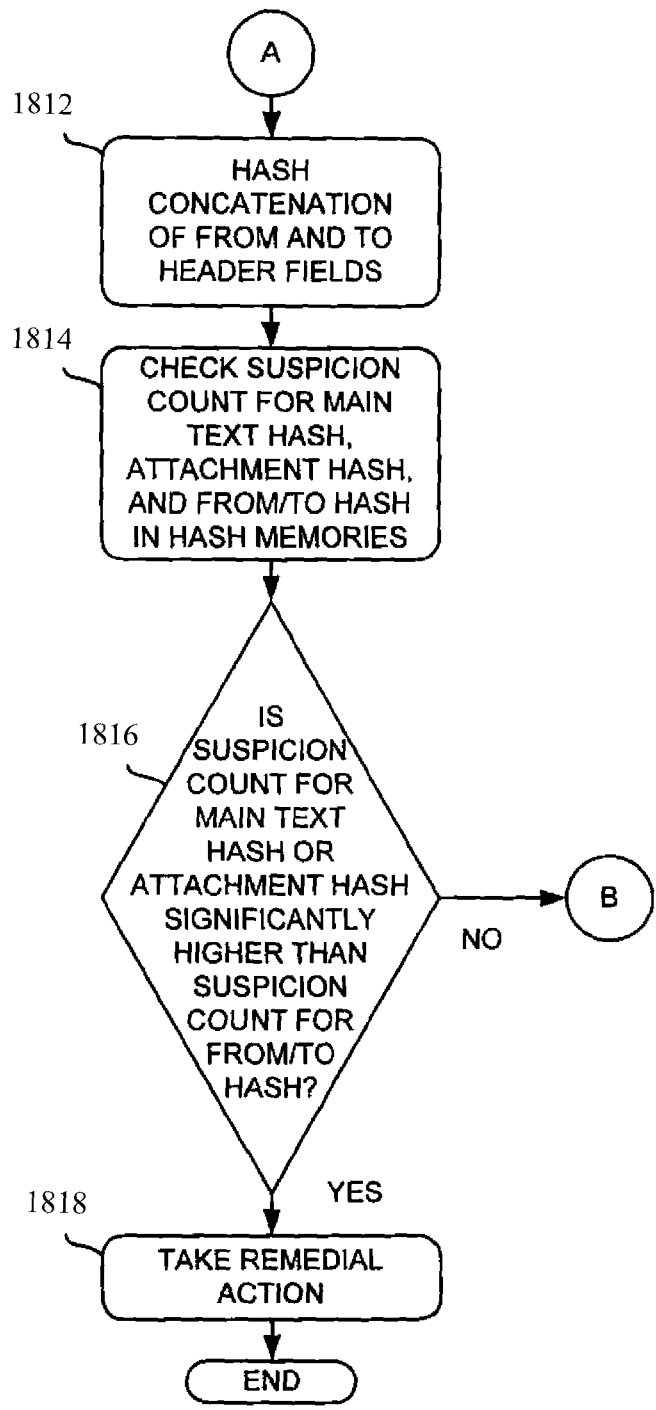

For example, hash processor 1710 may hash a concatenation of the From and To header fields of the e-mail message (act 1812) (FIG. 18B). Hash processor 1710 may then check the suspicion counts in hash memories 1720 for the hashes of the main text, any attachments, and the concatenated From/To (act 1814). Hash processor 1710 may determine whether the main text or attachment suspicion count is significantly higher than the From/To suspicion count (act 1816). If so, then the content is appearing much more frequently outside the messages between this set of users (which might otherwise be due to an e-mail exchange with repeated message quotations) and, thus, is much more suspicious.

When this occurs, hash processor 1710 may take remedial action (act 1818). The remedial action taken might take different forms, which may be programmable or determined by an operator of mail server 1420. For example, hash processor 1710 may discard the e-mail. This is not recommended for anything but virtually-certain virus/worm/spam identification, such as a perfect match to a known virus.

As an alternate technique, hash processor 1710 may mark the e-mail with a warning in the message body, in an additional header, or other user-visible annotation, and allow the user to deal with it when it is downloaded. For data that appears to be from an unknown mailing list, a variant of this option is to request the user to send back a reply message to the server, classifying the suspect message as either spam or a mailing list. In the latter case, the mailing list source address can be added to the "known legitimate mailing lists" hash memory 1720.

As another technique, hash processor 1710 may subject the e-mail to more sophisticated (and possibly more resource-consuming) detection algorithms to make a more certain determination. This is recommended for potential unknown viruses/worms or possible detection of a polymorphic virus/worm.

As yet another technique, hash processor 1710 may hold the e-mail message in a special area and create a special e-mail message to notify the user of the held message (probably including From and Subject fields). Hash processor 1710 may also give instructions on how to retrieve the message.

As a further technique, hash processor 1710 may mark the e-mail message with its suspicion score result, but leave it queued for the user's retrieval. If the user's quota would overflow when a new message arrives, the score of the incoming message and the highest score of the queued messages are compared. If the highest queued message has a score above a settable threshold, and the new message's score is lower than the threshold, the queued message with the highest score may be deleted from the queue to make room for the new message. Otherwise, if the new message has a score above the threshold, it may be discarded or "bounced" (e.g., the sending e-mail server is told to hold the message and retry it later). Alternatively, if it is desired to never bounce incoming messages, mail server 1420 may accept the incoming message into the user's queue and repeatedly delete messages with the highest suspicion score from the queue until the total is below the user's quota again.

As another technique, hash processor 1710 may apply hash-based functions as the e-mail message starts arriving from the sending server and determine the message's suspicion score incrementally as the message is read in. If the message has a high-enough suspicion score (above a threshold) during the early part of the message, mail server 1420 may reject the message, optionally with either a "retry later" or a "permanent refusal" result to the sending server (which one is used may be determined by settable thresholds applied to the total suspicion score, and possibly other factors, such as server load). This results in the unwanted e-mail using up less network bandwidth and receiving server resources, and penalizes servers sending unwanted mail, relative to those that do not.

If the suspicion count for the main text or any attachment is not significantly higher than the From/To suspicion count (act 1816), hash processor 1710 may determine whether the main text or any attachment has significant replicated content (non-zero or high suspicion count values for many hash blocks in the text/attachment content in all storage locations of hash memories 1720) (act 1820) (FIG. 18A). If not, the message is probably a normal user-to-user e-mail. These types of messages may be "passed" without further examination. When appropriate, hash processor 1710 may also record the generated hash values by incrementing the suspicion count value in the corresponding storage locations in hash memory 1720.

Figure 18C:
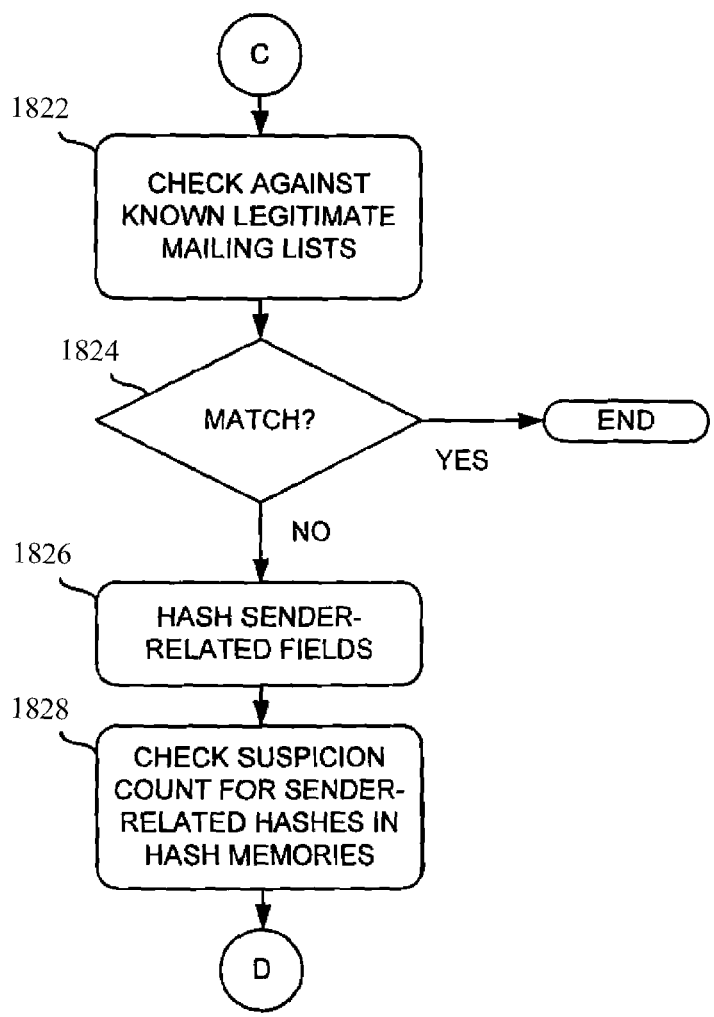

If the message text is substantially replicated (e.g., greater than 90%), hash processor 1710 may check one or more portions of the e-mail message against known legitimate mailing lists within hash memory 1720 (act 1822) (FIG. 18C). For example, hash processor 1710 may hash the From or Sender fields of the e-mail message and compare it/them to known legitimate mailing lists within hash memory 1720. Hash processor 1710 may also determine whether the e-mail actually appears to originate from the correct source for the mailing list by examining, for example, the sequence of Received headers. Hash processor 1710 may further examine a combination of the From or Sender fields and the recipient address to determine if the recipient has previously received e-mail from the sender. This is typical for mailing lists, but atypical of unwanted e-mail, which will normally not have access to the actual list of recipients for the mailing list. Failure of this examination may simply pass the message on, but mark it as "suspicious," since the recipient may simply be a new subscriber to the mailing list, or the mailings may be infrequent enough to not persist in the hash counters between mailings.

If there is a match with a legitimate mailing list (act 1824), then the message is probably a legitimate mailing list duplicate and may be passed with no further examination. This assumes that the mailing list server employs some kind of filtering to exclude unwanted e-mail (e.g., refusing to forward e-mail that does not originate with a known list recipient or refusing e-mail with attachments).

If there is no match with any legitimate mailing lists within hash memory 1720, hash processor 1710 may hash the sender-related fields (e.g., From, Sender, Reply-To) (act 1826). Hash processor 1710 may then determine the suspicion count for the sender-related hashes in hash memories 1720 (act 1828).

Figure 18D:
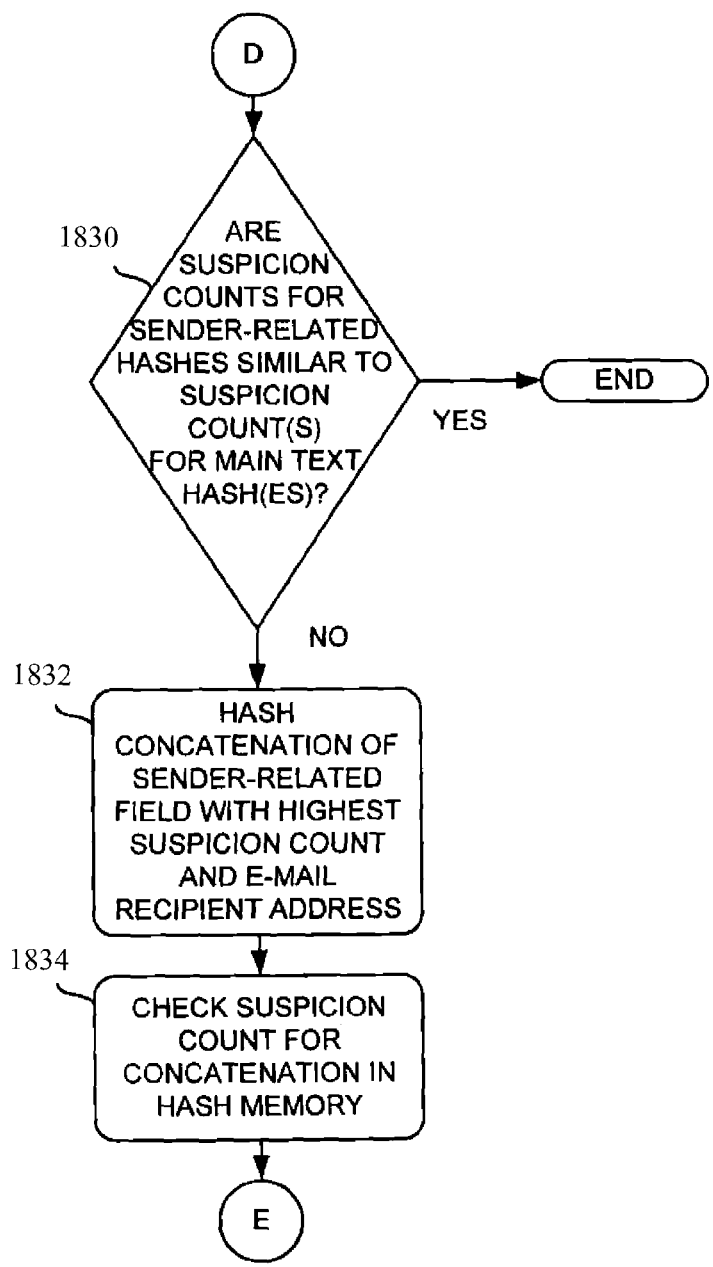
Figure 18E:
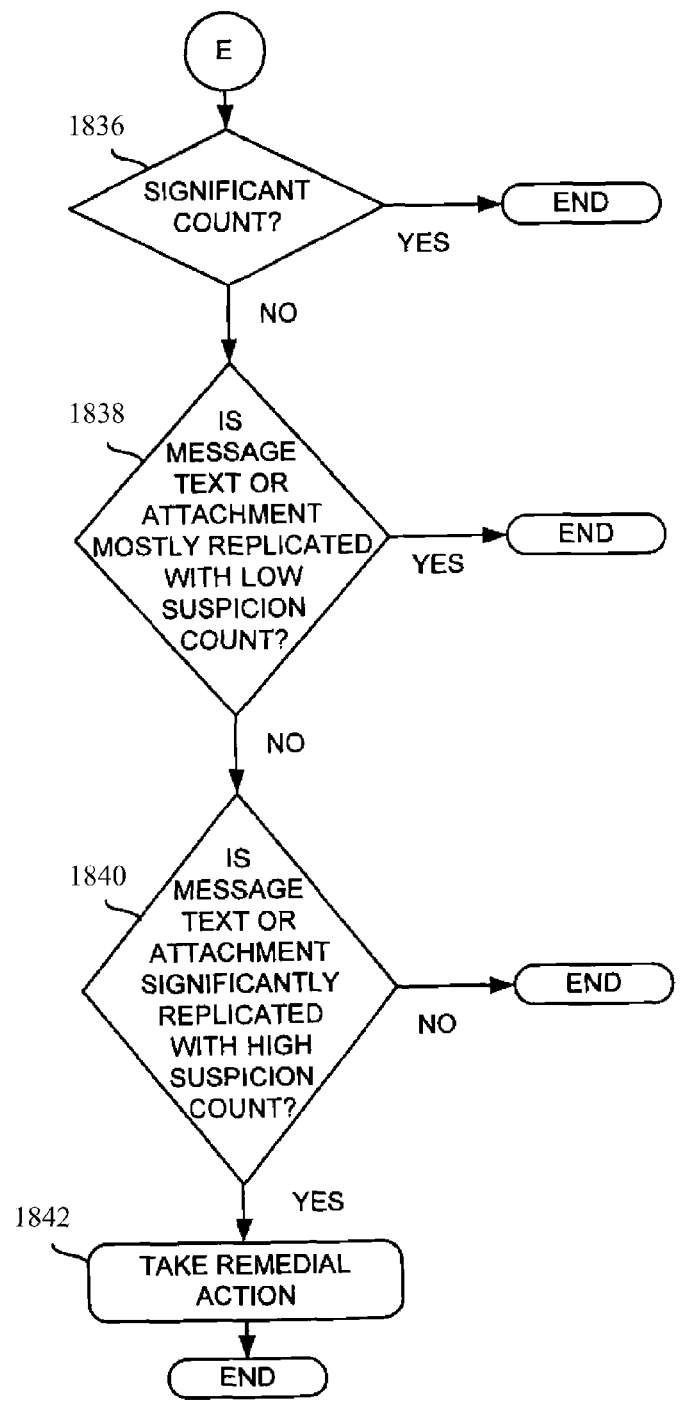

Hash processor 1710 may determine whether the suspicion counts for the sender-related hashes are similar to the suspicion count(s) for the main text hash(es) (act 1830) (FIG. 18D). If both From and Sender fields are present, then the Sender field should match with roughly the same suspicion count value as the message body hash. The From field may or may not match. For a legitimate mailing list, it may be a legitimate mailing list that is not in the known legitimate mailing lists hash memory 1720 (or in the case where there is no known legitimate mailing lists hash memory 1720). If only the From field is present, it should match about as well as the message text for a mailing list. If none of the sender-related fields match as well as the message text, the e-mail message may be considered moderately suspicious (probably spam, with a variable and fictitious From address or the like).

As an additional check, hash processor 1710 may hash the concatenation of the sender-related field with the highest suspicion count value and the e-mail recipient's address (act 1832). Hash processor 1710 may then check the suspicion count for the concatenation in a hash memory 1720 used just for this check (act 1834). If it matches with a significant suspicion count value (act 1836) (FIG. 18E), then the recipient has recently received multiple messages from this source, which makes it probable that it is a mailing list. The e-mail message may then be passed without further examination.

If the message text or attachments are mostly replicated (e.g., greater than 90% of the hash blocks), but with mostly low suspicion count values in hash memory 1720 (act 1838), then the message is probably a case of a small-scale replication of a single message to multiple recipients. In this case, the e-mail message may then be passed without further examination.

If the message text or attachments contain some significant degree of content replication (say, greater than 50% of the hash blocks) and at least some of the hash values have high suspicion count values in hash memory 1720 (act 1840), then the message is fairly likely to be a virus/worm or spam. A virus or worm should be considered more likely if the high-count matches are in an attachment. If the highly-replicated content is in the message text, then the message is more likely to be spam, though it is possible that e-mail text employing a scripting language (e.g., Java script) might also contain a virus.

If the replication is in the message text, and the suspicion count is substantially higher for the message text than for the From field, the message is likely to be spam (because spammers generally vary the From field to evade simpler spam filters). A similar check can be made for the concatenation of the From and To header fields, except that in this case, it is most suspicious if the From/To hash misses (finds a zero suspicion count), indicating that the sender does not ordinarily send e-mail to that recipient, making it unlikely to be a mailing list, and very likely to be a spammer (because they normally employ random or fictitious From addresses).

In the above cases, hash processor 1710 may take remedial action (act 1842). The particular type of action taken by hash processor 1710 may vary as described above.

CONCLUSION

Systems and methods consistent with the present invention provide mechanisms to detect and/or prevent transmission of malicious packets, such as polymorphic viruses and worms.

Systems and methods consistent with the principles of the invention detect polymorphic viruses and worms with some finite probability, which may depend on the size of the decoder bootstrap code segment and the techniques used to obscure it (such as code rearrangement and the insertion of gibberish bytes). Also, the number of virus and worm examples that must be seen before detection becomes probable depends on the threshold settings, the degree to which different copies of the virus/worm resemble each other, the minimum hash block size used, and the rate at which copies arrive. Essentially, what happens is that short code sequences of the virus/worm decoder bootstrap will occasionally be in a single hash block, without any of the obscuring "cover" of gibberish bytes.

If the bootstrap is only obscured by inserted no-ops or irrelevant code sequences, packet detection logic 200 may eventually see samples of all variants of these in various lengths, and also in conjunction with the active code, and will actually recognize the virus/worm more easily, though usually after seeing many samples.

In either case, some set of byte sequences commonly found in the virus/worm, and found much less commonly in other network traffic, may be detected often enough that these sequences will rise above the "noise" level of the data stored in hash memory 220 and, thus, be detectable. Not every packet containing the virus/worm decoder bootstrap, however, will be detected this way, since it may be that none of the hash blocks in the particular packet isolated the fixed, active code elements. Thus, systems and methods consistent with the principles of the invention may be used to provide a warning that a virus/worm is potentially propagating and capture suspicious packets for human analysis.

Non-polymorphic viruses and worms may also be detected somewhat more quickly by these techniques because block alignment is not the same in every packet and partial matches will be more common early in the appearance of the virus/worm in the network, at least for longer packets. The certainty of detection will be correspondingly lower. So, it may take somewhat more examples of the virus/worm to reach the same degree of certainty of detection of the virus/worm, as with the fixed-length hash blocks, due to the randomness introduced into the hash-sampling process.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, systems and methods have been described with regard to network-level devices. In other implementations, the systems and methods described herein may be used with a stand-alone device at the input or output of a network link or at other protocol levels, such as in mail relay hosts (e.g., Simple Mail Transfer Protocol (SMTP) servers).

To this regard, the variable-sized block hashing technique described previously can be used in conjunction with traditional host-based virus scanning software. For example, training data may be obtained from a network application and the hash memory contents may then be transmitted to one or more hosts to aid in looking for the suspected virus or worm on the host. In other words, the host may receive hash values associated with the suspected virus or worm from the network application. The host may hash one or more variable-sized portions of the files stored in its memory to generate hash values associated with these files. The host may compare the generated hash values to the hash values associated with the suspected virus or worm and identify one or more files that may contain the suspected virus or worm when the hash values match. The technique may be used as a prioritization stage to determine which files most likely contain a virus or worm. The virus scanning software could then use other, more expensive, techniques to scan these files.

The variable-sized block hashing technique may also be used in conjunction with network-based applications, where suspicious messages are delivered to a reassembly process and the resulting messages scanned by a more conventional (e.g., execution simulating) virus detector.

While a series of acts has been described with regard to the flowchart of FIG. 4, the order of the acts may differ in other implementations consistent with the principles of the invention. In addition, non-dependent acts may be performed concurrently.

Further, certain portions of the invention have been described as "logic" that performs one or more functions. This logic may include hardware, such as an ASIC or a FPGA, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. In a network carrying a plurality of packets over at least one network link, the network including a first network component having memory and a processor and configured to store information in the memory about at least one of the plurality of packets, a method for detecting a target packet comprising:
    receiving at least one of the plurality of packets over the link to obtain a received packet;
    determining a representation of at least a portion of the received packet;
    identifying a location in the memory;
    associating a value with the location in the memory;
    receiving a query message identifying a target packet at the first network component;
    the first network component using the value associated with the location in the memory in processing the query message to determine if the target packet has been encountered;
    creating a reply if the target packet has been encountered; and
    the first network component making the reply available to the network if the target packet has been encountered;
    wherein the reply is capable of being used as part of a method for locating an intrusion point of the target packet in the network.

2. The method of claim 1, wherein the making the reply available to the network includes forwarding the reply to a second network component.

3. The method of claim 2, wherein the second network component is a computer.

4. The method of claim 1, wherein the reply contains a network address for the first network component.

5. The method of claim 1, wherein the representation is determined over the entire received packet.

6. The method of claim 1, further comprising:
    determining if the received packet has undergone a transformation, such transformation having occurred if a first hash value of at least a portion of the received packet computed at a first time is not equal to a second hash value of at least a portion of the received packet computed at a second time, the second time occurring after the first time.

7. The method of claim 1, wherein the network is an Internet Protocol (IP) network.

8. The method of claim 1, wherein the link is a wireless link.

9. The method of claim 1, wherein the first network component is a router.

10. In a network carrying a plurality of packets over at least one link, the network including a network component operatively coupled to the link and having a memory and a processor, a method for storing information about a plurality of packets received over the network, at least a portion of the information being used to locate an intrusion point for a first one of the plurality of packets, the method comprising:
receiving the first one of the plurality of packets;
determining a first representation of the first one of the plurality of packets over at least a portion thereof;
identifying a first location in the memory;
associating a value with the first location in the memory;
receiving a second one of the plurality of packets;
processing the second one of the plurality of packets to obtain information contained therein;
using the information contained in the second one of the plurality of packets to determine if the first one of the plurality of packets has been observed; and
making a reply available to the network, in response to receiving a query message identifying a target packet, if the information contained in the second one of the plurality of packets indicates that the first one of the plurality of packets has been observed, the reply capable of being used as part of a method for locating the intrusion point for the first one of the plurality of packets to assist in determining a source location of an intrusion point of the target packet in the network.

11. A system comprising:
a first interface for receiving at least one of a plurality of packets to obtain at least one received packet from a network;
a second interface for placing at least a subset of the at least one received packet onto a link;
a bus communicatively coupled to the first interface and the second interface;
a memory communicatively coupled to the bus, the memory for storing information about the at least one received packet in a machine-readable form;
a processor communicatively coupled to the bus and the memory, the processor configured for executing machine-readable instructions for processing the at least one received packet;
wherein the system is operable such that the memory is capable of storing the information in a form of one or more first representations for the at least one received packet, each of the one or more first representations determined from a corresponding one of the at least one received packet respectively;
wherein the system is operable to receive a query message including a second representation associated with a target packet in the network and use the stored one or more first representations in the memory in processing the query message to determine if the target packet has been encountered; and
wherein the system is operable to generate a reply after comparing the second representation to the stored one or more first representations; wherein the reply is capable of being used for locating an intrusion point associated with the target packet in the network.

12. The system of claim 11, wherein the first interface and the second interface are combined into a single bi-directional interface.

13. The system of claim 11, wherein the reply is made available to another network.

14. The system of claim 11, wherein the network is a wireless network.

15. The system of claim 11, wherein the network is an Internet Protocol (IP) network.

16. The system of claim 11, wherein the processor is an ASIC.

17. The system of claim 11, wherein the reply is a positive reply if the second representation matches at least one of the plurality of first representations.

18. The system of claim 11, wherein the reply is forwarded to those of a plurality of devices one hop away in the network.

19. The system of claim 11, wherein the system is operable such that the reply is forwarded to an isolation server responsive to operation of an intrusion detection system, for isolating a malicious packet.

20. The system of claim 19, wherein the system is operable such that the reply is related to building a trace of potential paths taken by the malicious packet.

21. The system of claim 11, wherein the system is operable such that the first representations include hash values.

22. The system of claim 11, wherein the system is operable such that the processor executes machine-readable instructions for establishing a bit map of the first representations representative of the at least one received packet.

23. The system of claim 11, wherein the system is operable such that the second representation is a hash of at least a portion of the at least one received packet.

24. The system of claim 11, wherein the system is operable such that the processor executes machine-readable instructions for determining whether a target packet has been encountered in the network.

25. The system of claim 24, wherein the system is operable such that the determining is accomplished using a source path isolation technique.

26. The system of claim 25, wherein the system is operable such that the source path isolation technique includes a breadth-first search.

27. The system of claim 25, wherein the system is operable such that the source path isolation technique includes a depth-first search.

28. The system of claim 11, wherein the reply is used to determine a point of entry of at least one target packet.

29. The system of claim 28, wherein the at least one target packet is a malicious packet.

30. The system of claim 11, wherein the information includes a time-of-arrival.

31. The system of claim 11, wherein the information includes encapsulation link information.

32. The system of claim 11, wherein the comparing the second representation to the one or more of the plurality of first representations includes using a bit map of hash values representative of the one or more of the plurality of first representations.

33. The system of claim 11, wherein the reply includes an address of a router.

34. The system of claim 33, wherein the router is the system.

35. The system of claim 11, wherein the reply includes information about observed packets.

36. The system of claim 11, wherein the reply includes information about transformed packets.

37. The system of claim 36, wherein the transformed packets have passed through the system.

38. The system of claim 11, wherein the system is operable to receive at least one executable instruction for instructing the system to modify the operation of the system, and wherein the at least one executable instruction facilitates a response to network intrusion.

* * * * *